(12) United States Patent
Lee et al.

(10) Patent No.: US 10,694,126 B2
(45) Date of Patent: Jun. 23, 2020

(54) MOVING PICTURE PHOTOGRAPHING APPARATUS HAVING DUAL CAMERAS USING CORRECTION INFORMATION

(71) Applicant: LG ELECTRONICS INC., Seoul (KR)

(72) Inventors: Junwoo Lee, Seoul (KR); Kyuyeol Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/619,328

(22) Filed: Jun. 9, 2017

(65) Prior Publication Data
US 2017/0359536 A1    Dec. 14, 2017

(30) Foreign Application Priority Data
Jun. 9, 2016 (KR) ........................ 10-2016-0071932

(51) Int. Cl.
| | |
|---|---|
| *H04N 5/225* | (2006.01) |
| *H04N 5/357* | (2011.01) |
| *H04N 5/232* | (2006.01) |
| *H04N 5/235* | (2006.01) |
| *H04N 5/14* | (2006.01) |
| *H04N 5/247* | (2006.01) |
| *H04N 7/18* | (2006.01) |

(52) U.S. Cl.
CPC .......... *H04N 5/3577* (2013.01); *H04N 5/144* (2013.01); *H04N 5/2258* (2013.01); *H04N 5/232* (2013.01); *H04N 5/2351* (2013.01); *H04N 5/23212* (2013.01); *H04N 5/247* (2013.01); *H04N 7/188* (2013.01)

(58) Field of Classification Search
CPC ...... H04N 5/144; H04N 5/247; H04N 5/3577; H04N 7/188
USPC ........................................................ 348/159
See application file for complete search history.

(56) References Cited

U.S. PATENT DOCUMENTS

| | | | |
|---|---|---|---|
| 7,724,296 B2 | 5/2010 | Lonn | |
| 8,289,377 B1 | 10/2012 | Tsai et al. | |
| 9,560,254 B2 * | 1/2017 | Lombardi | ............ H04N 5/2258 |
| 10,256,639 B2 | 4/2019 | Cheng et al. | |

(Continued)

FOREIGN PATENT DOCUMENTS

| | | |
|---|---|---|
| CN | 104601892 | 5/2015 |
| JP | 2011254212 | 12/2011 |

(Continued)

OTHER PUBLICATIONS

PCT International Application No. PCT/KR2017/005331, International Search Report dated Sep. 11, 2017, 3 pages.

(Continued)

*Primary Examiner* — James T Boylan
(74) *Attorney, Agent, or Firm* — Lee, Hong, Degerman, Kang & Waimey

(57) ABSTRACT

A moving picture photographing apparatus having dual camera includes a first camera configured to capture images, a second camera configured to capture images, and a controller configured to cause the first camera to capture a motion picture, generate final correction information based on an image received via the second camera, and cause the first camera to adjust capture of the motion picture based on the final correction information.

19 Claims, 46 Drawing Sheets

(56) References Cited

U.S. PATENT DOCUMENTS

| | | | |
|---|---|---|---|
| 2008/0218612 A1 | 9/2008 | Border et al. | |
| 2008/0231726 A1* | 9/2008 | John | H04N 5/2258 348/223.1 |
| 2009/0002501 A1* | 1/2009 | Silsby | G11B 31/006 348/208.16 |
| 2012/0002958 A1 | 1/2012 | Muukki | |
| 2014/0071330 A1* | 3/2014 | Zhang | H04N 5/2258 348/345 |
| 2014/0340561 A1* | 11/2014 | Getman | H04N 5/23212 348/345 |
| 2015/0092066 A1* | 4/2015 | Geiss | H04N 5/2258 348/180 |
| 2016/0073012 A1* | 3/2016 | Shibuno | H04N 5/23222 348/207.11 |
| 2016/0316155 A1* | 10/2016 | Richards | H04N 5/23229 |
| 2017/0187954 A1* | 6/2017 | Fukuya | H04N 5/23232 |

FOREIGN PATENT DOCUMENTS

| | | |
|---|---|---|
| JP | 2012088564 | 5/2012 |
| JP | 2013185931 | 9/2013 |
| KR | 1020090125124 | 12/2009 |
| WO | 2007147449 | 12/2007 |
| WO | 2015188510 | 12/2015 |

OTHER PUBLICATIONS

European Patent Office Application Serial No. 17810488.1, Search Report dated Oct. 29, 2019, 10 pages.

\* cited by examiner

<ONE CAMERA>

<ONE CAMERA>

<ONE CAMERA>

<FIRST CAMERA>

<SECOND CAMERA>

<SECOND CAMERA>

<FIRST CAMERA>

<ONE CAMERA>

<ONE CAMERA>

<SECOND CAMERA>

<SECOND CAMERA>

<SECOND CAMERA>

MOVING PICTURE PHOTOGRAPHING APPARATUS HAVING DUAL CAMERAS USING CORRECTION INFORMATION

CROSS-REFERENCE TO RELATED APPLICATIONS

Pursuant to 35 U.S.C. § 119(a), this application claims the benefit of earlier filing date and right of priority to Korean Patent Application No. 10-2016-0071932, filed on Jun. 9, 2016, the contents of which are all hereby incorporated by reference herein in its entirety.

BACKGROUND

The present disclosure relates to a moving picture capturing apparatus having dual camera, in which final correction information is acquired using a second camera unit, and a first camera unit is controlled based on the final correction information, so that it is possible to prevent distortions of moving pictures recorded through the first camera unit.

Terminals may be divided into mobile/portable terminals and stationary terminals according to their mobility. Also, the mobile terminals may be categorized into a handheld terminal and a vehicle mounted terminal according to whether it is directly portable by a user.

Meanwhile, recent mobile terminals or other portable electronic devices generally perform various functions. A representative example of the various functions is to provide a still picture photographing function or a moving picture capturing function using a camera module equipped in an electronic device.

The mobile terminals or other portable electronic devices provide, in photographing, additional functions, e.g., an auto focus (AF) function, an auto exposure (AE) function, an auto white balance (AWB) function, and the like, thereby providing convenience to users.

When a photographing environment including imaging, exposure, lighting, etc. is changed, a photographing apparatus automatically performs correction through the AF function, the AE function, the AWB function, etc.

However, when a sudden change in the photographing environment occurs while a moving picture is being photographed, a time is required until the photographing apparatus performs correction to a new setting value corresponding to the sudden change in the photographing environment, and distorted pictures during the correction may be recorded as a result.

SUMMARY

Embodiments of the present invention provide a moving picture capturing apparatus having dual camera, in which final correction information is acquired using a second camera unit, and a first camera unit is controlled based on the final correction information, so that it is possible to prevent distortions of moving pictures recorded through the first camera unit.

In an embodiment, a moving picture capturing apparatus having dual camera includes: a first camera unit configured to receive an image; a second cameral unit configured to receive the image; and a controller configured to photograph a moving picture using the first camera unit, acquire final correction information on the basis of an image received through the second camera unit, and control the first camera unit to photograph the moving picture on the basis of the final correction information.

The details of one or more embodiments are set forth in the accompanying drawings and the description below. Other features will be apparent from the description and drawings, and from the claims.

DETAILED DESCRIPTION OF THE EMBODIMENTS

Figure 1A:
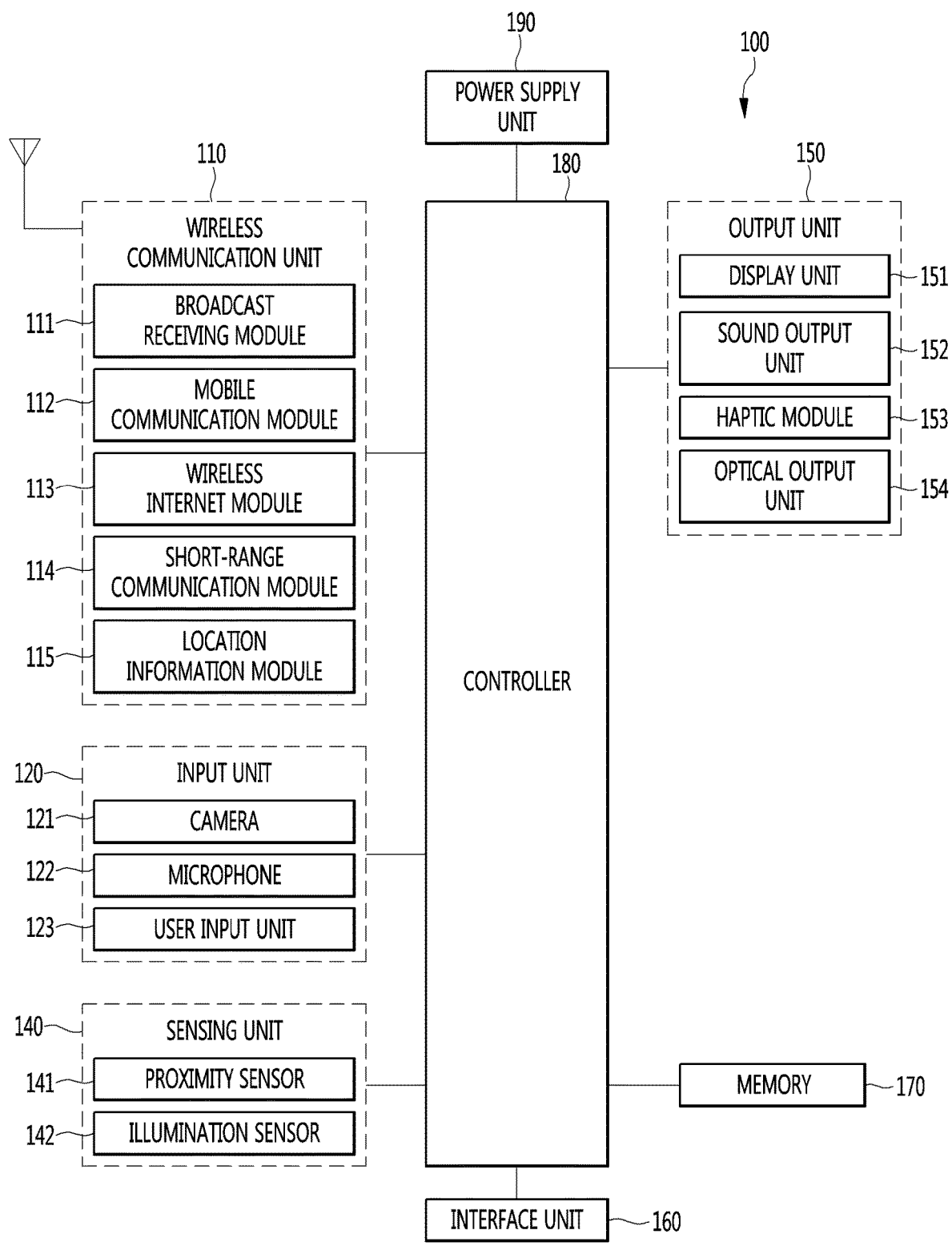
FIG. 1A is a block diagram illustrating a mobile terminal related to the present disclosure.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are used only in consideration of ease in preparation of the specification, and do not have distinct meanings. Accordingly, the suffixes "module" and "unit" may be used interchangeably. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and sprit of the present disclosure.

It will be understood that although the terms first, second, etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise. In the present application, it will be further understood that the terms "comprises", "includes", etc. specify the presence of stated features, integers, steps, operations, elements, components, or combinations thereof, but do not preclude the presence or addition of one or more other features, integers, steps, operations, elements, components, or combinations thereof.

A mobile terminal described in this specification may include a cellular phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a smart watch, a smart glass, or a head mounted display (HMD)), and the like.

However, it will be readily understood by those skilled in the art that configurations according to embodiments of this specification can be applied to stationary terminals such as a digital TV, a desktop computer, and a digital signage, except for specific configurations for mobility.

Figure 1B:
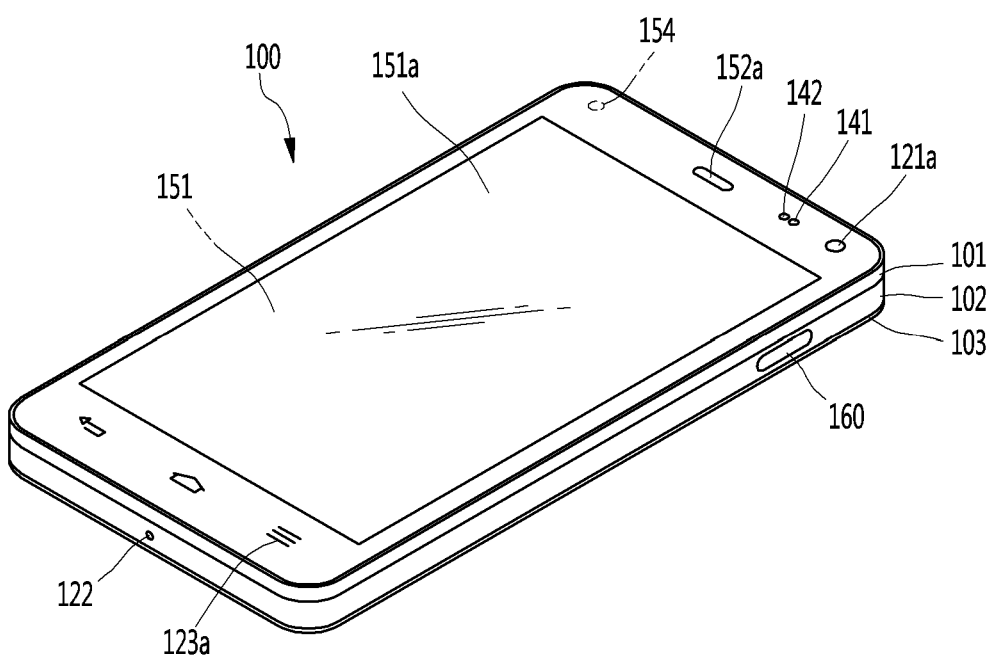
FIGS. 1B and 1C are conceptual views of an example of the mobile terminal related to the present disclosure, which are viewed from different directions.
Figure 1C:
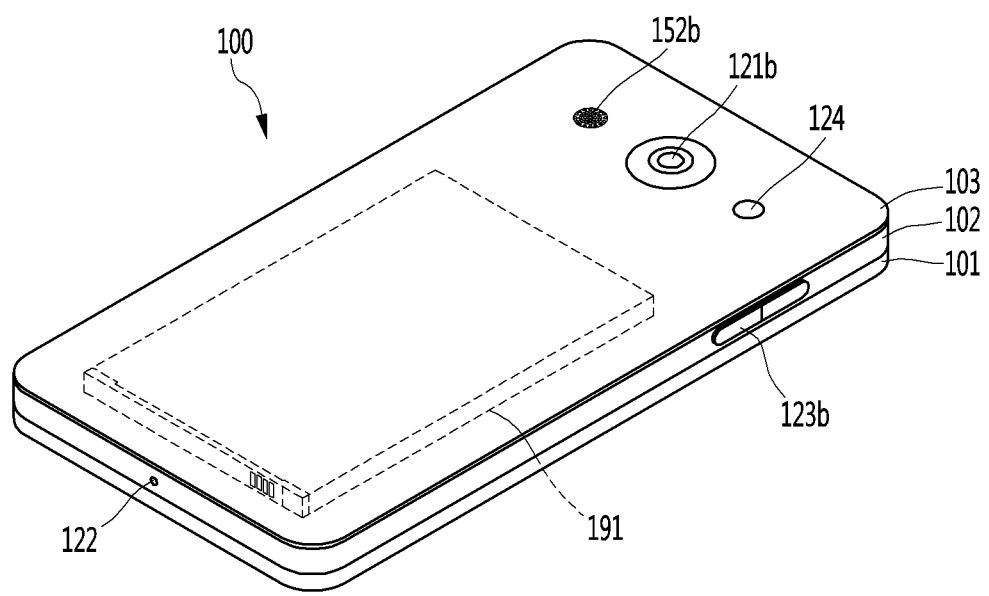

FIG. 1A is a block diagram illustrating a mobile terminal related to the present disclosure. FIGS. 1B and 1C are conceptual views of an example of the mobile terminal related to the present disclosure, which are viewed from different directions.

The mobile terminal 100 may include a wireless communication unit 110, an input unit 120, a sensing unit 140, an output unit 150, an interface unit 160, a memory 170, a controller 180, a power supply unit 190, and the like.

The components shown in FIG. 1A are not necessary in implementation of the mobile terminal, and therefore, the mobile terminal described in this specification may have components having a larger or smaller number than that of the above-listed components.

More specifically, the wireless communication unit 110 may include one or more modules that enable wireless communication between mobile terminal 100 and a wireless communication system, between the mobile terminal 100 and another mobile terminal 100, or between the mobile terminal 100 and an external server. Also, the wireless communication unit 110 may include one or more modules that connect the mobile terminal 100 to one or more networks.

The wireless communication unit 110 may include at least one of a broadcast receiving module 111, a mobile communication module 112, a wireless Internet module 113, a short-range communication module 114, and a location information module 115.

The input unit 120 may include a camera 121 or an image input unit for an image signal input, a microphone 122 or an audio input unit for an audio signal input, or a user input unit 123 (e.g., a touch key, a mechanical key, etc.) to receive information input from a user. Voice data or image data collected by the input unit 120 may be analyzed to be processed as a control command of the user.

The sensing unit 140 may include one or more sensors for sensing at least one of information in the mobile terminal, information on the environment surrounding the mobile terminal, and user information.

For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, an RGB sensor, an infrared sensor (IR sensor), a finger scan sensor, an ultrasonic wave sensor, an optical sensor (e.g., a camera (see 121)), a microphone (see 122), a battery gauge, an environment sensor (e.g., a barometer, a hygrometer, a temperature sensor, a radiation detection sensor, a thermal sensor, a gas detection sensor, etc.), a chemical sensor (e.g., an electronic nose, a healthcare sensor, a biometric sensor, etc.). Meanwhile, the mobile terminal disclosed in this specification may be activated by combining information sensed by at least two sensors among these sensors.

The output unit 150 is used to generate an output related to a visual, auditory, or tactile sensation, and may include at least one of a display unit 151, a sound output unit 152, a haptic module 153, and an optical output unit 154. The display unit 151 may be formed in a mutual layer structure or integrally with a touch sensor, thereby realizing a touch screen. The touch screen may function as the user input unit 123 providing an input interface between the mobile terminal 100 and the user, and may simultaneously provide an output interface between the mobile terminal 100 and the user.

The interface unit 160 serves as a path with various external devices connected to the mobile terminal 100. The interface unit 160 may include at least one among a wired/wireless headset port, an external charger port, a wired/wireless data port, a memory card port, a port connecting a device having an identity module, an audio input/output (I/O) port, a video I/O port, and an earphone port. The mobile terminal 100 may perform appropriate control related to the connected external device corresponding to the interface unit 160 which is connected to the external device.

Also, the memory 170 stores the data supporting various functions of the mobile terminal 100. The memory 170 may store a plurality of application programs (or an application) driven in the mobile terminal 100, data for an operation of the mobile terminal 100, and commands. At least some of the application programs may be downloaded from the external server through the wireless communication. Also, at least some of the application programs may exist on the mobile terminal 100 from its factory for basic functions of the mobile terminal 100 (e.g., an incoming call function, a calling function, a message received function, and a calling function). Meanwhile, the application program is stored to the memory 170, and is installed on the mobile terminal 100, thereby being driven by the host processor 180 to perform an operation (or a function) of the mobile terminal.

The controller 180 generally controls overall operations of the mobile terminal 100 as well as the operation related to the application programs. The controller 180 processes the signal, the data, and the information, which are input or output through the above-described components or drives the application programs stored in the memory 170, thereby providing or processing or the appropriate information or function to the user.

Also, the controller 180 may control at least some of the components described along with FIG. 1 so as to drive the application programs stored in the memory 170. Furthermore, the controller 180 may combine and drive at least two of the components included in the mobile terminal 100 so as to drive the application programs.

The power supply unit 190 receives external power and internal power under the control of the controller 180 to supply the power to the components included in the mobile terminal 100. The power supply unit 190 includes a battery, and the battery may be a built-in type of battery or a replaceable battery.

Hereinafter, the above-listed components will be described in more detail with reference to FIG. 1A, prior to explaining various embodiments implemented by the mobile terminal 100 described above.

First, the wireless communication unit 110 will be described. The broadcast receiving module 111 of the wireless communication unit 110 may receive a broadcast signal and/or broadcast associated information from an external broadcast managing server via a broadcast channel. The broadcast channel may include a satellite channel and a terrestrial channel. At least two broadcast receiving modules may be provided in the mobile terminal 100 to simultaneously receive at least two broadcast channels or switch the broadcast channels.

The broadcast managing server may refer to a server that generates and transmits a broadcast signal and/or broadcast associated information or a server that is provided with a previously generated broadcast signal and/or broadcast associated information and then transmits the provided signal or information to a terminal. The broadcast signal may include a TV broadcast signal, a radio broadcast signal, and a data broadcast signal. In addition, the broadcast signal may further include a broadcast signal combined with a TV or radio broadcast signal.

The broadcast signal may be encoded based on at least one of standards (or broadcast types, e.g., ISO, IEC, DVB, ATSC, etc.) for transceiving digital broadcast signals. The broadcast receiving module 111 may receive the digital broadcast signal using a method suitable for the standards.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms, e.g., an electronic program guide (EPG) of digital multimedia broadcasting (DMB), electronic service guide (ESG) of digital video broadcast-handheld (DVB-H), and the like. Broadcast signals and/or broadcast-associated information received via the broadcast receiving module 111 may be stored in the memory 170.

The mobile communication module 112 may transmit/receive a wireless signal to/from at least one of a base station, an external terminal, and a server on a mobile communication network established according to the technical standards or communication methods for mobile communication (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.).

The wireless signal may include various types of data according to a voice call signal, a video call signal, or text/multimedia message transmission.

The wireless internet module 113 refers to a module for wireless internet access and may be built in or external to the mobile terminal 100. The wireless internet module 113 may be configured to transmit/receive a wireless signal in a communication network according to wireless internet technologies.

The wireless internet technology may include, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless internet module 113 transmits/receives data according at least one wireless internet technology including internet technology not listed above.

From the viewpoint that wireless internet access by WiBro, HSDPA, HSUPA, GSM, CDMA, WCDMA, LTE, and LTE-A is achieved through a mobile communication network, the wireless internet module 113 performing wireless internet access through the mobile communication network may be understood as one type of the mobile communication module 112.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity Wi-Fi Direct, and Wireless Universal Serial Bus (USB) technologies. The short-range communication module 114 may support wireless communication between the mobile terminal 100 and a wireless communication system, between the mobile terminal 100 and another mobile terminal 100, or between networks including the mobile terminal 100 and another mobile terminal 100 (or an external server) through wireless area networks. The wireless area networks may be wireless personal area networks.

Here, the other mobile terminal 100 may be a wearable device (e.g., a smart watch, smart glasses, or a head mounted display (HMD)) that is capable of exchanging data (or interworking) with the mobile terminal 100. The short-range communication module 114 may detect (or recognize) a wearable device around the mobile terminal 100, which is capable of communicating with the mobile terminal 100. Furthermore, if the detected wearable device is a device authenticated to communicate with the mobile terminal 100, the controller 180 may transmit at least part of data processed in the mobile terminal 100 to the wearable device through the short-range communication module 114. Accordingly, a user of the wearable device can use the data processed in the mobile terminal 100 through the wearable device. For example, according thereto, when a call is received by the mobile terminal 100, a user may perform a phone call through the wearable device or when a message is received by the mobile terminal 100, a user may check the received message through the wearable device.

The location information module 115 is a module for obtaining the location (or the current location) of a mobile terminal, and its representative examples include a global positioning system (GPS) module and a Wi-Fi module. As an example, the mobile terminal may obtain its position by using a signal transmitted from a GPS satellite through the GPS module.

As another example, the mobile terminal may obtain its position on the basis of information of a wireless access point (AP) transmitting/receiving a wireless signal to/from the Wi-Fi module, through the Wi-Fi module. If necessary, the position information module 115 may perform a function of another module in the wireless communication unit 110 so as to obtain data on the location of the mobile terminal substitutionally or additionally. The location information module 115 is a module for obtaining the position (or the current position) of the mobile terminal and is not limited to a module directly calculating and obtaining the position of the mobile terminal.

Next, the input unit 120 is used for inputting image information (or signal), audio information (or signal), data, or information input from a user. The mobile terminal 100 may include at least one camera 121 to input image information. The camera 121 processes image frames such as a still image or a video obtained by an image sensor in a video call mode or a capturing mode. The processed image frame may be displayed on the display unit 151 or stored in the memory 170. Meanwhile, a plurality of cameras 121 equipped in the mobile terminal 100 may be arranged in a matrix structure and through the camera 121 having such a matrix structure, and a plurality of image information having various angles or focuses may be input to the input terminal 100. In addition, the plurality of cameras 121 may be arranged in a stereo structure to obtain the left and right images for implementing a three-dimensional image.

The microphone 122 processes external sound signals as electrical voice data. The processed voice data may be utilized variously according to a function (or an application program being executed) being performed in the mobile terminal 100. Meanwhile, various noise removing algorithms for removing noise occurring during the reception of external sound signals may be implemented in the microphone 122.

The user input unit 123 is to receive information from a user. When information is input through the user input unit 123, the controller 180 may control an operation of the mobile terminal 100 to correspond to the input information. The user input unit 123 may include a mechanical input means (or a mechanical key, e.g., a button, a dome switch, a jog wheel, a jog switch at the front, back or side of the mobile terminal 100, etc) and a touch type input means. As an example, the touch type input means may include a virtual key displayed on a touch screen through software processing, a soft key, a virtual key, or a touch key arranged at a portion other than the touch screen. Moreover, the virtual key or the visual key may be displayed on the touch screen in various forms and for example, may include graphic, text, icon, video, or a combination thereof.

Meanwhile, the sensing unit 140 may sense at least one of information in a mobile terminal, environmental information around a mobile terminal, and user information and may then generate a sensing signal corresponding thereto. On the basis of such a sensing signal, the controller 180 may control the drive or control of the mobile terminal 100 or may perform data processing, functions, or operations relating to an application program installed in the mobile terminal 100. Representative sensors among various sensors included in the sensing unit 140 will be described in more detail.

First, the proximity sensor 141 refers to a sensor detecting whether there is an object approaching a predetermined detection surface or whether there is an object around by using the strength of an electromagnetic field or infrared, without mechanical contact. The proximity sensor 141 may be disposed in an inner area of a mobile terminal surrounded by the touch screen or around the touch screen.

Examples of the proximity sensor 141 may include a transmission-type photoelectric sensor, a direct reflective-type photoelectric sensor, a mirror reflective-type photoelectric sensor, a high-frequency oscillation-type proximity sensor, a capacitive-type proximity sensor, a magnetic-type proximity sensor, an infrared proximity sensor, and the like. If the touch screen is a capacitive type, the proximity sensor 141 may be configured to detect the proximity of an object by changes in an electric field according to the proximity of the object having conductivity. In this case, the touch screen (or a touch sensor) itself may be classified as a proximity sensor.

For convenience of description, an action for recognizing the position of an object on the touch screen as the object is close to the touch screen without contacting the touch screen is called "proximity touch," and an action that the object actually contacts the touch screen is called "contact touch." A position that an object is proximity-touched on the touch screen is a position that the object vertically corresponds to the touch screen when the object is proximity-touched. The proximity sensor 141 may detect a proximity touch and a proximity touch pattern (e.g., a proximity touch distance, a proximity touch direction, a proximity touch speed, a proximity touch time, a proximity touch position, a proximity touch movement state, etc.).

The controller 180 processes data (for information) corresponding to a proximity touch operation and a proximity touch pattern, detected through the proximity sensor 141. Furthermore, the controller 180 may output visual information corresponding to the processed data on the touch screen. Furthermore, according to whether a touch for the same point on the touch screen is a proximity touch or a contact touch, the controller 180 may control the mobile terminal 100 to process different operations or data (or information).

The touch sensor detects a touch (or a touch input) applied to the touch screen (or the display unit 151) by using at least one of various touch methods, e.g., a resistive film method, a capacitive method, an infrared method, an ultrasonic method, and a magnetic field method.

As an example, the touch sensor may be configured to convert a pressure applied to a specific portion of the touch screen or changes in capacitance occurring at a specific portion into electrical input signals. The touch sensor may be configured to detect a position and area that a touch target applying a touch on the touch screen touches the touch sensor, a pressure when touched, and a capacitance when touched. Here, the touch target, as an object applying a touch on the touch sensor, may be, for example, a finger, a touch pen, a stylus pen, or a pointer.

In such a manner, when there is a touch input on the touch sensor, signal(s) corresponding thereto are sent to a touch controller. The touch controller processes the signal(s) and then transmits corresponding data to the controller 180. Therefore, the controller 180 may recognize which area of the display unit 151 is touched. Herein, the touch controller may be an additional component separated from the controller 180 or may be the controller 180 itself.

The controller 180 may perform different controls or the same control according to types of a touch target touching the touch screen (or a touch key equipped separated from the touch screen). Whether to perform different controls or the same control according to types of a touch target may be determined according to a current operation state of the mobile terminal 100 or an application program in execution.

Moreover, the above-described touch sensor and proximity sensor are provided separately or combined, and may thus sense various types of touches, e.g., short (or tap) touch, long touch, multi touch, drag touch, flick touch, pinch-in touch, pinch-out touch, swipe touch, and hovering touch for the touch screen.

An ultrasonic sensor may recognize position information of a detection target by using ultrasonic waves. Meanwhile, the controller 180 may calculate the position of a wave source through information detected by an optical sensor and a plurality of ultrasonic sensors. The position of the wave source may be calculated by using the property that light is much faster than ultrasonic wave, i.e., a time that light reaches an optical sensor is much shorter than a time that ultrasonic wave reaches an ultrasonic sensor. More specifically, the position of the wave source may be calculated by using a time difference with a time that ultrasonic wave reaches by using light as a reference signal.

The camera 121 described as a configuration of the input unit 120 may include at least one of a camera sensor (e.g., CCD, CMOS, etc.), a photo sensor (or an image sensor), and a laser sensor.

The camera 121 and the laser sensor may be combined to detect a touch of a detection target for a three-dimensional image. The photo sensor may be stacked on a display device and is configured to scan a movement of a detection target close to the touch screen. More specifically, the photo sensor mounts a photo diode and a transistor (TR) in a row/column and scans content disposed on the photo sensor by using an electrical signal changing according to an amount of light applied to the photo diode. That is, the photo sensor may calculate the coordinates of a detection target according to the amount of change in light and through this thereby acquiring the position information of the detection target.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

Also, the display unit 151 may be implemented as a stereoscopic display unit for displaying stereoscopic images. The stereoscopic display unit may employ a stereoscopic display scheme such as a stereoscopic scheme (a glass scheme), an auto-stereoscopic scheme (glassless scheme), or a projection scheme (holographic scheme).

In general, a 3D stereoscopic image may include a left image (e.g., a left eye image) and a right image (e.g., a right eye image). According to how left and right images are combined into a 3D stereoscopic image, a 3D stereoscopic imaging method may be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail may be generated from a left image and a right image of an original image frame, respectively, and then combined, thereby generating a single 3D thumbnail image. In general, the term "thumbnail" may refer to a reduced image or a reduced still image. A generated left image thumbnail and right image thumbnail may be displayed with a horizontal distance difference therebetween by a depth corresponding to the disparity between the left image and the right image on the screen, thereby providing a stereoscopic space sense.

A left image and a right image, required for implementing a 3D stereoscopic image, may be displayed on the stereoscopic display unit using a stereoscopic processing unit. The stereoscopic processing unit may receive a 3D image (an image at a reference time and an image at an extension time) and extract the left image and the right image, or may receive a 2D image and change the 2D image into a left image and a right image.

The sound output unit 152 may output audio data received from the wireless communication unit 110 or stored in the memory 170 in a call signal reception or call mode, a recording mode, a voice recognition mode, or a broadcast reception mode. The sound output unit 152 may output a sound signal relating to a function (e.g., a call signal reception sound, a message reception sound, etc.) performed by the mobile terminal 100. The sound output unit 152 may include a receiver, a speaker, and a buzzer.

The haptic module 153 generates various haptic effects that a user can feel. A representative example of a haptic effect that the haptic module 153 generates is vibration. The intensity and pattern of vibration generated by the haptic module 153 may be controlled by a user's selection or a setting of a controller. For example, the haptic module 153 may synthesize and output different vibrations or output different vibrations sequentially.

In addition to vibrations, the haptic module 153 may generate various haptic effects, e.g., effects by a pin arrangement moving vertical to a contact skin surface, injection power or suction power of air through an injection port or a suction port, rubbing a skin surface, electrode contact, stimulus of electrostatic force, and effects by the reproduction of cold/warm sense by using a device absorbing or emitting heat.

The haptic module 153 may be implemented to deliver a haptic effect through a direct contact and also allow a user to feel a haptic effect through a muscle sense such as a finger or an arm. The haptic module 153 may be more than two according to a configuration aspect of the mobile terminal 100.

The optical output unit 154 outputs a signal for notifying event occurrence by using light of a light source of the mobile terminal 100. An example of an event occurring in the mobile terminal 100 includes message reception, call signal reception, missed calls, alarm, schedule notification, e-mail reception, information reception through an application, and the like.

A signal output from the optical output unit 154 is implemented as a mobile terminal emits single color of multi-color to the front or the back. The signal output may be terminated when a mobile terminal detects user's event confirmation.

The interface unit 160 may serve as a path to all external devices connected to the mobile terminal 100. The interface unit 160 may receive data from an external device, receive power and deliver it to each component in the mobile terminal 100, or transmit data in the mobile terminal 100 to an external device. For example, the interface unit 160 may include a wired/wireless headset port, an external charger port, a wired/wireless data port, a memory card port, a port connecting a device equipped with an identification module, an audio input/output (I/O) port, a video I/O port, an earphone port, and the like.

The identification module, as a chip storing various information for authenticating usage authority of the mobile terminal 100, may include a user identity module (UIM), a subscriber identity module (SIM), a universal subscriber identity module (USIM), and the like. A device equipped with an identification module (hereinafter, referred to as an 'identification device') may be manufactured in a smart card form. Accordingly, the identification device can be connected to the terminal 100 through the interface unit 160.

In addition, when the mobile terminal 100 is connected to an external cradle, the interface unit 160 may become a path through which power of the cradle is supplied to the mobile terminal 100 or a path through which various command signals input from the cradle are delivered to the mobile terminal 100 by a user. The various command signals or the power input from the cradle may operate as a signal for recognizing that the mobile terminal 100 is accurately mounted on the cradle.

The memory 170 may store a program for an operation of the controller 180 and may temporarily store input/output data (e.g., a phone book, a message, a still picture, a moving picture, etc.). The memory 170 may store data on various patterns of vibrations and sounds output during a touch input on the touch screen.

The memory 170 may include at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type. The mobile terminal 100 may operate in relation to a web storage performing a storage function of the memory 170 over Internet.

As described above, the controller 180 may control operations related to an application program and overall operations of the mobile terminal 100. For example, if a state of the mobile terminal 100 satisfies set conditions, the controller 180 may execute or release a lock state limiting an output of a control command of a user for applications.

Also, the controller 180 may perform control or processing related to a voice call, data communication, and a video call may perform pattern recognition processing for recognizing handwriting input or drawing input on the touch screen as a text and an image, respectively. Furthermore, the controller 180 may use at least one or a combination of the above components to perform a control so as to implement various embodiments described below on the mobile terminal 100.

The power supply unit 190 may receive external power or internal power under the control of the controller 180, and may then supply power necessary for an operation of each component. The power supply unit 190 includes a battery. The battery is a rechargeable built-in battery, and may be attachably/detachably coupled to a terminal body for charging.

In addition, the power supply unit 190 may include a connection port, and the connection port may be configured as one example of the interface unit 160 to which an external charger supplying power for charging of the battery is electrically connected.

As another example, the power supply unit 190 may be configured to charge a battery through a wireless method without using the connection port. In this case, the power supply unit 190 may receive power from an external wireless power transmission device through at least one of an inductive coupling method based on a magnetic induction phenomenon, and a magnetic resonance coupling method based on an electromagnetic resonance phenomenon.

Various embodiments below may be implemented in a computer or device similar thereto including readable medium by using software, hardware, or a combination thereof.

Referring to FIGS. 1B and 1C, the disclosed mobile terminal 100 may have a bar-shaped terminal body. However, the present disclosure is not limited thereto and may be applied to various structures, e.g., a watch type, a clip type, glasses type, a folder type in which two or more bodies are coupled to be relatively movable, a flip type, a slide type, a swing type, and a swivel type. Descriptions related to a specific type of a mobile terminal may be generally applied to another type of a mobile terminal.

Herein, as the mobile terminal 100 is regarded as an integrated one, the terminal body may be conceptually understood as referring to the mobile terminal 100.

The mobile terminal 100 includes a case (e.g., a frame, a housing, a cover, etc.) constituting an appearance thereof. As shown in these figures, the mobile terminal 100 may include a front case 101 and a rear case 102. Various electronic components are disposed in an inner space formed by the coupling of the front case 101 and the rear case 102. At least one middle case may be additionally disposed between the front case 101 and the rear case 102.

The display unit 151 is disposed at the front of the terminal body to output information. As shown in FIG. 1B, a window 151a of the display unit 151 is mounted at the front case 101 to form the front of the terminal body together with the front case 101.

In some cases, an electronic component may be mounted at the rear case 102. Electronic components mountable on the rear case 102 may include an attachable/detachable battery, an identification module, a memory card, and the like. In this case, a back cover 103 covering mounted electronic components may be attachably/detachably coupled to the rear case 102. Accordingly, when the back cover 103 is separated from the rear case 102, electronic components mounted at the rear case 102 are externally exposed.

As shown in these figures, when the back cover 103 is coupled to the rear case 102, a portion of a side of the rear case 102 may be externally exposed. In some cases, during the coupling, the rear case 102 may be completely covered by the back cover 103. Meanwhile, an opening exposing the sound output unit 152b to the outside therethrough may be disposed at the back cover 103.

These cases 101, 102, and 103 may be formed by injecting synthetic resin or may be formed of a metal, e.g., stainless steel (STS), aluminum (Al), titanium (Ti), etc.

Unlike the example that a plurality of cases prepare an inner space receiving various components, the mobile terminal 100 may be configured to allow one case to prepare the inner space. In this case, the mobile terminal 100 of a unibody where a synthetic resin or metal extends from the side to the back may be implemented.

The mobile terminal 100 may include a waterproof unit (not shown) to prevent water from permeating the inside of the terminal body. For example, the waterproof unit may include a waterproof member disposed between the window 151a and the front case 101, between the front case 101 and the rear case 102, or between the rear case 102 and the back cover 103, to seal the inner space when they are coupled to each other.

The mobile terminal 100 may include the display unit 151, a first sound output unit 152a and the second sound output unit 152b, the proximity sensor 141, the illumination sensor 142, the optical output unit 154, first and second cameras 121a and 121b, first and second manipulation units 123a and 123b, the microphone 122, the interface unit 160, and the like.

Hereinafter, as shown in FIGS. 1B and 1C, in relation to the mobile terminal 100, the display unit 151, the first sound output unit 152a, the proximity sensor 141, the illumination sensor 142, the optical output unit 154, the first camera 121a, and the first manipulation unit 123a are disposed at the front of the terminal body. The second manipulation unit 123b, the microphone 122, and the interface unit 160 are disposed at the side of the terminal body. The second sound output unit 152b and the second camera 121b are disposed at the back of the terminal body. This is described as one example.

However, such components are not limited to such an arrangement. These components may be excluded or replaced or disposed at a different side, if necessary. For example, the first manipulation unit 123a may not be disposed at the front of the terminal body, and the second sound output unit 152b may be disposed at the side of the terminal body instead of the back of the terminal body.

The display unit 151 displays (outputs) information processed in the mobile terminal 100. For example, the display unit 151 may display execution screen information of an application program running on the mobile terminal 100 or user interface (UI) and graphic user interface (GUI) information according to such execution screen information.

The display unit 151 may include at least one of a liquid crystal display (LCD), a thin film transistor-liquid crystal display (TFT LCD), an organic light-emitting diode (OLED), a flexible display, a 3D display, and an e-ink display.

In addition, the display unit 151 may include a plurality of display units according to a configuration aspect of the mobile terminal 100. In this case, in the mobile terminal 100, a plurality of display units are disposed on one side, being spaced from each other or integrally, or may be disposed at different sides.

The display unit 151 may include a touch sensor detecting a touch on the display unit 151 so as to receive a control command through a touch method. When a touch is made on the display unit 151 by using this, the touch sensor may detect the touch and, on the basis of this, the controller 180 may generate a control command corresponding to the touch. A content input by a touch method may be a text or number, or an instruction in various modes, or a designation available menu item.

The touch sensor may be configured in the form of a film having a touch pattern and thus, may be disposed between the window 151a and a display (not shown) on the back of the window 151a or may be a metal wire that is directly patterned on the back of the window 151a. Alternatively, the touch sensor and the display may be formed integrally. For example, the touch sensor may be disposed on a substrate of the display or may be disposed inside the display.

In such a manner, both the display unit 151 and the touch sensor may form a touch screen. In this case, the touch screen may function as the user input unit 123 (see FIG. 1A). In some cases, the touch screen may perform at least one function of the first manipulation unit 123a.

The first sound output unit 152a may be implemented as a receiver delivering a call sound to the ear of a user, and the second sound output unit 152b may implemented as a loud speaker outputting various alarm sounds or a playback sound of multimedia.

An audio hole for emitting sound generated from the first sound output unit 152a may be formed at the window 151a of the display unit 151. However, the present disclosure is not limited thereto, and the sound may be configured to be emitted along an assembly gap (e.g., a gap between the window 151a and the front case 101) between structures. In this case, a hole separately formed to output audio may not be seen or may be hidden in appearance such that the appearance of the mobile terminal 100 may become simpler.

The optical output unit 154 may be configured to emit light for notifying event occurrence. Examples of an event may include message reception, call signal reception, missed calls, alarm, schedule notification, e-mail reception, information reception through an application, and the like. If it is detected that a user has identified an event, the controller 180 may control the optical output unit 154 to terminate an output of light.

The first camera 121a processes image frames of a still picture or moving picture obtained by an image sensor in a photographing mode or a video call mode. The processed image frames may be displayed on the display unit 151 or may be stored in the memory 170.

The first and second manipulation units 123a and 123b, as an example of the user input unit 123 manipulated to receive a command for controlling an operation of the mobile terminal 100, may be collectively known as a manipulation portion. The first and second manipulation units 123a and 123b may employ any manner if it is in a tactile manner that a user manipulates touch, push, and scroll with tactile feeling. In addition, the first and second manipulation units 123a and 123b may employ a manner that a user manipulates proximity touch and hovering touch without tactile feeling.

In FIG. 1B, it is illustrated that the first manipulation unit 123a is a touch key, but the present disclosure is not limited thereto. For example, the first manipulation unit 123a may be a push key (i.e., a mechanical key) or a combination of a touch key and a push key.

Contents input by the first and second manipulation units 123a and 123b may be set variously. For example, the first manipulation unit 123a may receive commands such as menu, home key, cancel, and search, and the second manipulation unit 123b may receive commands such as the volume adjustment of sound output from the first or second sound output unit 152a or 152b and switching to a touch recognition mode of the display unit 151.

As another example of the user input unit 123, a back input unit (not shown) may be disposed at the back of the terminal body. Such a back input unit is manipulated to receive a command for controlling an operation of the mobile terminal 100, and input contents may be set variously. For example, the back input unit may receive commands such as power on/off, start, end, and scroll or commands such as the volume adjustment of sound output from the first or second output unit 152a or 152b and switching to a touch recognition mode of the display unit 151. The back input unit may be implemented in a form in which a touch input, a push input, or a combination input thereof is available.

The back input unit may be disposed to overlap with the front of the display unit 151 in a thickness direction of the terminal body. For example, when a user grabs the terminal body by one hand, the back input unit may be disposed at a back upper end portion of the terminal body so as to facilitate manipulation by using the user's index finger. However, the present disclosure is not limited thereto, and the position of the back input unit may vary.

In such a way, when the back input unit is equipped at the back of the terminal body, a new form of a user interface using the back input unit may be implemented. In addition, when the above-described touch screen or back input unit is substituted for at least one function of the first manipulation unit 123a equipped at the front of the terminal body and thus the first manipulation unit 123a is not disposed at the front of the terminal body, the display unit 151 may be configured with a larger sized screen.

The mobile terminal 100 may include a fingerprint recognition sensor for recognizing the user's fingerprint, and the controller 180 may use fingerprint information detected through the fingerprint recognition sensor as an authentication means. The fingerprint recognition sensor may be built in the display unit 151 or the user input unit 123.

The microphone 122 may be configured to receive user's voice or other sounds. The microphone 122 may be disposed at a plurality of positions to receive stereo sound.

The interface unit 160 becomes a path to connect the mobile terminal 100 to an external device. For example, the interface unit 160 may be at least one of a connection terminal for connected to another device (e.g., an earphone and an external speaker), a port for short-range communication (e.g., IrDA Port, Bluetooth Port, and Wireless LAN Port), and a power supply terminal for supplying power to the mobile terminal 100. The interface unit 160 may be implemented in the form of a socket for receiving an external type card such a Subscriber Identification Module (SIM) card, a User Identity Module (UIM) card, and a memory card for storing information.

The second camera 121b may be disposed at the back of the terminal body. In this case, the second camera 121b may have a substantially opposite photographing direction to the first camera 121a.

The second camera 121b may include a plurality of lenses arranged along at least one line. The plurality of lenses may be arranged in a matrix form. Such a camera may be named as an array camera. When the second camera 121b is configured with an array camera, an image may be photographed through various methods using a plurality of lenses, and a better image quality may be acquired.

A flash 124 may be disposed adjacent to the second camera 121b. When the second camera 121b photographs a subject, the flash 124 emits light toward the subject.

The second sound output unit 152b may be additionally disposed at the terminal body. The second sound output unit 152b may implement a stereo function together with the first sound output unit 152a, and may be used to implement a speaker phone mode during a call.

At least one antenna for wireless communication may be equipped at the terminal body. An antenna may be built in the terminal body or may be formed at the case. For example, an antenna constituting a portion of the broadcast receiving module 111 (see FIG. 1a) may be configured to be withdrawn from the terminal body. Alternatively, if an antenna is formed of a film type, the antenna may be attached to the inner side of the back cover 103, and a case including a conductive material may function as an antenna.

The power supply unit 190 (see FIG. 1A) for supplying power to the mobile terminal 100 is equipped at the terminal body. The power supply unit 190 may include a battery 191 built in the terminal body or attachable/detachable to/from the outside of the terminal body.

The battery 191 may be configured to receive power through a power cable connected to the interface unit 160. In addition, the battery 191 may be configured to be charged wirelessly through a wireless charging device. The wireless charging may be implemented by a magnetic induction method or a resonance method (i.e., a magnetic resonance method).

As shown in FIG. 1C, the back cover 103 is coupled to the rear case 102 to cover the battery 191 to limit the withdrawal of the battery 191, and protects the battery 191 from external impact and foreign materials. When the battery 191 is configured to be attachable/detachable to/from the terminal body, the back cover 103 may be attachably/detachably coupled to the rear case 102.

An accessory for protecting the appearance or assisting or expanding a function of the mobile terminal 100 may be added to the mobile terminal 100. As an example of the accessory, a cover or a pouch covering or receiving at least one side of the mobile terminal 100 may be provided. The cover or the pouch may interoperate with the display unit 151 to expand a function of the mobile terminal 100. As another example of the accessory, a touch pen assisting or expanding a touch input for a touch screen may be provided.

In this specification, the term "memory" may be used together with the term "storage unit."

Meanwhile, the input unit 120 of the mobile terminal 100 may include the sensing unit 140, and may perform all functions performed by the sensing unit 140. For example, the input unit 120 may detect a user touch input.

As described above, when auto focus and recording are simultaneously performed using one camera, a lens of the camera is moved while adjusting focus, and therefore, all of the changes in the captured image may be recorded throughout the focusing process, including undesired, unfocused, or otherwise distorted images. This is due to the processes required in auto focusing, for example determining whether focusing is required, adjusting the image, and again detecting if focusing is correct or if additional focusing is required.

If it is assumed that a position of the lens before an image is changed has a first value and a position of the lens for adjusting the focus after the image is correctly adjusted has a second value, the position of the lens is not immediately changed from the first value to the second value, but instead incrementally changed from the first value to a third value, then to a fourth value, and so on, until it is finally changed to the second value. Therefore, all the images through such processes are all recorded during a video capture mode.

However, in the present disclosure, auto focus is performed using the second camera unit instead of the first camera unit that performs the active recording, thereby solving such a problem. To continue with the above example, in the present disclosure, the position of the lens of the second camera unit is changed from the first value to the third value, the fourth value, and so on to perform auto focus. Then, once focus is finally correctly adjusted in the second camera unit at the second value, the position of the lens of the first camera unit is directly changed from the first value to the second value since it has already been determined. Thus, the trial-and-error process in which the position of the lens is changed from the first value to the second value via the third value and the fourth value is not recorded in the video, and the lens can be changed directly from the first value to the second value for the active recording. Accordingly, the distortion of the recorded images can be minimized.

Recently, there has appeared a terminal having two cameras equipped at the same side, in which the two cameras are of different kinds. The first and second camera units and of the present disclosure may also be of different kinds.

As an example, the first camera unit of the present disclosure may be a wide-angle camera including a wide-angle lens to have a wider angle of view than a general camera, and the second camera unit of the present disclosure may be a general camera instead of a wide-angle camera. As another example, the first camera unit of the present disclosure may be a camera including a fisheye lens, and the second camera unit 300 of the present disclosure may be a general camera.

Figure 2:
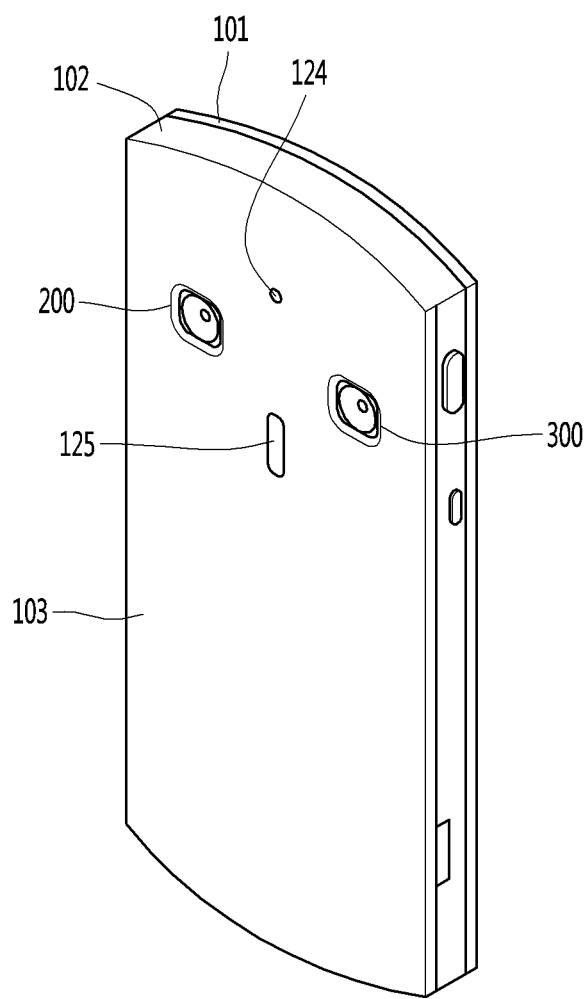
FIG. 2 is a view illustrating a mobile terminal having dual camera according to an embodiment.

In this case, the present disclosure has an advantage in that correction is performed by considering a difference in structure or performance between the first and second camera units, and a setting value of the second camera unit is applied to the first camera unit, so that auto correction of the first camera unit can be accurately performed using final correction information of the second camera unit even when the first and second camera units are of different kinds. FIG. 2 is a view illustrating a mobile terminal having dual camera according to an embodiment.

According to the embodiment, the mobile terminal 100 having the dual camera may include a first camera unit 200 and a second camera unit 300, in addition to a camera unit equipped at the front of the mobile terminal 100.

The first camera unit 200 and the second camera unit 300 may be disposed on the same plane, and may perform photographing in the same direction.

In FIG. 2, it is illustrated that the first and second camera units 200 and 300 are disposed in openings of a back cover 103 of the mobile terminal 100, respectively. However, the present disclosure is not limited thereto, and the first and second camera units 200 and 300 may be disposed at any positions as long as they can perform photographing in the same direction.

For example, the first and second camera units 200 and 300 may be disposed at the front of the mobile terminal 100, and may be disposed at the same side of the mobile terminal 100.

Meanwhile, the first and second camera units 200 and 300 may perform all functions performed by the above-described camera 121.

Meanwhile, a flash 124 is disposed at the back of the mobile terminal 100 to be adjacent to at least one of the first and second cameras 200 and 300. Thus, when at least one of the first and second cameras photographs a subject, the flash 124 emits light toward the subject.

In addition, a back input unit 125 may be provided at the rear of the mobile terminal 100. The back input unit 125 is manipulated to receive a command for controlling an operation of the mobile terminal 100, and a content of the input command may be set variously.

The back input unit may be disposed to overlap with a front display unit 151 in the thickness direction of a terminal body. For example, when a user grabs the terminal body by one hand, the back input unit may be disposed at a back upper end portion of the terminal body so as to facilitate manipulation by using a finger of the user. However, the present disclosure is not limited thereto, and the position of the back input unit may vary.

Figure 3:
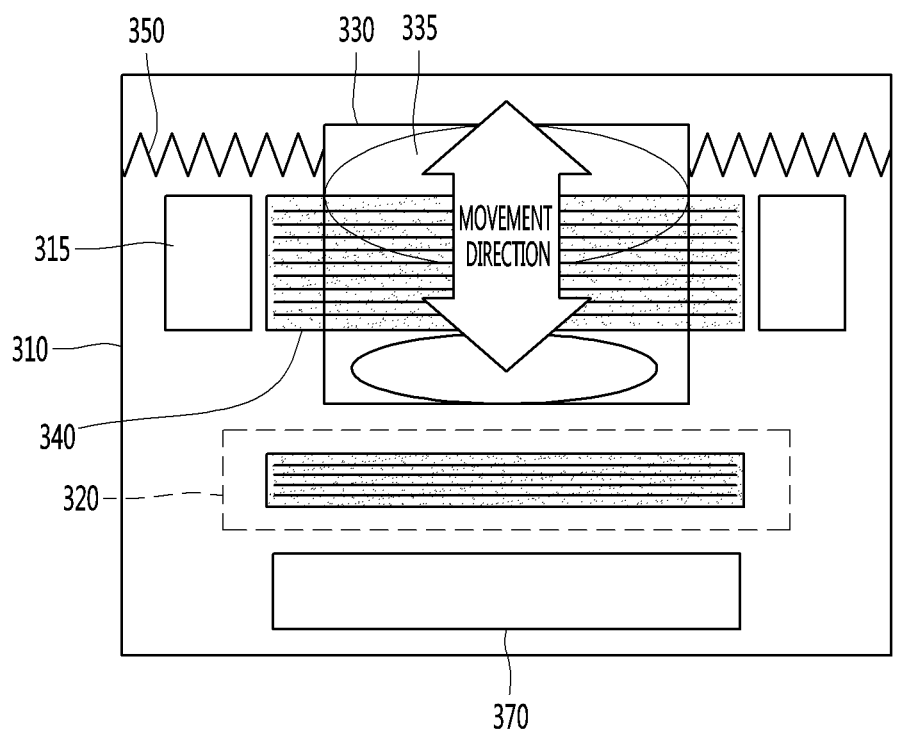
FIGS. 3 and 4 are views illustrating configurations of a first camera unit and a second camera unit according to embodiments.
Figure 4:
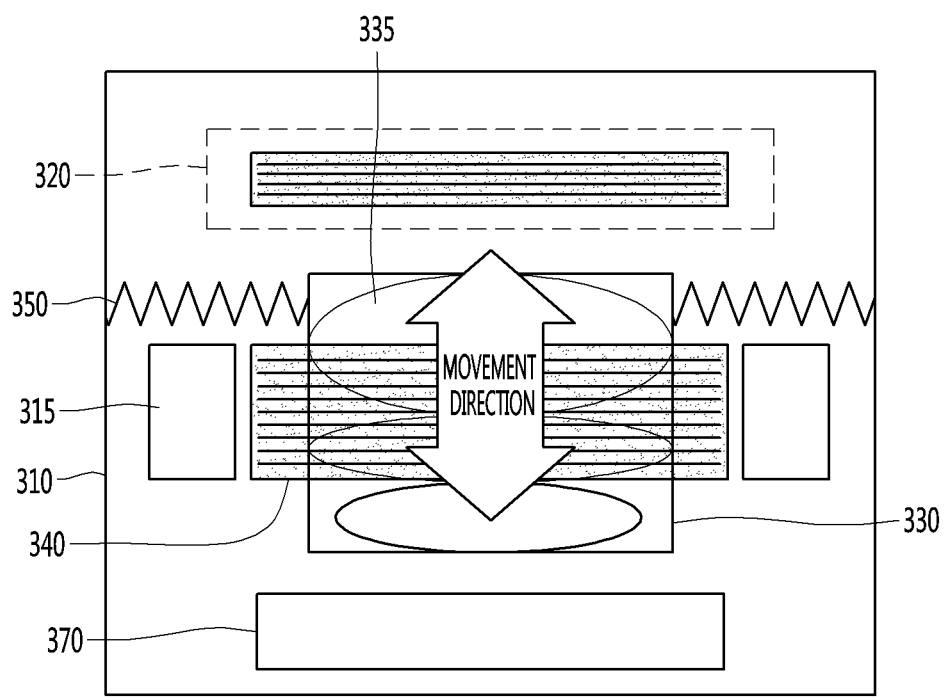

FIGS. 3 and 4 are sectional views illustrating configurations of the first camera unit and the second camera unit according to embodiments.

The following configuration of the first camera unit 200 and the second camera unit 300 is a configuration for performing an auto focus function.

The auto focus function refers to a function in which a lens module is moved to an optimal focal position such that an image of a target object as a subject is clearly received by a sensor, and various types of actuators may be used to move the lens module to the optimal focal position. The performance of auto focus on a camera module may be changed depending on characteristics of an actuator for moving a lens module.

In addition, an auto focus actuator may include various types of actuators such as a voice coil motor (VCM) actuator, an actuator by a piezoelectric force, and a MEMS actuator driven based on a capacitive method.

Hereinafter, it is described that the second camera unit 300 employs a manner using a VCM actuator in which a magnetic circuit is configured by disposing a permanent magnet at a fixed part of a camera module and attaching a coil to a lens module to be driven, so that the lens module is driven by a Lorentz force generated by the coil.

However, the present disclosure is not limited thereto, and the second camera unit 300 may perform auto focus in various manners using an actuator by a piezoelectric force, a MEMS actuator driven based on a capacitive method, and the like.

Meanwhile, in FIGS. 3 to 10, it is described that various components and functions are those of the second camera unit 300. However, the present disclosure is not limited thereto, and the components and functions described in FIGS. 3 to 10 may be those of the first camera unit 200.

Therefore, the first camera unit 200 may perform auto focus in the same manner as the second camera unit 300. For example, both of the first and second camera units 200 and 300 may perform auto focus in a manner using a VCM actuator.

However, the present disclosure is not limited thereto, the first and second camera units 200 and 300 may perform auto focus in different manners. For example, the first camera unit 200 may perform auto focus in a manner using a VCM actuator, and the second camera unit 300 may perform auto focus in a manner using an actuator driven by a piezoelectric force.

In this case, the first camera unit 200 and the second camera unit 300 may have different configurations, and may perform auto focus in different manners.

As shown in FIGS. 3 and 4, a module of the present disclosure may include a fixed part 310 in which a magnet 315 and a fixed coil 320 are disposed, and a movable part 330 in which a lens 335 and a movable coil 340 are disposed.

Here, the fixed part 310 may be a holder having a through-hole formed in a central region thereof. In this case, the magnet 315 may be disposed at an inner surface of the through-hole. For example, only one magnet 315 may be provided. In some cases, the magnet 315 may be provided in plurality.

When the magnet 315 is provided in plurality, the plurality of magnets 315 may be disposed at the same distance from the movable coil. However, in some cases, the plurality of magnets 315 may be disposed at different distances.

In addition, the plurality of magnets 315 may be disposed symmetrically with respect to an axis passing through the center of the through-hole of the fixed part 310.

Here, the reason why the plurality of magnets 315 are disposed symmetrically with respect to the coordinate axis passing through the center of the through-hole of the fixed part 310 is that a displacement value of a current or voltage based on a movement of the movable part 330 as a lens module can be stably detected without any external influence.

In addition, the movable part 330 includes at least one lens 335, and may linearly move in the through-hole of the fixed part 310. Here, the movable part 330 may be a lens module including the lenses 335.

The movable coil 340 surrounds an outer surface of the movable part 330, to move together with the movable part 330.

Here, the movable coil 340 and the magnet 315 constitute an actuator for moving the movable part 330, and may drive the movable part 330 to linearly move in up and down directions.

The fixed coil 320 is disposed at the fixed part 310, to receive, from the movable coil 340, a current or voltage varying depending on a distance of the fixed coil 320 from the movable coil 340.

Here, the fixed coil 320 may be disposed at a constant distance from one side of the movable part 330, and may be located in line with a movement direction of the movable part 330.

Thus, a current or voltage can be induced from the movable coil 340 into the fixed coil 320 by electromagnetic mutual induction.

In this case, the induced current or voltage may vary depending on a distance between the fixed coil 320 and the movable coil 340.

That is, the current or voltage induced into the fixed coil 320 is changed depending on a vertical distance between the fixed coil 320 and the movable coil 340, and a position of the lens module of the movable part 330 may be predicted using the changed current or voltage.

Then, an optimal auto focus position is determined using the predicted position of the lens module, and the movement of the movable part 330 may be controlled such that the lens module is moved to the optimal auto focus position.

The fixed coil 330 is located in a linear movement direction of the movable coil 330. In this case, the fixed coil 330 may be disposed under the movable part 330 as shown in FIG. 3, and may be disposed over the movable part 330 as shown in FIG. 4.

Here, the fixed coil 330 is to be disposed such that, when the movable part 330 linearly moves, the minimum distance between the fixed coil 320 and the movable coil 340 is maintained at 0 or more.

The reason is that if the minimum distance between the fixed coil 320 and the movable coil 340 is smaller than 0, the polarity of a current or voltage received by the fixed coil 320 is changed from a positive polarity to a negative polarity or from a negative polarity to a positive polarity, and therefore, a displacement value of the current or voltage based on distance may not be accurately detected.

In addition, as the distance between the fixed coil 320 and the movable coil 340 is decreased, the variation of the current or voltage based on the distance is decreased. Hence, the nonlinearity of an induction signal received by the fixed coil 320 is increased, and therefore, the displacement value of the current or voltage based on distance may not be accurately detected.

That is, if the fixed coil 320 and the movable coil 340 mechanically overlap with each other, the linearity of the induction signal received by the fixed coil 320 is deteriorated, and the polarity of the induction signal is reversed. Therefore, an auto focus error may occur.

In addition, the fixed coil 320 may be disposed along the circumference of at least one or both of upper and lower surfaces of the holder of the fixed part 310 and an outer surface between the upper and lower surfaces.

Here, a mounting groove for fixing the fixed coil 320 is formed in the holder of the fixed part 310, and the fixed coil 320 may be disposed in the mounting groove of the holder of the fixed part 310.

In addition, the number of turns of the fixed coil 320 and the number of turns of the movable coil 340 may be different from each other.

For example, the number of turns of the fixed coil 320 may be smaller than the number of turns of the movable coil 340.

Here, the reason why the number of turns of the fixed coil 320 is smaller than the number of turns of the movable coil 340 is that the entire size of the camera module can be reduced, and a frequency signal of a current or voltage induced to the fixed coil 320 can be amplified.

In some cases, the number of turns of the fixed coil 320 and the number of turns of the movable coil 340 may be equal to each other.

In addition, the movable coil 340 may receive a drive signal in which a high-frequency signal is carried in a low-frequency signal to transmit the drive signal to the fixed coil.

That is, the drive signal applied to the movable coil 340 of the movable part 330 may be a signal in which an arbitrary high-frequency signal is synthesized with a low-frequency drive signal.

Therefore, the fixed coil may receive a frequency signal of a current or voltage induced from the movable coil 340 by electromagnetic induction. In this case, the received frequency signal may be a signal in which a high-frequency signal is synthesized with a low-frequency signal.

Here, the reason why the drive signal in which the high-frequency signal is synthesized with the low-frequency is applied to the movable coil 340 is that as the frequency signal of the current or voltage induced to the fixed coil 320 by the electromagnetic induction is amplified, the displacement value of the current or voltage can be easily detected.

That is, the low-frequency signal of the drive signal is a signal component for moving the movable part 330, and the high-frequency signal synthesized with the drive signal is a signal component for sensing a movement position of the movable part 330. The high-frequency signal may be a signal having a higher frequency than the drive signal.

For example, the high-frequency signal synthesized with the drive signal may have a frequency of about 100 kHz to 5 MHz, but the present disclosure is not limited thereto.

Thus, a focus position calculator of the camera module detects a high-frequency signal included in a drive signal, thereby calculating a focus position value of the movable part 330, based on the detected high-frequency signal.

In addition, the movable coil 340 may be electrically connected to a wire 350 such that a drive current or drive voltage is input to the movable coil 340 through the wire 350, and the fixed coil 320 may be electrically connected to the wire 350 such that a current or voltage received from the movable coil 340 is output from the fixed coil 320 through the wire 350.

Here, the wire 350 may be a spring connected between the fixed part 310 and the movable part 330 to provide an elastic force corresponding to movement of the movable part 330.

For example, the movable coil 340 may be electrically connected to first and second wires such that a drive current or drive voltage is input to the movable coil 340 through the first and second wires, and the fixed coil 320 may be electrically connected to third and fourth wires such that a current or voltage received from the movable coil 340 is output from the fixed coil 320 through the third and fourth wires.

Here, the first wire may be electrically connected to a positive terminal of a power source providing a current or voltage to the movable coil 340, and the second wire may be electrically connected to a negative terminal of the power source.

In addition, the third wire may be electrically connected to a positive terminal of an auto focus controller, and the fourth wire may be electrically connected to a negative terminal of the auto focus controller.

Here, the auto focus controller may calculate a focus position value based on a displacement value of the current or voltage received from the fixed coil 320, and control the movement of the movable part 330 based on the calculated focus position value.

In addition, a damper (not shown) may be disposed between the wire 350 and the fixed part 310.

Here, the damper may be disposed adjacent to a connection terminal between the wire 350 and the fixed part 310.

In this case, the damper is provided for the purpose of suppressing natural vibration of the wire 350 as a spring. Thus, the damper reduces hysteresis characteristics, thereby preventing an auto focus error.

Figure 5:
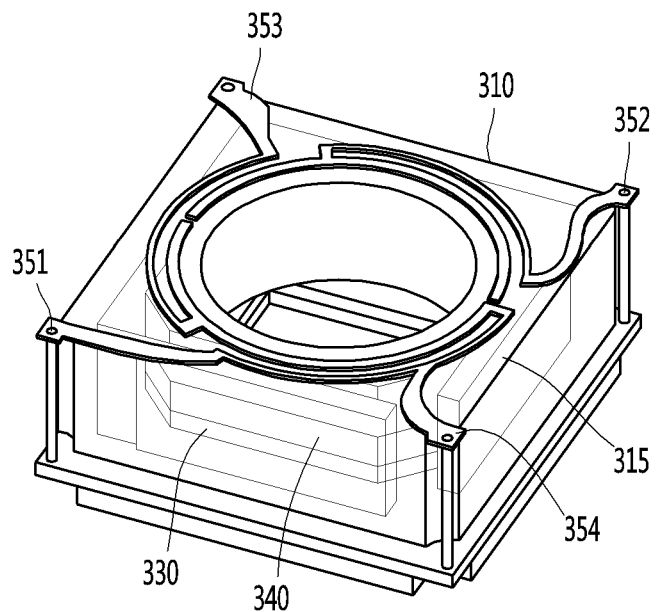
FIGS. 5, 6, and 7 are views illustrating examples of electric wires of a movable coil and a fixed coil.
Figure 6:
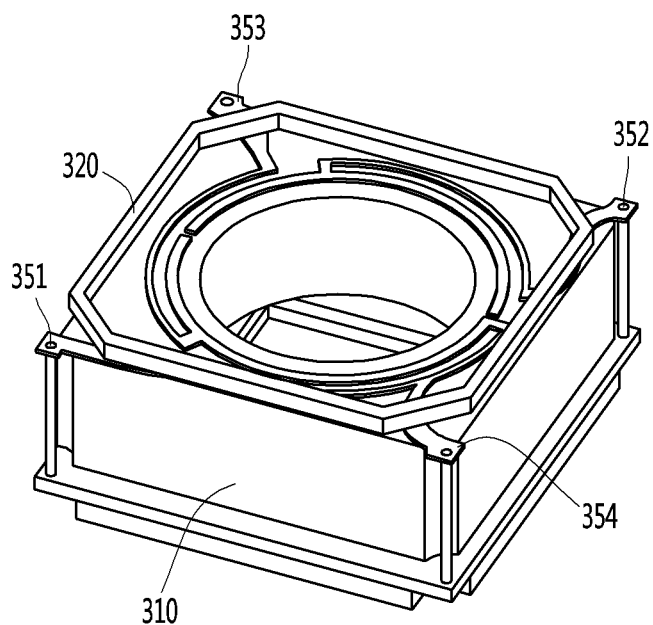
Figure 7:
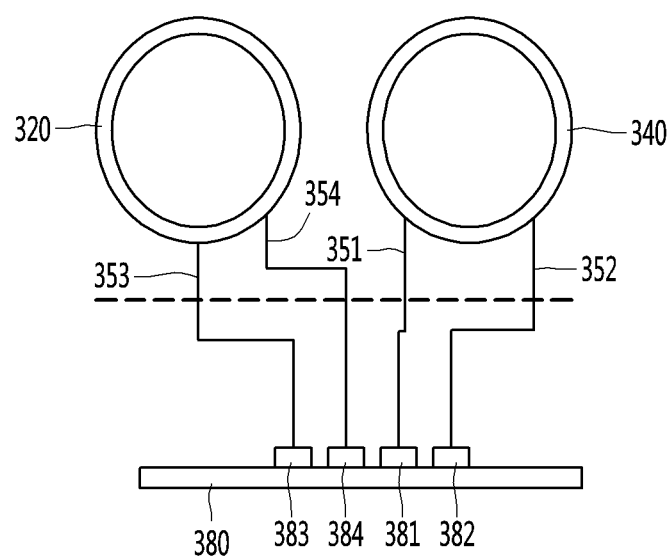

FIGS. 5 to 7 are views illustrating electric wires of the movable coil and the fixed coil.

As shown in FIGS. 5 to 7, the fixed coil 320 may be disposed at the fixed part 310 to receive, from the movable coil 340, a current or voltage varying based on a distance from the movable coil 340.

Here, the movable coil 340 may be electrically connected to first and second wires 351 and 352 such that a drive current or drive voltage is input to the movable coil 340 through the first and second wires 351 and 352, and the fixed coil 320 may be electrically connected to third and fourth wires 353 and 354 such that a current or voltage received from the movable coil 340 is output from the fixed coil 320 through the third and fourth wires 353 and 354.

For example, the first, second, third, and fourth wires 351, 352, 353, and 354 may be connected between the fixed part 310 and the movable part 330, to serve as a spring for providing an elastic force corresponding to movement of the movable part 330 and simultaneously serve as electric wires electrically connected to terminals of a circuit board 380.

Here, the first wire 351 may be electrically connected to one end of the movable coil 340 and a positive terminal 381 of a power source providing a current or voltage to the movable coil 340, and the second wire 352 may be electrically connected to another end of the movable coil 340 and a negative terminal 382 of the power source.

In addition, the third wire 353 may be electrically connected to one end of the fixed coil 320 and a positive terminal 383 of an auto focus controller, and the fourth wire 354 may be electrically connected to another end of the fixed coil 320 and a negative terminal 384 of the auto focus controller.

As described above, in the present disclosure, springs connected between the fixed part 310 and the movable part 320 are used as electric wires of the fixed coil and the movable coil, so that it is possible to minimize the number of electric wires and simplify the design of electric wires, thereby improving the productivity and reliability of products.

Figure 8:
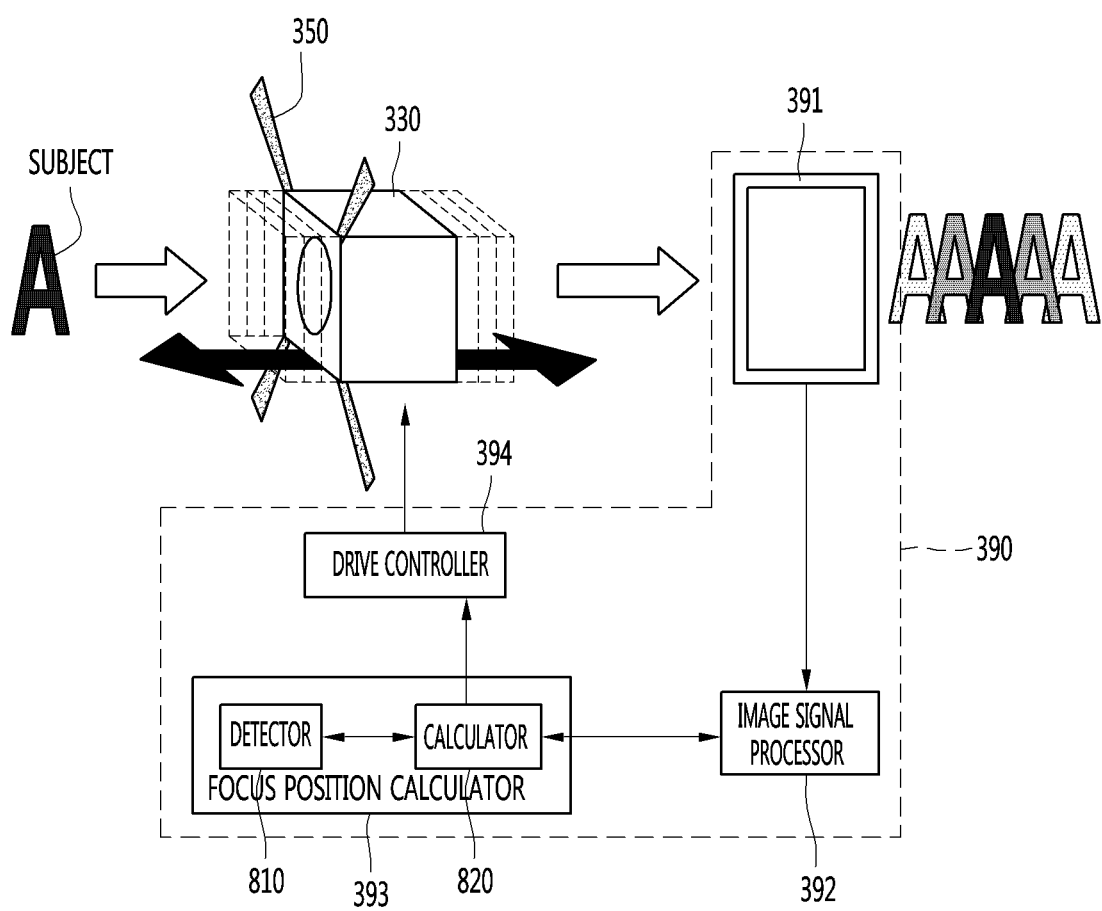
FIG. 8 is a block configuration diagram illustrating an auto focus controller of a camera module according to an embodiment.

FIG. 8 is a block configuration diagram illustrating an auto focus controller of the camera module according to an embodiment.

As shown in FIG. 8, the camera module of the present disclosure may include an auto focus controller 390 that controls auto focus of the movable part 330 as a lens module.

The auto focus controller 390 may include an image sensor 391, an image signal processor 392, a focus position calculator 393, and a drive controller 394.

Here, the image sensor 391 is connected to the fixed part through the wire 350 as a spring to sense an image of a subject, which is incident through the lens of the movable part 330 moved to perform the auto focus.

Then, the image signal processor 392 processes an image signal sensed by the image sensor 391.

Subsequently, the focus position calculator 393 may calculate a focus position value, based on the image signal processed by the image signal processor 392 and the displacement value of the current or voltage received from the fixed coil.

Here, the focus position calculator 393 may include a detector 810 that detects a displacement value of a current or voltage from the fixed coil, and a calculator 820 that calculates a focus position value of the movable part 330, based on the image signal processed by the image signal processor 392 and the displacement value of the current or voltage detected by the detector 810.

That is, the calculator 820 may extract an image having the highest contrast by comparing contrasts of signal-processed images, and determine, as an optimal focus position, a position of the movable part 330, at which the extracted image is photographed.

Next, the drive controller 394 may control the movable part 330 to move based on the calculated focus position value.

As described above, the auto focus method of the present disclosure may be a contrast focus method in which a focus position is calculated using an image contrast of a subject.

Figure 9:
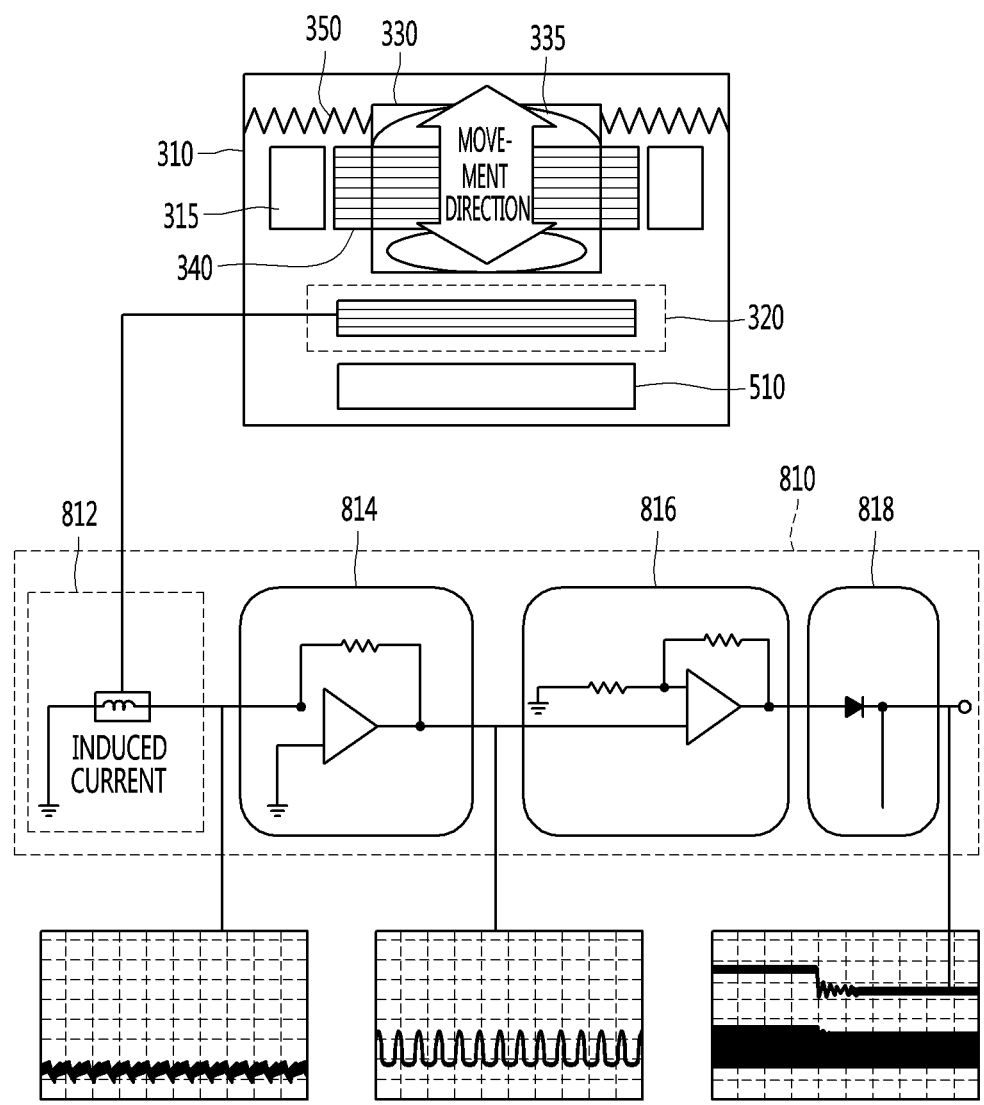
FIG. 9 is a circuit diagram illustrating a detector of FIG. 8.

FIG. 9 is a circuit diagram illustrating the detector of FIG. 8.

As shown in FIG. 9, in the camera module of the present disclosure, the permanent magnet 315 is disposed in the fixed part 310, and the movable coil 340 is disposed at the movable part 330, thereby constituting the magnetic circuit. The camera module employs a manner in that the movable part 330 is moved as the lens module is driven by a Lorentz force of current flowing in the coil.

In addition, the fixed coil 320 is disposed at the fixed part 310, to receive, from the movable coil 340, a current or voltage varying based on a distance from the movable coil 340.

Here, the fixed coil 320 may be disposed at a constant distance from one side of the movable part 330, and may be located in line with a movement direction of the movable part 330.

Thus, a current or voltage can be induced from the movable coil 340 into the fixed coil 320 by electromagnetic mutual induction.

In this case, the induced current or voltage may vary depending on a distance between the fixed coil 320 and the movable coil 340.

That is, the current or voltage induced into the fixed coil 320 is changed depending on a vertical distance between the fixed coil 320 and the movable coil 340, and a position of the lens module of the movable part 330 may be predicted using the changed current or voltage.

Thus, the detector 810 can detect a displacement value of the current or voltage received from the fixed coil 320.

Here, the detector 810 may include a half-wave rectifier 812, a converter 814, an amplifier 816, and a peak detector 818, but the present disclosure is not limited thereto.

First, the half-wave rectifier 812 of the detector 810 may rectify, into a half-wave signal, a frequency signal of the current or voltage received from the fixed coil 320.

Then, the converter 814 of the detector 810 may convert, into a current or voltage, the half-wave signal received from the half-wave rectifier 812.

Subsequently, the amplifier 816 of the detector 810 may amplify a frequency signal of the current or voltage converted by the converter 814.

Next, the peak detector 818 of the detector 810 may detect a peak of the frequency signal amplified by the amplifier.

For example, if a current is induced in the fixed coil 320, the half-wave rectifier 812 rectifies a frequency signal of the induced current into a half-wave signal.

Then, the converter 814 is a current-voltage conversion circuit for converting a current into a voltage, and converts, into a voltage, the current of which frequency signal is rectified into the half-wave signal.

Subsequently, the amplifier 816 amplifies the converted voltage.

Next, the peak detector 818 detects a peak value of the amplified voltage, thereby outputting the detected peak value.

As described above, the detector 810 detects a displacement value of the current or voltage received from the fixed coil 320, and the auto focus controller for controlling the auto focus of the movable part 330 as the lens module estimates a position value of the lens module of the movable part 330 using the detected displacement value.

In addition, the auto focus controller finds out an optimal auto focus position using the estimated position value of the lens module, and controls the movement of the movable part 330 such that the lens module is moved to the optimal auto focus position.

Figure 10:
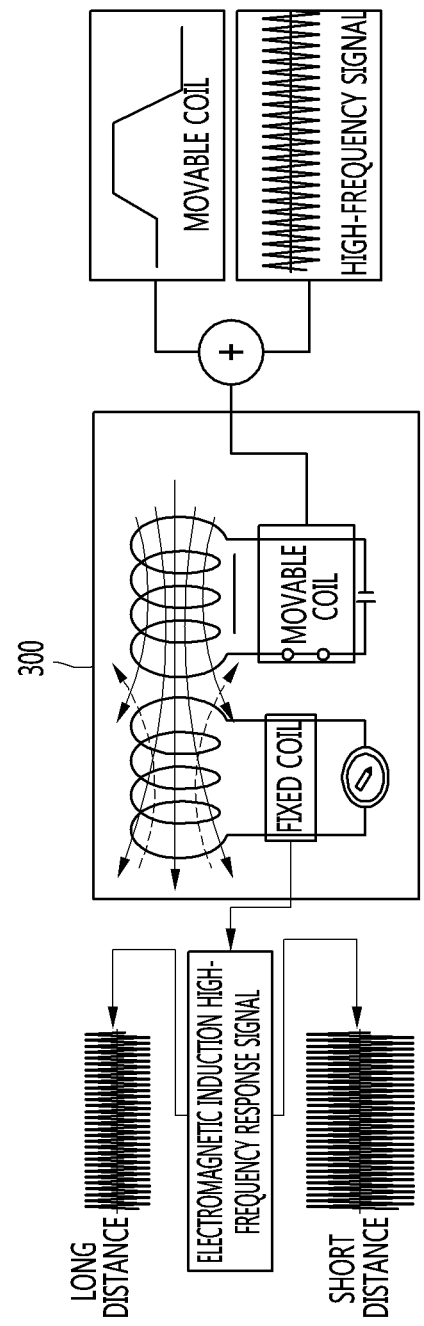
FIG. 10 is a view illustrating electromagnetic induction between the fixed coil and the movable coil of FIG. 3.

FIG. 10 is a view illustrating electromagnetic induction between the fixed coil and the movable coil of FIG. 3.

As shown in FIG. 10, the movable coil of the second camera unit 300 may receive a drive signal in which a high-frequency signal is carried in a low-frequency signal to transmit the drive signal to the fixed coil.

That is, the drive signal applied to the movable coil of the movable part may be a signal in which an arbitrary high-frequency signal is synthesized with a low-frequency drive signal.

Therefore, the fixed coil may receive a frequency signal of a current or voltage induced from the movable coil by electromagnetic induction. In this case, the received frequency signal may be a signal in which a high-frequency signal is synthesized with a low-frequency signal.

Here, an electromagnetic induction high frequency response signal received in the fixed coil may be decreased as the distance between the fixed coil and the movable coil increased, and the electromagnetic induction high frequency response signal received in the fixed coil may be increased as the distance between the fixed coil and the movable coil is decreased.

The electromagnetic induction high frequency response signal received at the fixed coil is varied based on the distance between the fixed coil and the movable coil. Accordingly, the detector detects the displacement value of the current or voltage received by the fixed coil, and the auto focus controller estimates a position value of the lens module of the movable part 330, using the detected displacement value.

In addition, the auto focus controller may determine an optimal auto focus position value, using the estimated position value of the lens module, and control the movement of the movable part such that the lens module is moved to the optimal auto focus position value.

When a drive signal is applied to the movable coil of the movable part, the auto focus controller may synthesize an arbitrary high-frequency signal with the drive signal as a low-frequency signal through the drive controller.

Here, the low-frequency signal of the drive signal is a signal component for moving the movable part, and the high-frequency signal synthesized with the drive signal is a signal component for sensing a movement position of the movable part. The high-frequency signal may be a signal having a higher frequency than the drive signal.

For example, the high-frequency signal synthesized with the drive signal may have a frequency of about 100 kHz to 5 MHz, but the present disclosure is not limited thereto.

In addition, the auto focus controller may detect a high-frequency signal from the signal received by the fixed coil through the detector, and calculate a focus position value of the movable part through the calculator, based on the detected high-frequency signal.

Here, the reason why the drive signal, in which the high-frequency signal is synthesized with the low-frequency, is applied to the movable coil is that as the frequency signal of the current or voltage induced to the fixed coil by the electromagnetic induction is amplified, the displacement value of the current or voltage can be easily detected.

Meanwhile, a portion or all of the functions performed by the auto focus controller 390 may be performed by the controller 180. As an example, the controller may process an image sensor sensed by the image sensor 391. As another example, the controller may extract an image having the highest contrast by comparing contrasts of signal-processed images, and determine, as an optimal focus position, a position of the movable part 330, at which the extracted image is photographed. As still another example, the controller 180 may transmit a control signal to the drive controller 394 to move the movable part 330 to the calculated focus position.

Figure 11A:
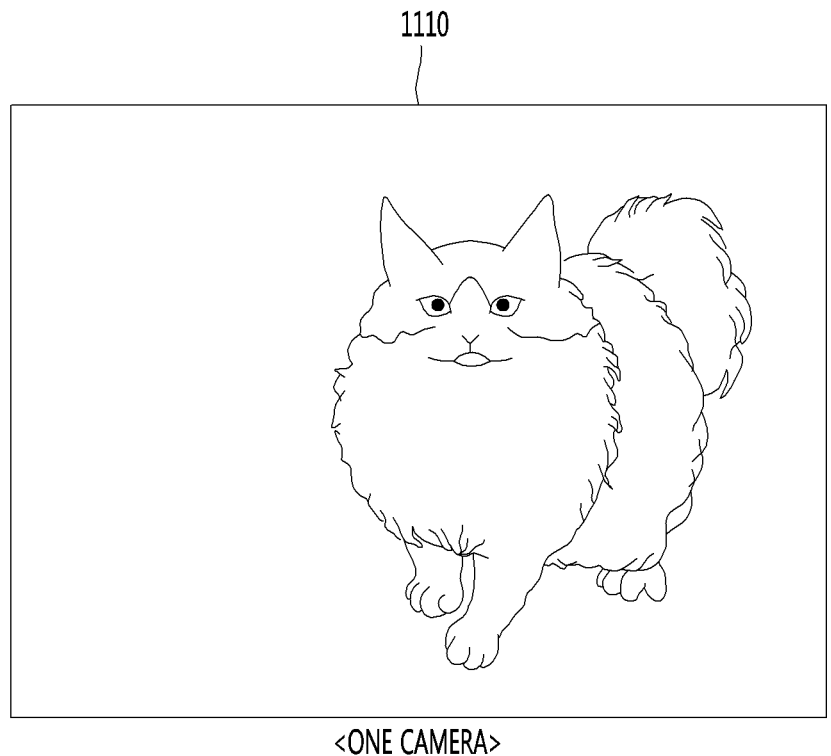
FIGS. 11A, 11B, and 11C are views illustrating distortions that may occur when a moving picture is photographed according to an embodiment.
Figure 11B:
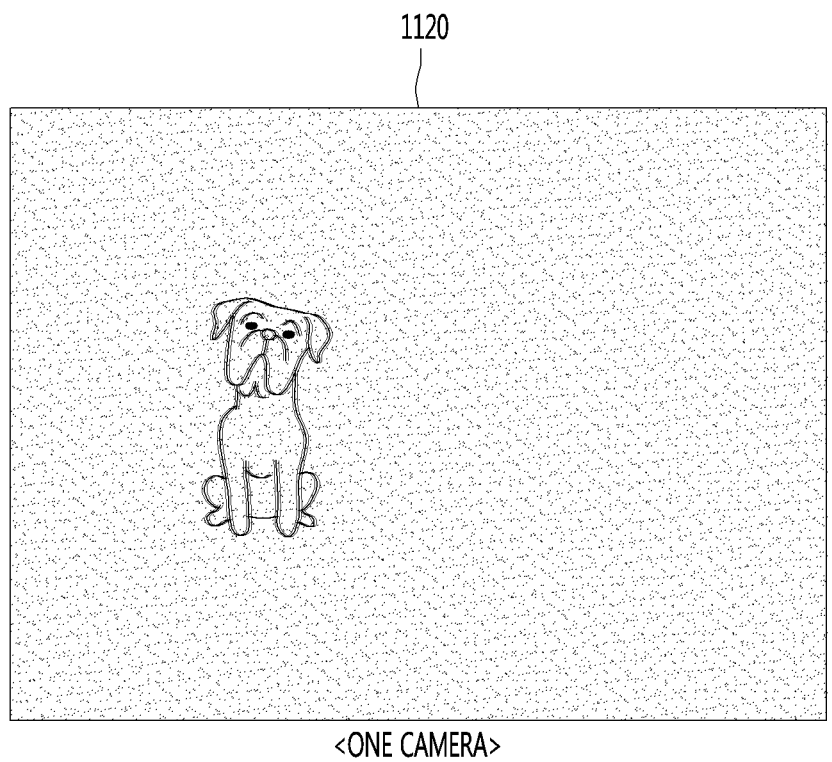
Figure 11C:
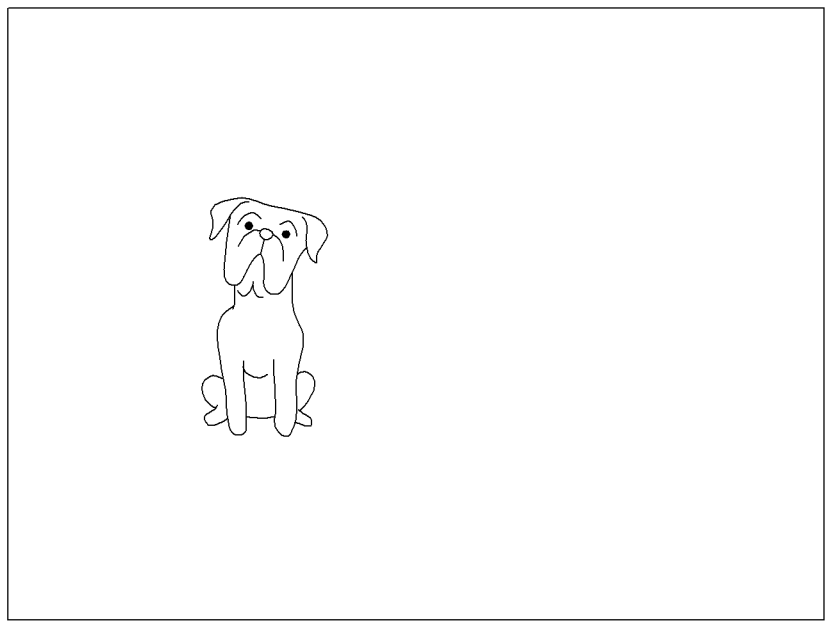

FIGS. 11A to 11C are views illustrating distortions that may occur when a moving picture is photographed according to an embodiment.

When a moving picture is photographed, a sudden change in focus may occur.

Examples of the sudden change may include when a subject that has been focused disappears and a new subject appears as the position or direction of a photographing apparatus is suddenly changed, when the position of a subject that has been focused on an image of the subject is suddenly changed as the position or direction of a photographing apparatus is suddenly changed, when the position of a subject that has been focused on an image of the subject is suddenly changed as the subject moves at high speed, when an object to be focused is changed from a first subject to a second subject through a user input as two or more subjects exist in an image received through a camera, and the like.

In the case of a manual focusing scheme, a user directly adjusts a setting of a photographing apparatus, thereby changing focal distance or point. On the other hand, in an auto focus scheme, a setting of a photographing apparatus is automatically adjusted in the photographing apparatus, thereby changing focal distance or point.

However, when a new focal distance or point is set by the auto focus scheme due to a sudden change in focus, a lens moves to detect an accurate focal position. In this case, undesired images may be received and recorded.

For example, in the case of a contrast based auto focus scheme, a process of moving a lens to a position of infinity distance focus and then moving the lens to a correct focal position may be recorded. In the case of a laser auto focus scheme or a phase detect auto focus scheme, undesired images may also be recorded when an accurate operation is not performed, such as when photography is performed in very bright conditions or other conditions which make phase detect auto focus difficult.

In addition, there has recently been proposed a scheme in which a portion or all of the laser auto focus scheme, the phase detect auto focus scheme, the contrast based auto focus scheme, and other auto focus schemes are combined, for example by performing primary tuning using the laser auto focus scheme, the phase detect auto focus scheme, etc. and performing final tuning using the contrast based auto focus scheme. However, in this case, the laser auto focus scheme or the phase detect auto focus scheme may not perform an accurate operation. When the final tuning is performed using the contrast based auto focus scheme, undesired images during autofocusing may also be recorded.

FIGS. 11A to 11C illustrate the above-described examples. As the position or direction of a photographing apparatus is suddenly changed while a first image 1110 is being photographed as shown in FIG. 11A, a subject that has been focused may move out of the frame, and a second image 1120 (which includes a new subject) may be photographed. In the example of Figure, 11A, a user may initially intent to photograph the cat which is in focus, but when the cat quickly moves out of the frame, the dog of 11B may become the subject, which is now out of focus. In this case, the photographing apparatus sets an accurate focus by moving a lens. However, in this process, a distortion of the image may occur such as a ripple, shown in the second image 1120 in FIG. 11B. The distortion may be continued until a focus is accurately set as shown in FIG. 11C.

Meanwhile, a distortion of an image may occur due to a sudden change in exposure. For example, while the photographing apparatus is being used in a dim or low light environment, and then suddenly as a result of a change in lighting or the apparatus being moved to a bright environment overexposure of captured images may occur while the exposure settings are adjusted.

In addition, there may occur color balance distortion of images in some frames due to a sudden change in lighting temperature. For example, in the case of a photographing apparatus having no color spectrum sensor, an auto white balance correction is performed based on only R, G, and B values obtained by an image sensor, and hence distortions may occur in images in many frames. In the case of a photographing apparatus having a color spectrum sensor, a tuning process is required, which is performed by comparing a value obtained by an image sensor with a value obtained by the color spectrum sensor, and hence distortions may occur in images in some frames.

Figure 12:
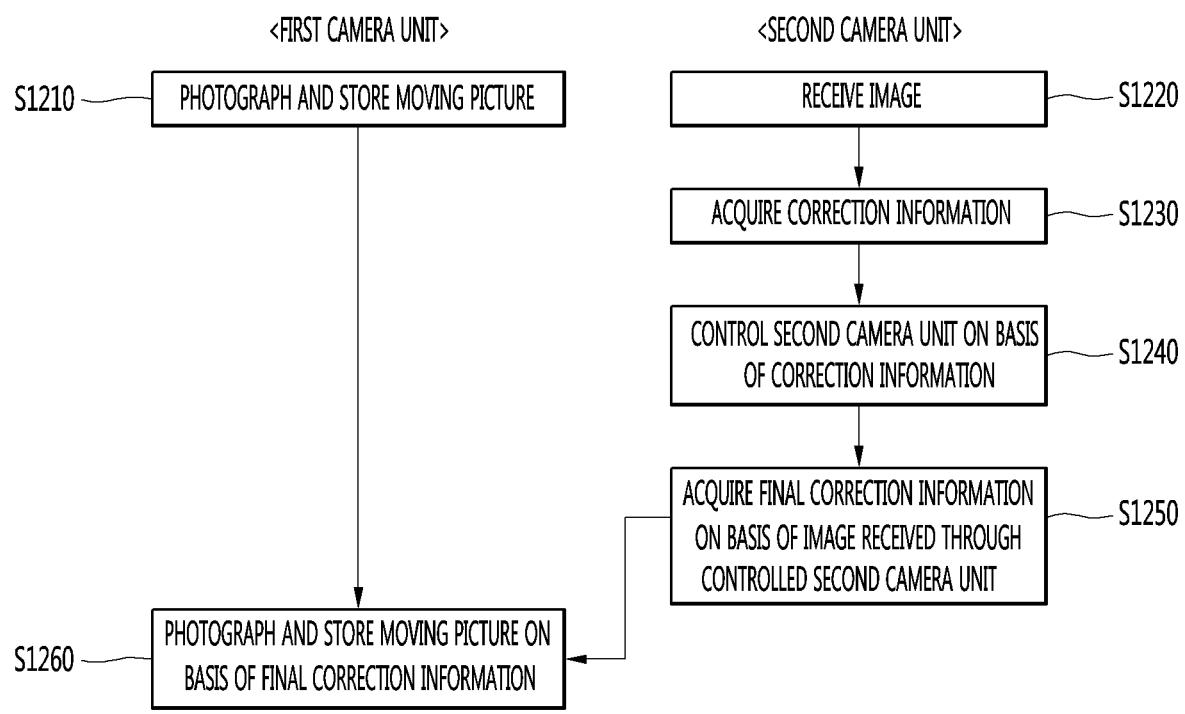
FIG. 12 is a flowchart illustrating a moving picture capturing method of a moving picture capturing apparatus having dual camera according to an embodiment.

FIG. 12 is a flowchart illustrating a moving picture capturing method of a moving picture capturing apparatus having dual camera according to an embodiment.

Here, steps (S1210 and 1260) of a left portion of the flowchart are steps which may utilize at least one of the first camera unit 200 and the controller 180 of the mobile terminal 100 having the dual camera together with other components, and steps (S1220, S1230, S1240, and S1250) are steps which may utilize at least one of the second camera unit 300 and the controller 180 of the mobile terminal 100 having the dual cameradual camera together with other components.

Meanwhile, in the following embodiments, it is described that the present disclosure is implemented in the mobile terminal having the dual camera, but the present disclosure is not limited thereto.

That is, the present disclosure may be applied to photographing apparatuses having a dual camera, which can perform capture of moving pictures or all electronic devices having dual camera, which can perform capture of moving pictures. In addition, a photographing apparatus or electronic device having a dual camera, which can perform capture of moving pictures, may include a portion or all of the components of the mobile terminal 100 described in FIG. 1. For example, a photographing apparatus having a dual camera, which can perform capture of moving pictures, may include an input unit for receiving an input from a user or a sensing unit for detecting a movement of the photographing apparatus.

According to the embodiment, the moving picture capturing method of the moving picture capturing apparatus having the dual camera may include a step (S1210) of photographing a moving picture using the first camera unit 200, a step (S1220) of receiving an image through the second camera unit 300, a step (S1230) of acquiring correction information on the basis of the image received through the second camera 300, a step (S1240) of controlling the second camera unit 300 on the basis of the acquired correction information, a step (S1250) of acquiring final correction information on the basis of an image received through the controlled second camera unit 300, and a step (S1260) of controlling the first camera unit 200 to photograph a moving picture on the basis of the final correction information.

Here, the step (S1210) of photographing the moving picture using the first camera unit 200 and the step (S1220) of receiving the image through the second camera unit 300 will be described in detail with reference to FIG. 13.

Figure 13:
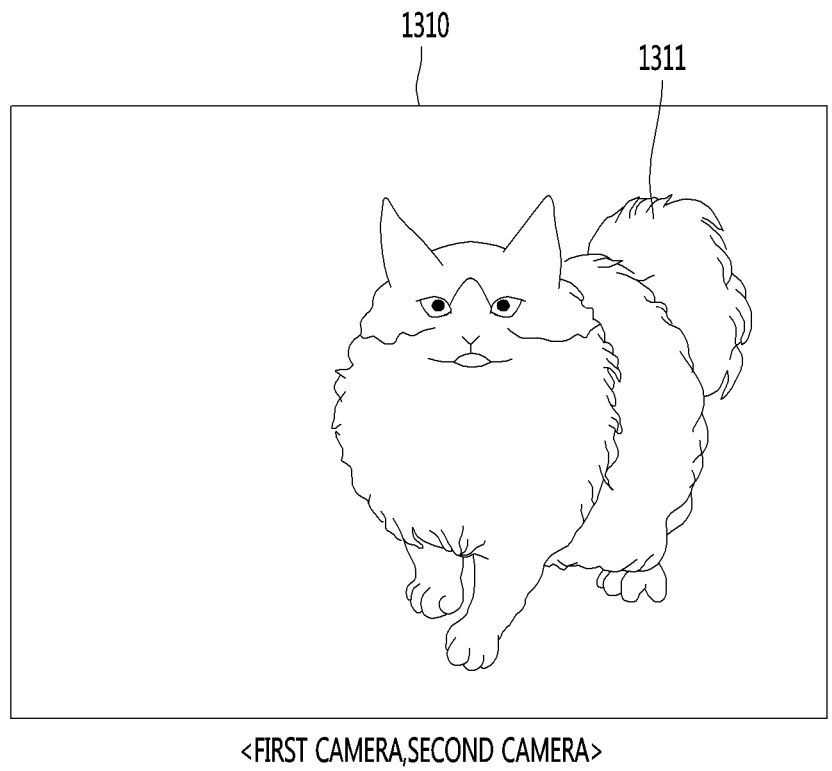
FIG. 13 is a view illustrating an image received through the first camera unit and the second camera unit according to an embodiment.

FIG. 13 is a view illustrating an image received through the first camera unit 300 and the second camera unit 200 according to an embodiment.

The controller 180 may photograph a moving picture using the first camera unit 200. Specifically, the first camera unit 200 may receive an image. Also, the first camera unit 200 may process an image frame of a moving picture acquired by an image sensor included in the first camera unit 200.

The processed image frame is stored in the storage unit 170 under the control of the controller 180, so that the controller 180 can photograph a moving picture using the first camera unit 200 and record the photographed moving picture.

Meanwhile, the second camera unit 300 may receive an image.

Here, the image received by the second camera unit 300 may be the same image as that received by the first camera unit 200. Specifically, since the first and second camera units 200 and 300 are equipped to face the same direction, the second camera unit 300 may receive the same image as the first camera unit 200. For example, the first and second camera units 200 and 300 may be disposed at the same side of the mobile terminal 100.

In addition, the second camera unit 300 may process an image frame of a still picture or moving picture acquired by an image sensor of the second camera unit 300.

The controller 180 may acquire information on whether focus must be adjusted for a subject 1311 based on an image 1310 received through the second camera unit 300.

Meanwhile, when the focus of the subject is not adjusted, the controller 180 may acquire correction information. Specifically, while the moving picture is being photographed using the first camera unit 200, the controller 180 may continuously acquire correction information on the basis of the image 1310 received through the second camera unit 300.

Here, the correction information acquired on the basis of the image 1310 received through the second camera unit 300 may be at least one of control information for auto focus of the second camera unit 300, control information for auto exposure of the second camera unit 300, and control information for auto white balance of the second camera unit 300.

Here, the control information for auto focus of the second camera unit 300 may include position information of the lens for adjusting focus or information such as ISO, shutter speed, exposure time, and the like, for securing the amount of light required to adjust the focus.

The control information for auto focus of the second camera unit 300 to adjust a focus on the subject 1311 may be acquired through various schemes.

As an example, in the contrast based auto focus scheme, the controller 180 may acquire a plurality of image frames while moving the lens of the second camera unit 300 until correct focus is obtained, thereby acquiring the control information for auto focus of the second camera unit 300.

As another example, in the phase detect auto focus scheme, the controller 180 may acquire the control information for auto focus of the second camera unit 300 based on a phase difference between two images. Meanwhile, the second camera unit 300 may include a phase difference controller (not shown) for determining a distance from a subject on the basis of a phase difference between the two images.

As still another example, in the laser auto focus scheme, the controller 180 may determine a distance from a subject using laser, thereby acquiring the control information for auto focus of the second camera unit 300. In other embodiments, an ultrasonic wave, infrared light, and the like may be also used to determine the distance from the subject. To this end, the second camera unit 300 may include a light irradiation unit (not shown) for irradiating light and a light receiving unit (not shown) for receiving light reflected from a subject.

In addition, the controller 180 may acquire the control information for auto focus of the second camera unit 300 by combining some or all of the above-described various schemes.

Meanwhile, the controller 180 may determine whether the focus of the subject 1311 is correct based on an image received through the second camera unit 180. When the focus of the subject 1311 is correct, the controller 180 may maintain a setting value of the second camera unit 200 for auto focus, i.e., a position of the lens of the second camera unit 300 without any change.

Also, the controller 180 may acquire information on the amount of light from the image received through the second camera unit 300, thereby acquiring the control information for securing the amount of light required to adjust the focus.

Meanwhile, the controller 180 may acquire the control information for auto exposure of the second camera unit 300. Specifically, the controller 180 may acquire information on the amount of light from an image received through the second camera unit 300, and acquire control information (ISO or exposure time information) for securing the amount of light corresponding to a preset exposure value. In addition, even when auto focus is performed, the controller 180 may acquire information on the amount of light from an image received through the second camera unit 300, and acquire control information (ISO or exposure time information) for securing the amount of light required to adjust the focus of a subject.

Meanwhile, the controller 180 may acquire the control information for auto white balance of the second camera unit 300.

Specifically, the second camera unit 300 may include a color spectrum sensor (not shown) for determining a color balance of an image received through the second camera unit 300. The controller 180 may compare a sensing value obtained from the color spectrum sensor (not shown) with a sensing value obtained from the image sensor 391, thereby acquiring the control information for auto white balance of the second camera unit 300.

In addition, when the second camera unit 300 does not include the color spectrum sensor (not shown), the controller 180 may acquire the control information for auto white balance of the second camera unit 300, using R, G, and B values obtained from the image sensor 391.

In another embodiment, the second camera unit 300 may include a white balance controller (not shown), and the acquisition of the control information for auto white balance may be performed by the white balance controller (not shown) under the control of the controller 180. Also, the white balance controller (not shown) may correct white balance of an image received through the second camera unit 300 using the control information for auto white balance under the control of the controller 180.

The image received through the first camera unit 200 may be an image recorded under the control of controller 180 or output through the display unit 151.

In other embodiments, the image received through the second camera unit 300 is merely an image used to acquire the control information for auto focus of the second camera unit 300, the control information for auto exposure of the second camera unit 300, or the control information for auto white balance of the second camera unit 300, and may not be a recorded or output image. However, in order to acquire the control information, one or more image frames in which the image received through the second camera unit 300 is processed may be stored in the storage unit 170.

Referring back to FIG. 12, the moving picture capturing method according to the embodiment may include the step (S1230) of acquiring the correction information based on the image received through the second camera unit.

This will be described in detail with reference to FIGS. 14A and 14B.

Figure 14A:
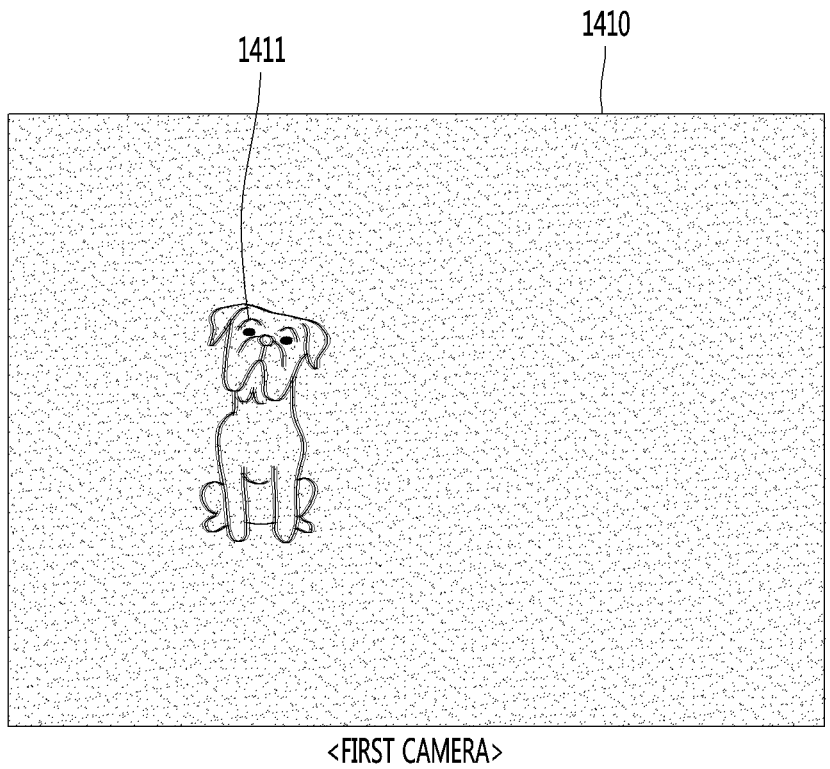
FIGS. 14A and 14B are views illustrating a case where a sudden change in focus is to be performed due to a change in image according to an embodiment.
Figure 14B:
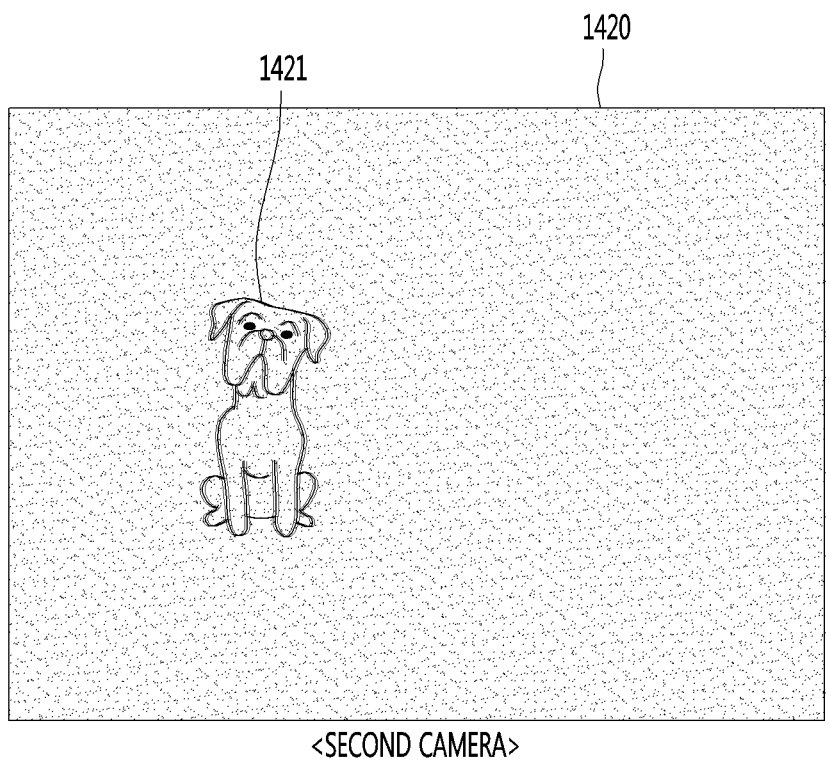

FIGS. 14A and 14B are views illustrating a case where a sudden change in focus is to be performed due to a change in the image according to an embodiment.

When a user of the mobile terminal 100 changes a photographing direction, the mobile terminal 100 receives a new image. Here, the new image may include a new subject 1411 to be focused, and the focal position or distance may be changed from a previous setting before the direction is changed.

In this case, the first camera unit 200 continuously performs capturing of the moving picture. Specifically, the controller 180 may process image frames of a moving picture received while the photographing direction is being changed and a moving picture received after the photographing direction is changed, and store the processed image frames in the storage unit 170.

FIG. 14A is a view illustrating one scene 1410 of a moving picture captured using the first camera unit 200.

When a sudden change in focus is to be performed due to a change in the image, a setting value of the first camera unit 200 for auto focus (AF), auto exposure (AE), and auto white balance (AWB) may not be changed.

For example, as shown in FIG. 14A, even when the subject to be focused is changed due to a change in the received image, the controller 180 may control the first camera unit 200 to maintain a previous focus value or focal point without any focal adjustment. That is, the controller 180 may control the first camera unit 200 to maintain the current position of the lens included in the first camera unit 200.

In addition, when the amount of light received through the first camera unit 200 is changed due to a change in the received image, the controller 180 may control the first camera unit 200 to maintain a previous exposure value without adjusting to adjust the focus of the changed subject 1411. That is, the controller 180 may control the first camera unit 200 to maintain at least one of ISO or exposure time of the first camera unit 200.

FIG. 14B is a view illustrating an image 1420 photographed using the second camera unit 300.

With regard to FIG. 13, it was discussed that while the moving picture is being captured using the first camera unit 200, the controller 180 continuously acquires correction information based on the image received through the second camera unit 300.

When a focus is to be changed due to a change in the image, the controller 180 may utilize the correction information acquired based on the image received through the second camera unit 300.

Here, the correction information acquired based on the image received through the second camera unit 300 may related to auto focus of the second camera unit 300.

Specifically, when the image received through the second camera unit 300 is changed, the controller 180 may determine whether the focus of a subject 1421 in the image received through the second camera unit 300 is correctly adjusted.

When the focus of the subject 1421 in the image received through the second camera unit 300 is not correctly adjusted, the controller 180 may acquire correction information for adjusting the focus of the subject 1421 in the image of the second camera unit.

The acquired correction information may be the control information for auto focusing of the second camera unit 300.

Specifically, the control information for auto focus of the second camera unit 300 may be information on a position of the lens for adjusting the focus of the subject 1421. Also, the control information for auto focus of the second camera unit 300 may be information on which direction and how far the lens included in the second camera unit 300 is to move from a current position.

As an example, in the contrast based auto focus scheme, the controller 180 may calculate information on a position of the lens, at which the contrast of the subject 1421 is maximized while moving the lens included in the second camera unit 300. In this case, the control information for auto focus of the second camera unit 300 may be information on a position of the lens, at which the contrast of the subject 1421 is maximized.

As another example, in the phase detect auto focus scheme, the controller 180 may acquire information on a position of the lens included in the second camera unit 300 based on a phase difference between two images acquired through the second camera unit 300.

As still another example, in the laser auto focus scheme, the controller 180 may acquire information on a position of the lens, at which the focus of the subject 1421 to be focused can be adjusted based on a distance from the subject 1421 to be focused.

The moving picture capturing method according to the embodiment may include the step (S1240) of controlling the second camera unit 300 on the basis of the acquired correction information. This will be described in detail with reference to FIGS. 15A and 15B.

Figure 15A:
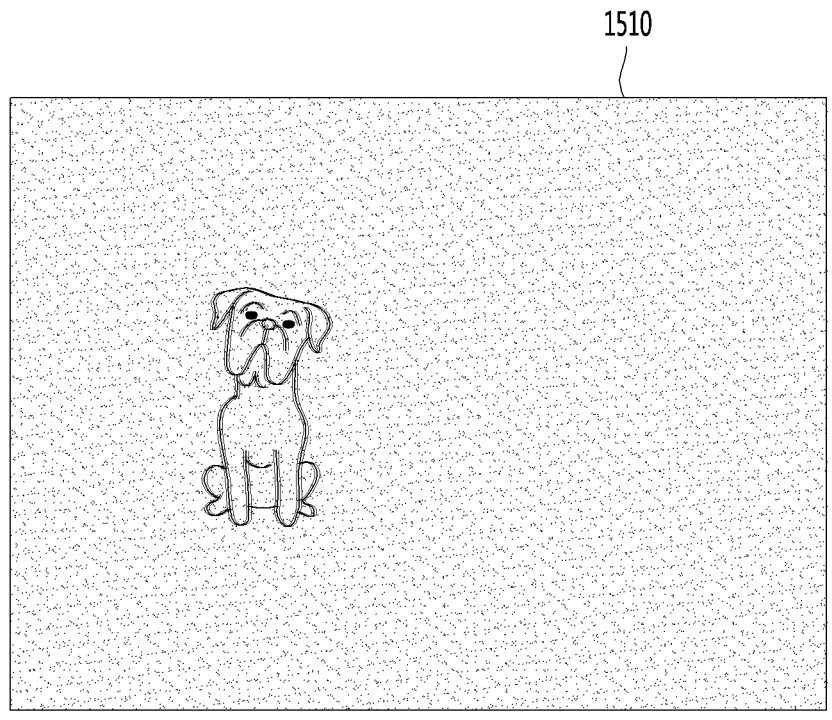
FIG. 15A is a view illustrating an image photographed through the second camera unit when the second camera unit is controlled based on correction information.

FIG. 15A is a view illustrating an image 1510 photographed through the first camera unit 200 when the second camera unit 300 is controlled based on the correction information.

The controller 180 may continuously capture the moving picture using the first camera unit 200. In addition, while the second camera unit 300 is being controlled based on the acquired correction information, the controller 180 may maintain the setting value of the first camera unit 200 for at least one of the AF, the AE, or the AWB settings without any change.

For example, while the second camera unit 300 is being controlled based on the acquired correction information, the controller 180 may control the first camera unit 200 to maintain the previous focus value without changing the focus value. That is, the controller 180 may control the first camera unit 200 to maintain the position of the lens included in the first camera unit 200.

In addition, while the second camera unit 300 is being controlled based on the acquired correction information, the controller 180 may control the first camera unit 200 to maintain the previous exposure value without changing the exposure value of the first camera unit 200 to adjust the focus of the changed subject to be focused. That is, the controller 180 may control the first camera unit 200 to maintain at least one of ISO or exposure time of the first camera unit 200.

Thus, while the second camera unit 300 is being controlled based on the acquired correction information, a moving picture captured in a state in which the setting value of the first camera unit 200 is not changed can be recorded.

Figure 15B:
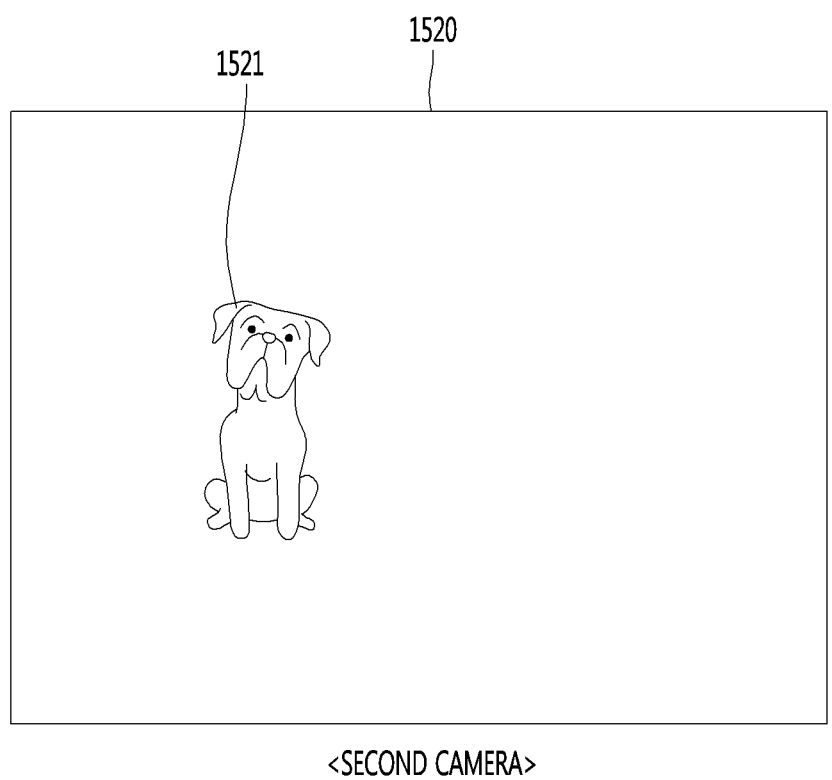
FIG. 15B is a view illustrating an image photographed through the first camera unit when the second camera unit is controlled based on correction information.

FIG. 15B is a view illustrating an image 1520 photographed through the second camera unit 300 when the second camera unit 300 is controlled based on the correction information.

If correction information is acquired based on the image received through the second camera unit 300, the controller 180 may control the second camera unit 300 to perform an operation for correction on the basis of the acquired correction information.

Specifically, if a correct position of the lens of the second camera unit 300 is acquired for focusing on the subject, the controller 180 may move the lens such that the focus of the subject is adjusted.

The controller 180 may also acquire information on a movement direction and a movement distance of the lens included in the second camera unit 300 for focusing on the subject on the basis of information on a current position of the lens and information on a position of the lens, and move the lens included in the second camera unit 300 on the basis of the acquired information.

In addition, when the second camera unit 300 is controlled based on the acquired correction information, the controller 180 may receive an image through the controlled second camera unit 300. Specifically, when the lens included in the second camera unit 300 is moved based on the acquired position of the lens, the controller 180 may receive a new image through the second camera unit 300.

In FIG. 15B, it can be seen that, since the lens of the second camera unit 300 is moved, the focus of the image 1520 photographed through the second camera unit 300 is correctly adjusted on the subject 1521.

Referring back to FIG. 12, the moving picture capturing method according to the embodiment may include the step (S1250) of acquiring the final correction information from the image received through the controlled second camera unit 300 and the step (S1260) of controlling the first camera unit 200 to photograph the moving picture on the basis of the final correction information.

This will be described in detail with reference to FIGS. 16 and 17.

Figure 16:
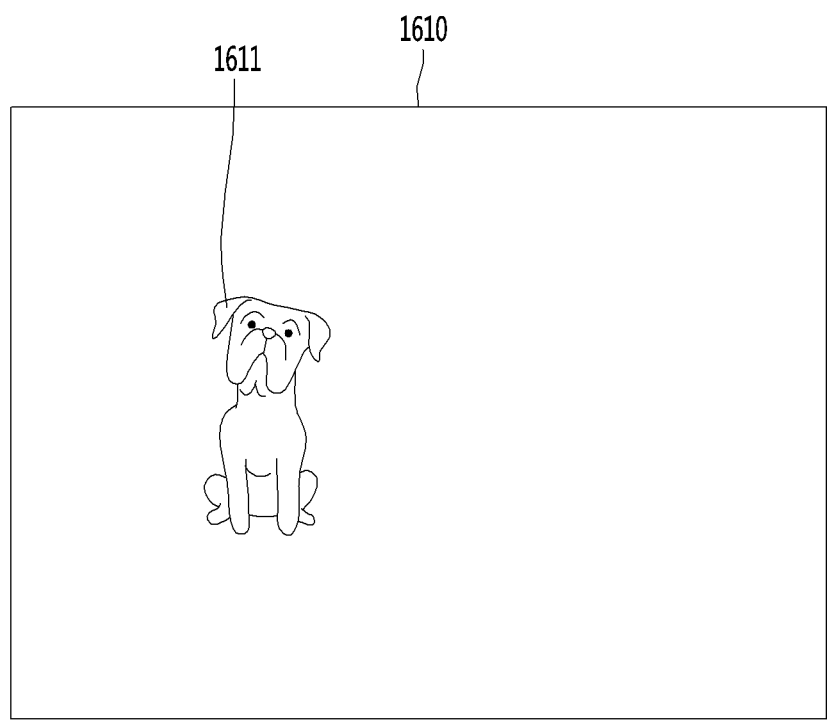
FIG. 16 is a view illustrating an image photographed through the second camera unit according to an embodiment.

FIG. 16 is a view illustrating an image 1610 photographed through the second camera unit 300 according to an embodiment. Since the moving picture is currently being captured, the controller 180 is continuously acquiring information for performing auto focus.

Therefore, even while the second camera unit 300 is controlled based on the acquired correction information, the controller 180 may receive an image received through the second camera unit 300.

Also, the controller 180 may acquire information on whether the correction of the second camera unit 300 has been completed based on the image received through the second camera unit 300. Specifically, the controller 180 may determine whether a current setting value of the second camera unit 300 corresponds to the setting value of the second camera unit 300 for at least one of the AF, the AE, or the AWB settings, based on the image received through the second camera unit 300.

If the correction in the second camera unit 300 has been completed, the controller 180 may acquire the setting value of the second camera unit 300 as the final correction information.

For example, after the second camera unit 300 is adjusted based on the correction information, the controller 180 may determine whether the focus in the image received through the second camera unit 300 is correct based on the image received through the second camera unit 300.

If it is determined that the focus of the subject 1611 in the image received through the second camera unit 300 is correct, the controller 180 may determine that the correction in the second camera 300 has been completed and acquire the setting value of the second camera unit 300 as the final correction information.

Any movement of the mobile terminal during determination of the correction information may cause the process to be restarted. When no movement occurs while the second camera unit 300 is being controlled based on the correction information, the focus of the second camera unit 300 may be completed. Hence, the controller 180 may acquire final correction information based on the image received through the second camera unit 300.

The final correction information may be final control information on a focus of the second camera unit 300, which is acquired as the second camera unit 300 is controlled based on the correction information.

When the lens included in the second camera unit 300 is moved to correspond to the above-described correction information, and the focus of an image received through the second camera unit 300 after the movement of the lens is deemed to be correct, the final correction information may be information on a position of the lens after the movement of the lens.

When the focus of a subject is correctly adjusted for a specific time or more (or a specific number of frames or more), the controller 180 may determine that the focus of the subject 1611 has been correctly adjusted.

Meanwhile, there may occur a case where a correction is not completed even after the second camera unit 300 is controlled based on the correction information. For example, the correction may not be completed when the mobile terminal 100 is additionally moved while the second camera unit 300 is being controlled based on the correction information or when the subject 1611 moves while the second camera unit 300 is being controlled based on the correction information. In this case, the focus of the subject 1611 may not be correctly adjusted even after the second camera unit 300 is controlled based on the correction information, and an additional correction on the second camera unit 300 is required.

If it is determined that the focus of the subject 1611 in the image received through the second camera unit 300, has not been correctly adjusted, the controller 180 acquires no final correction information. In this case, steps 1220 to 1240 may be repeated.

The controller 180 may again acquire correction information on the basis of the image received through the second camera unit 300, and again control the second camera unit 300 to perform auto correction on the basis of the acquired correction information. In addition, the controller 180 may again determine whether a focus has been correctly adjusted based on the image received through the second camera unit 300. If it is determined that the focus has been correctly adjusted, the controller 180 may then acquire the final correction information.

Once the final correction information is acquired based on the image received through the second camera unit 300, the controller 180 may control the first camera unit 200 to capture a moving picture on the basis of the final correction information.

Specifically, when the final correction information is related to a position of the lens of the second camera unit 300, the controller 180 may control the first camera unit 200 to move the lens of the first camera unit to a position according to the final correction information, corresponding to the position of the lens of the second camera unit.

When the first and second camera units 200 and 300 have the same structure, a position two which the lens of the first camera unit 200 is moved may be equal to that of the lens of the second camera unit 300. In other words, a position value of the lens included of the first camera unit 200 and a position value of the lens of the second camera unit 300 may be equal.

Figure 17:
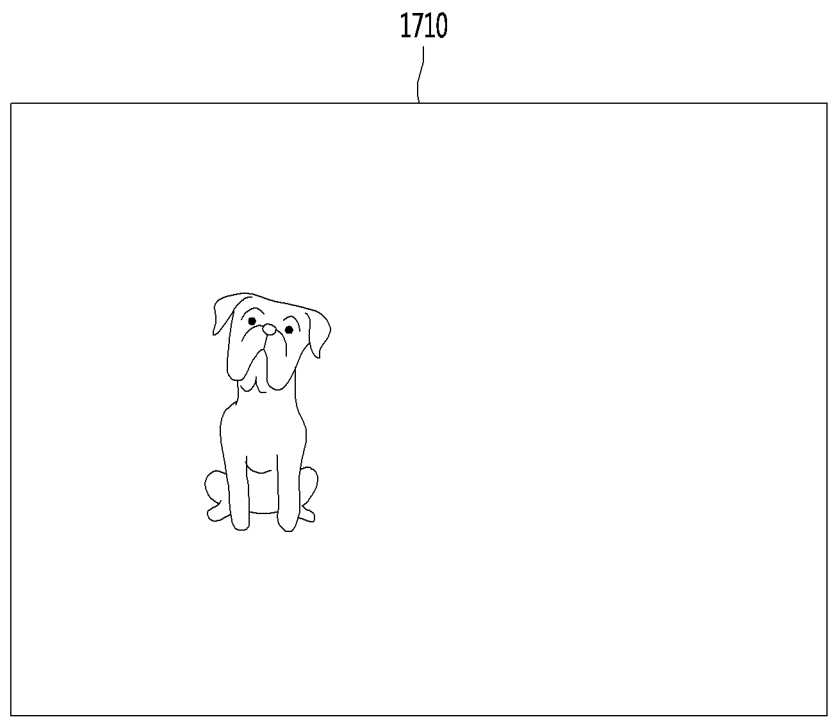
FIG. 17 is a view illustrating one scene of a moving picture captured using the first camera unit controlled based on final correction information according to an embodiment.

FIG. 17 is a view illustrating one scene 1710 of a moving picture captured using the first camera unit 200 controlled based on the final correction information according to an embodiment.

The image 1610 photographed through the second camera unit 300 controlled to adjust the focus has been illustrated in FIG. 16.

In addition, the setting value (the position value of the lens) of the first camera unit 100 is changed using the setting value (the position value of the lens) of the second camera unit 300. Hence, as shown in FIG. 17, the mobile terminal 100 may acquire an image 1710 photographed such that the focus of a subject is correctly adjusted.

The controller 180 may store the photographed image in the storage unit 170 using the first camera unit 200 controlled based on the final correction information.

Structures of the first and second camera units 200 and 300 may be different from each other. For example, cameras of the first and second camera units 200 and 300 may be of different types.

The controller 180 may control the first camera unit 200 to capture a moving picture on the basis of the final correction information and correction information between the first camera unit 200 and the second camera unit 300. In an embodiment, the correction information between the first camera unit 200 and the second camera unit 300 may be a compensation value for applying a setting value of the second camera unit 300 to the first camera unit 200 based on a structural difference between the first camera unit 200 and the second camera unit 300.

For example, the lens of the first camera unit and the lens of the second camera unit may have to be moved by different adjustment distances to focus on the same subject positioned at a specific distance.

In this case, the controller 180 may control the first camera unit 200 to capture a moving picture based on the final correction information of the second camera unit 300, and additionally based on the correction information between the first camera unit 200 and the second camera unit 300, for applying a setting value of the first camera unit 200 to the second camera unit 300.

Thus, when a subject at a specific distance is focused on, the lens of the second camera unit 300 may be moved by an adjustment distance of x, while the controller 180 may control the first camera unit 200 to move the lens of the first camera unit 200 by a different adjustment distance of y.

The storage unit 170 may store a correction table reflecting structural differences between the first camera unit 200 and the second camera unit 300, including correction information between the first camera unit and the second camera unit for various settings. The controller 180 may control the first camera unit 200 on the basis of the correction table values.

In the above-described embodiments, it has been described that a moving picture is captured and recorded using the first camera unit 200, and auto correction information is acquired using the second camera unit 300. However, the present disclosure is not limited thereto.

For example, the present disclosure may be implemented in such a manner that a moving picture is captured and recorded using the second camera unit 300, and auto correction information is acquired using the first camera unit 200.

When two cameras are equipped at a same side of a device, the camera which is used to record the moving picture may be changed depending on a user's preference. For example, when the user desires to perform photographing at a wider angle of view, the user may perform video capture using the first camera unit 200 including a wide-angle lens. When the user desires to perform general video capture, the user may perform photographing using the second camera unit 300 including a general lens.

The present invention has an advantage in that final correction information is acquired under the control of the first camera unit 200 when a moving picture is captured and recorded using the second camera unit 300, and final correction information is acquired under the control of the first camera unit 200 when a moving picture is captured and recorded using the second camera unit 300, so that the distortion of the recorded images can be avoided even when adjustments are made to the camera being used to capture the moving picture.

In the present disclosure, it has been described that the two cameras are equipped at the same side of the mobile terminal 100, but the present disclosure is not limited thereto. For example, in the mobile terminal 100 according to an embodiment, a third camera unit (not shown) may be equipped at the same side as the first camera unit 200 and the second camera unit 300. In some embodiments, a greater number of cameras may be equipped at the same side as the first camera unit 200 and the second camera unit 300.

In this case, the capture of a moving picture and the acquisition of final correction information may be performed in various manners. As an example, the first and second camera units 200 and 300 may be used to capture and record a moving picture, and the third camera unit (not shown) may be used to perform control for auto correction and acquire final correction information. As another example, the first camera unit 200 may be used to capture and record a moving picture, the second camera unit 300 may be used to perform control for auto correction and acquire final correction information, and the third camera unit (not shown) may be used to perform control for auto white balance and acquire final correction information.

Hereinafter, an operation of the mobile terminal 100 in an auto exposure mode will be described.

The controller 180 may capture a moving picture using the first camera unit 200 and store the captured moving picture in the storage unit 170. Meanwhile, the second camera unit 300 may receive an image. In addition, the controller 180 may continuously acquire correction information on the basis of the image received through the second camera unit 300.

Here, the correction information acquired based on the image received through the second camera unit 300 may be control information for auto exposure of the second camera unit 300. Specifically, the controller 180 may acquire the control information for auto exposure of the second camera unit 300.

More specifically, the controller 180 may acquire information on the amount of light from the image received through the second camera unit 300, and acquire control information for receiving the amount of light corresponding to a preset exposure value through the second camera unit 300.

Here, the control information for auto exposure of the second camera unit 300 may include information on a sensitivity (ISO) of the second camera unit 300 or information on an exposure time of the second camera unit 300 (i.e., a time for which light is received to the image sensor included in the second camera unit 300).

The controller 180 may determine whether the amount of light received through the second camera unit 300 corresponds to the preset exposure value. In addition, when the amount of light received through the second camera unit 300 corresponds to the preset exposure value, the controller 180 may control the second camera unit 300 to maintain the exposure setting value, i.e., the sensitivity (ISO) or exposure time of the second camera unit 300, without any change.

In some cases, the amount of light received through the second camera unit 300 may be changed. Examples of the change may include when lighting conditions are changed during photographing, such as when an image being captured changes from a dark setting to a bright setting, or vice versa, while changing the direction of the camera, location of the camera, and the like.

The controller 180 may continuously capture a moving picture using the first camera unit 200 while the second camera unit settings are being changed.

Meanwhile, even when the amount of light is changed, an exposure setting value of the first camera unit 200, i.e., a sensitivity (ISO) or exposure time of the first camera unit 200, is not changed but may be maintained as it is.

When the amount of light received through the second camera 300 is changed, the controller 180 may acquire correction information on the basis of the image received through the second camera unit 300.

Further, when the amount of light received through the second camera 300 is changed, the controller 180 may determine whether the conditions correspond to the preset exposure value. That is, the controller 180 may determine whether the amount of light received through the second camera 300 correspond to the amount of light, which is preset, or desired to be received.

When the amount of light received through the second camera 300 does not correspond to the preset exposure value, the controller 180 may acquire correction information, i.e., control information for auto exposure of the second camera unit 300.

Specifically, the controller 180 may acquire information on the amount of light received through the second camera unit 300 from the image received through the second camera unit 300. Also, the controller 180 may acquire information on a new exposure setting value of the second camera unit 300 on the basis of the information on the amount of light received through the second camera unit 300 and the preset exposure value. That is, the controller 180 may obtain a value for changing settings for the sensitivity (ISO) or exposure time of the second camera unit 300.

The controller 180 may control the second camera unit 300 to perform auto correction on the basis of the acquired correction information. Specifically, the controller 180 may change at least one of the sensitivity (ISO) or exposure time of the second camera unit 300 on the basis of the acquired control information for auto exposure.

The controller 180 may continuously capture a moving picture using the first camera unit 200 while the second camera unit 300 is being controlled based on the acquired correction information. In this case, the exposure setting value of the first camera unit 200 is continuously maintained. Thus, the moving picture captured by the first camera unit 200 is not changed during the recording and the recorded video such that it does not include any distortions or changes in exposure, while the second camera unit 300 is being controlled and changed based on the acquired correction information.

Meanwhile, since the moving picture is currently being captured, the controller 180 is continuously acquiring information for auto exposure.

Therefore, even when the second camera unit 300 is being controlled based on the acquired correction information, the controller 180 may receive an image through the controlled second camera unit 300.

In addition, the controller 180 may acquire information on whether the correction of the second camera unit 300 has been completed, based on the image received through the second camera unit 300. Specifically, the controller 180 may determine whether a current exposure setting value of the second camera unit 300 corresponds to the preset exposure value.

More specifically, the controller 180 may acquire information on the amount of light received through the second camera unit 300 and determine whether the amount of light corresponds to the preset exposure value.

If the amount of light received through the second camera unit 300 corresponds to the preset exposure value, the controller may acquire, as final correction information, the exposure setting value of the second camera unit.

That is, when the lighting is not required to be further adjusted after being controlled based on the correction information, the amount of light received through the controlled second camera unit 300 corresponds to the preset exposure value. Accordingly, the controller 180 can acquire final correction information on the basis of the image received through the controlled second camera unit 300.

Here, the final correction information may be final control information on the exposure value of the second camera unit 300, which is obtained as the second camera unit 300 is controlled based on the correction information.

The final correction information may be information on the changed sensitivity (ISO) and exposure time of the second camera unit 300.

Meanwhile, even after the second camera unit 300 is controlled based on the correction information, the amount of light received through the second camera unit 300 may not correspond to the preset desired exposure. An example of this may be when lighting around the second camera unit 300 is additionally changed while the second camera unit 300 is being controlled based on the correction information.

If the amount of light received through the controlled second camera unit 300 does not correspond to the preset desired exposure, the controller 180 may again acquire correction information on the basis of the image received through the second camera unit 200, and again control the second camera unit 300 on the basis of the acquired correction information to repeat the process.

If final correction information is acquired based on the image received through the controlled second camera unit 300, the controller 180 may control the first camera unit 200 to capture the moving picture with adjustments on the basis of the final correction information.

Specifically, when the final exposure correction information such as the sensitivity (ISO) or exposure time of the second camera unit 300, the controller 180 may change the sensitivity (ISO) or exposure time of the first camera unit 200 on the basis of the information on at least one of the sensitivity (ISO) and exposure time of the second camera unit 300.

As discussed above, in some embodiments, the structure or performance of the first camera unit 200 and the structure or performance of the second camera unit 300 may be different from each other.

In this case, the controller 180 may control the first camera unit 200 to capture a moving picture on the basis of the final correction information and correction information between the first camera unit 200 and the second camera unit 300. Here, the correction information between the first camera unit 200 and the second camera unit 300 may be a compensation value for applying a setting value of the second camera unit 300 to the first camera unit 200 which takes into consideration any difference in structure and performance between the first camera unit 200 and the second camera unit 300.

For example, if the ISO of the second camera unit 300 is changed by a value x to acquire a specific amount of light, the ISO of the first camera unit 300 is to be changed by a value y to achieve the same result.

When video capture and auto exposure are performed using a single camera, an exposure value may be suddenly changed in response to a change in lighting, and the exposure of the recorded images may not be smoothly changed. In addition, when an auto exposure operation algorithm is slowly executed so as to prevent a sudden change in exposure value, the adaptation to a new auto exposure value is slowly made, or recording is continuously performed in a state in which the auto exposure value is wrong.

However, in the present disclosure, the control for auto exposure and the acquisition of final correction information are performed using the second camera unit 300 while recording is performed by the first camera unit, so that the auto exposure operation algorithm can be quickly and stably performed and then applied to the first camera unit 200 once a final desired exposure value has been determined.

In addition, in some embodiments exposure correction is performed by considering any differences in structure or performance between the first and second camera units, and a setting value of the second camera unit is applied to the first camera unit so that auto correction of the first camera unit can be accurately performed using final correction information obtained using the second camera unit, even when the first and second camera units are different.

Hereinafter, an operation of the mobile terminal 100 in an auto white balance mode will be described.

The controller 180 may capture a moving picture using the first camera unit 200 and store the captured moving picture in the storage unit 170.

Meanwhile, the second camera unit 300 may receive an image. The controller 180 may continuously acquire white balance correction information on the basis of the image received through the second camera unit 300.

More specifically, the controller 180 may acquire information on a color balance value of the image received through the second camera unit 300, and acquire control information for obtaining an image corresponding to a preset color balance value.

Here, the control information for auto white balance of the second camera unit 300 may include a correction value on a color of the image received through the second camera unit 300.

Meanwhile, the controller 180 may determine whether the color balance value of the image received through the second camera unit 300 corresponds to the preset color balance value for auto white balance.

When the color balance value of the image received through the second camera unit 300 corresponds to the preset color balance value, the controller 180 may control the second camera unit 300 to maintain the white balance setting value of the second camera unit 300, i.e., the color valance value of the image received through the second camera unit 300.

When the color valance value of the image received through the second camera unit 300 is changed (for example when lighting is changed while capturing video or when the color temperature of a changed subject to be focused is changed), the controller 180 may continuously capture a moving picture using the first camera unit 200.

Thus, even when the change in color occurs, a white balance setting value of the first camera unit 300 is not changed but may be maintained.

When the color balance value of the image received through the second camera unit 300 is changed to achieve a desired preset value, the controller 180 may acquire correction information on the basis of the image received through the second camera unit 300.

When the color balance value of the image received through the second camera unit 300 does not correspond to the desired preset color balance value, the controller 180 may determine additional correction information for the second camera, i.e., control information of the second camera unit 300 for additional changes to the auto white balance setting.

Specifically, the controller 180 may acquire, from an image received through the second camera unit 300, information on a color balance value of the image. Also, the controller 180 may acquire information on a new white balance setting value of the second camera unit 300 based on the information on the preset color balance value. That is, the controller 180 may obtain a correction value on a color of the image received through the second camera unit 300.

The controller 180 may continue to control the second camera unit 200 on the basis of the acquired correction information. Specifically, the controller 180 may correct the color of the image received through the second camera unit 300 on the basis of the acquired control information for auto white balance. In some cases, the controller 180 may adjust gains of red, green, and blue values (R, G, B) of the image received through the second camera unit 300, however this disclosure considers other methods of color and white balance for images and videos known to those or ordinary skill in the art.

In some embodiments, the second camera unit 300 includes the white balance controller (not shown), and the controller 180 may control the white balance controller (not shown) to correct the color and white balance of the image received through the second camera unit 300.

The controller 180 may continuously capture a moving picture using the first camera unit 200 while the second camera unit 300 is being controlled based on the acquired correction information. In this case, the setting value of the first camera unit 200 is continuously maintained despite changes to the surrounding environment or lighting. Thus, the video captured in the state in which the setting value of the first camera unit 200 is not changed can be recorded while the second camera unit 300 is being controlled based on the acquired correction information.

The controller 180 may acquire information on a color balance value of the image received through the second camera unit 300 and determine whether the color balance value of the image corresponds to that of a preset image or the desired preset white balance setting. That is, the controller 180 may determine whether the ratio of R, G, and B values of the image received through the second camera unit 300 corresponds to that of preset R, G, and B values.

If the color balance value of the image received through the second camera unit 300 corresponds to that of the preset image, the controller 180 may use the settings to acquire final correction information.

That is, when lighting is not further changed while the second camera unit 300 is being controlled based on the correction information, the color balance value of the image of the second camera unit 300 is used to acquire final correction information.

Here, the final correction information may be final control information on a correction value of the color of the second camera unit 300, obtained as the second camera unit 300 is controlled based on the correction information.

However, even after the second camera unit 300 is controlled based on the correction information, the color balance value of the image received through the second camera unit 300 may still not correspond to the preset color balance value for auto white balance. An example of this may be when the lighting environment is changed while the second camera unit 300 is being controlled based on the correction information.

If the color balance value of the image received through the second camera unit 300 does not correspond to the preset color balance value, no final correction information is acquired and the controller 180 may again apply correction to the second camera unit 300 and repeat the process.

Meanwhile, if final correction information is acquired based on the image received through the controlled second camera unit 300, the controller 180 may control the first camera unit 200 to capture the moving picture on the basis of the final correction information.

Specifically, when the final correction information is determined to correspond to the desired preset value, the controller 180 may control a white balance controller (not shown) included in the first camera unit 300 to correct a color of an image received through the first camera unit 200 on the basis of the correction value of the color of the second camera unit 300 using the final correction information.

As discussed above, the structure or performance of the first camera unit 200 and the structure or performance of the second camera unit 300 may be different from each other.

In this case, the controller 180 may control the first camera unit 200 to capture the moving picture on the basis of the final correction information and additional correction information to compensate for any structural or performance differences between the first camera unit 200 and the second camera unit 300.

As described above, this has an advantage in that final correction information is obtained via the second camera unit, so that it is possible to prevent a distortion of an image of the recorded first camera unit image, which may occur in a process of performing auto white balance.

FIGS. 18A to 21B are views illustrating acquisition of triggering information for starting auto correction of a moving picture according to an embodiment.

In the embodiments of FIGS. 13 to 17, it has been described that the controller 180 continuously acquires correction information using the second camera unit 300 and controls the second camera unit 300 on the basis of the acquired correction information.

However, the present disclosure is not limited thereto, and may be implemented in such a manner that correction of an image is performed by operating the second camera unit 300 when triggering information is acquired.

Also, in the embodiments of FIGS. 13 to 17, it has been described that the controller 180 determines whether auto correction is required based on the image received through the second camera unit 300. For example, the controller 180 determines that the auto correction is required when a focus is not adjusted, when the amount of light does not correspond to the preset exposure value, or when the color balance value does not correspond to the preset value, based on the image received through the second camera unit 300.

However, the present disclosure is not limited thereto, and the triggering information may be acquired in various manners. For example, the triggering information may include a change in image received through the first camera unit 200, a movement of the mobile terminal, a user input, and the like.

Specifically, the controller 180 may acquire triggering information for starting auto correction of a moving picture.

Here, the triggering information for starting auto correction of the moving picture may be acquired based on a change in image received through at least one of the first and second camera units 200 and 300, a movement of the moving picture capturing apparatus, or a user input.

In addition, if the triggering information for starting auto correction of the moving picture is acquired, the controller 180 may start acquiring correction information on the basis of an image received through the second camera unit 300.

Figure 18A:
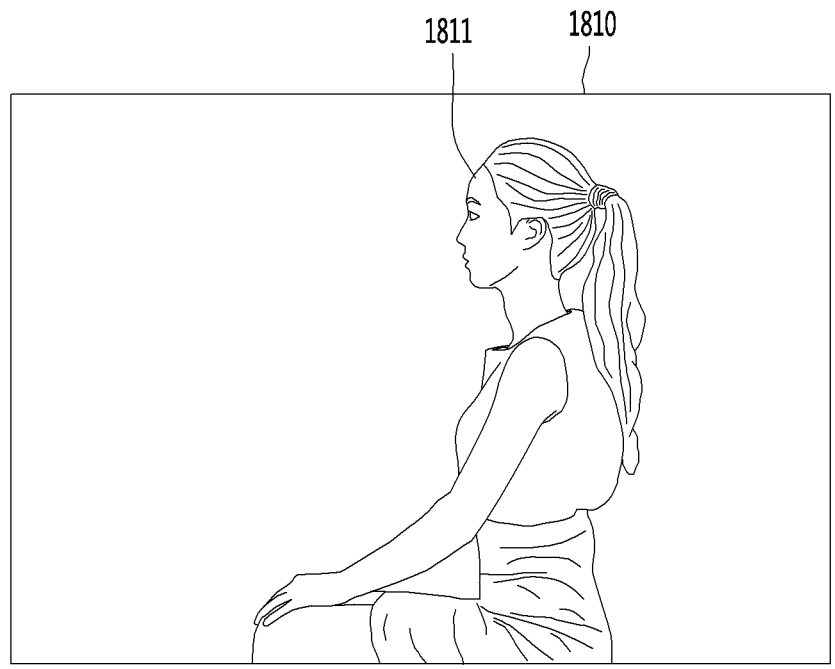
FIGS. 18A, 18B, 19A, 19B, 20A, 20B, 21A, and 21B are views illustrating acquisition of triggering information for starting auto correction of a moving picture according to an embodiment.

For example, in FIG. 18A, a first subject 1811 is photographed by the mobile terminal. However, in FIG. 18B, the subject may change to a second subject 1821 while turning the mobile terminal 100 is turned in a different direction.

In this case, the controller 180 may determine that the image received through the first camera unit 200 has been changed from a first image 1810 to a second image 1820. In an embodiment, this may trigger auto correction of a moving picture at the mobile terminal.

In addition, if the image received through the first camera unit 200 is changed, the controller 180 may start acquiring correction information on the basis of an image received through the second camera unit 300.

Figure 18B:
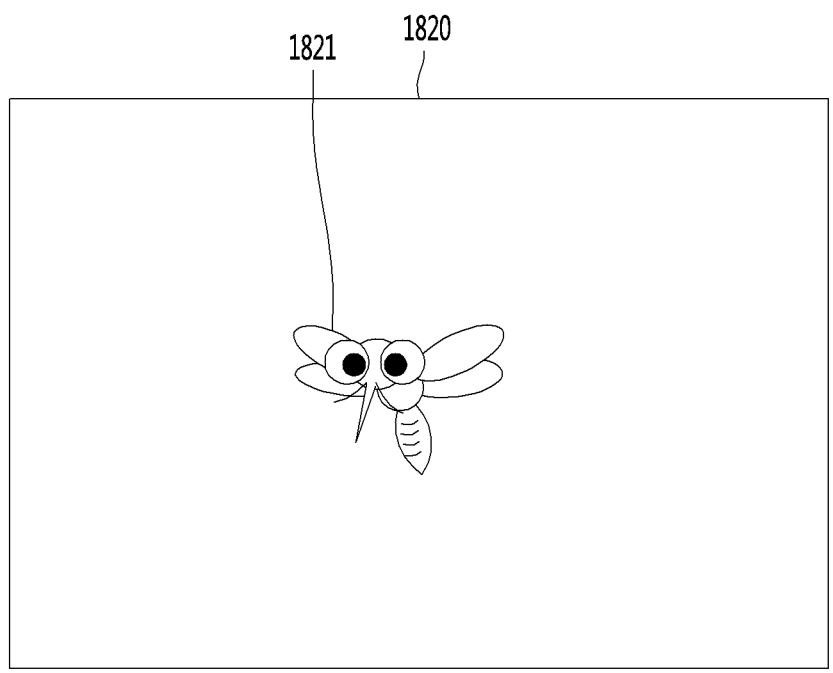

In the embodiment of FIGS. 18A and 18B, the triggering information may be acquired by not only a change in image but also a movement of the mobile terminal 100.

Specifically, the sensing unit 140 of the mobile terminal 100 may detect a movement of the mobile terminal 100. If the mobile terminal 100 capturing a moving picture shows a movement of a specific pattern or shows a movement greater than or equal to a preset size, the controller 180 may determine that triggering information for starting auto correction of the moving picture has been acquired.

In the case of a general photographing apparatus, the sensing unit 140 described in FIG. 1 may be included in the general photographing apparatus.

In this case, the controller 180 may also start acquiring correction information on the basis of the image received through the second camera unit 300.

Meanwhile, operations after the acquisition of the correction information may be the same as those described above.

Figure 19A:
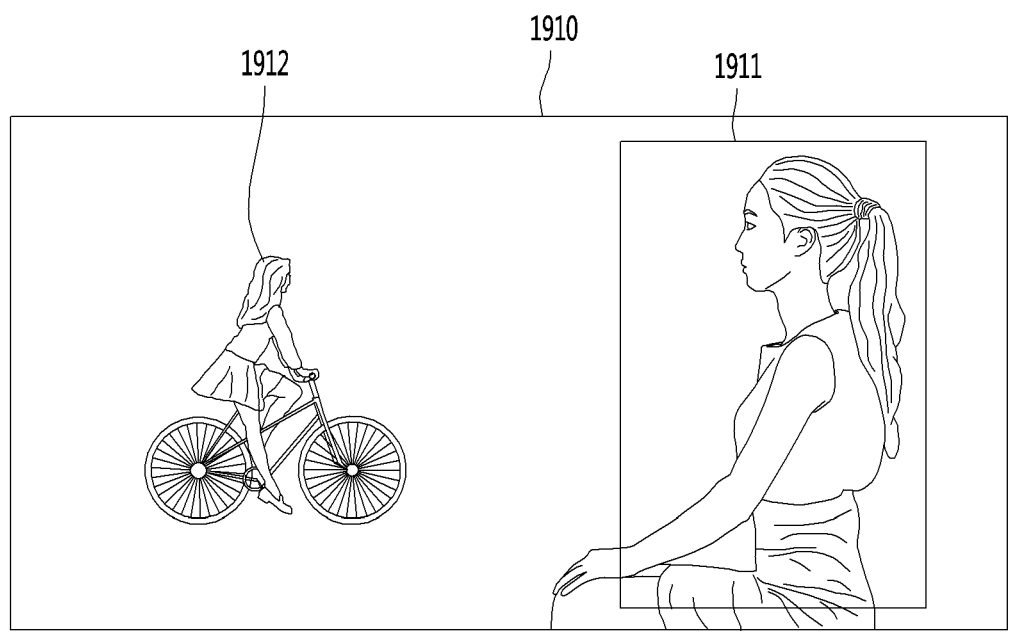
Figure 19B:
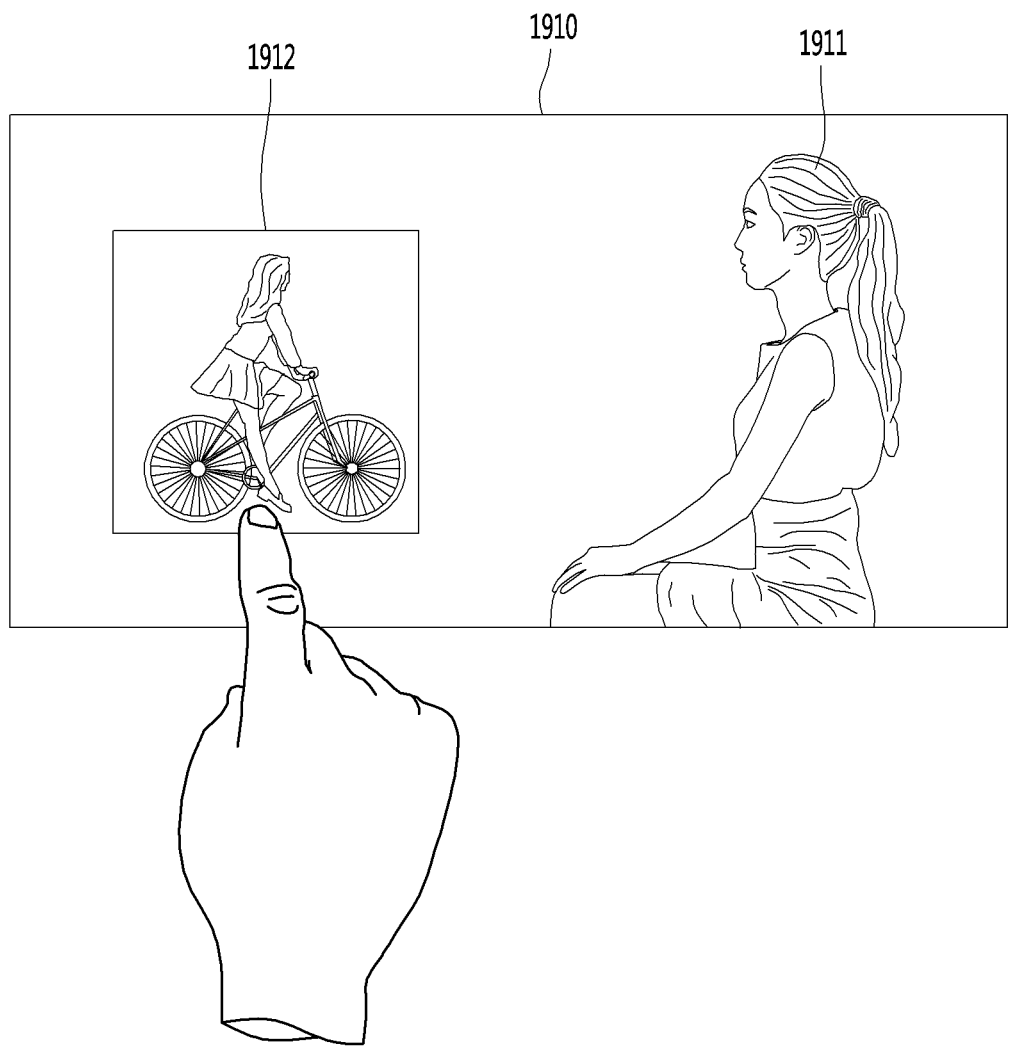

FIGS. 19A to 19B are views illustrating an acquisition of triggering information when the focus of a first subject is changed to that of a second subject on the basis of a user input.

Referring to FIG. 19A, the distance between a first subject 1911 and the mobile terminal 100 may be shorter than the distance between a second subject 1912 and the mobile terminal 100.

As shown in FIG. 19B, if an input for changing a subject to be focused from the first subject 1911 to the second subject 1912 is received from a user, the controller 180 may determine that triggering information for starting auto correction of a moving picture has been acquired.

In this case, the controller 180 may start acquiring correction information on the basis of an image received through the second camera unit 300, control the second camera unit 300 on the basis of the acquired correction information, acquire final correction information on the basis of the image received through the controlled second camera unit 300, and control the first camera unit 200 to photograph a moving picture on the basis of the final correction information, similar to the embodiments discussed above.

In other embodiments, when an input for changing a color balance value is received from the user or when an input for changing the brightness of a photographed image is received from the user, the controller 180 may also determine that triggering information for starting auto correction has been acquired.

In addition, an operation in which an auto correction (auto focus, auto exposure, or auto white balance) function of a moving picture is set has been described. However, the present disclosure is not limited thereto, and may be implemented in such a manner that, when an input for starting auto correction of a moving picture is received from the user in a state in which the auto correction function is not set, it is determined that triggering information for starting auto correction has been acquired.

Figure 20A:
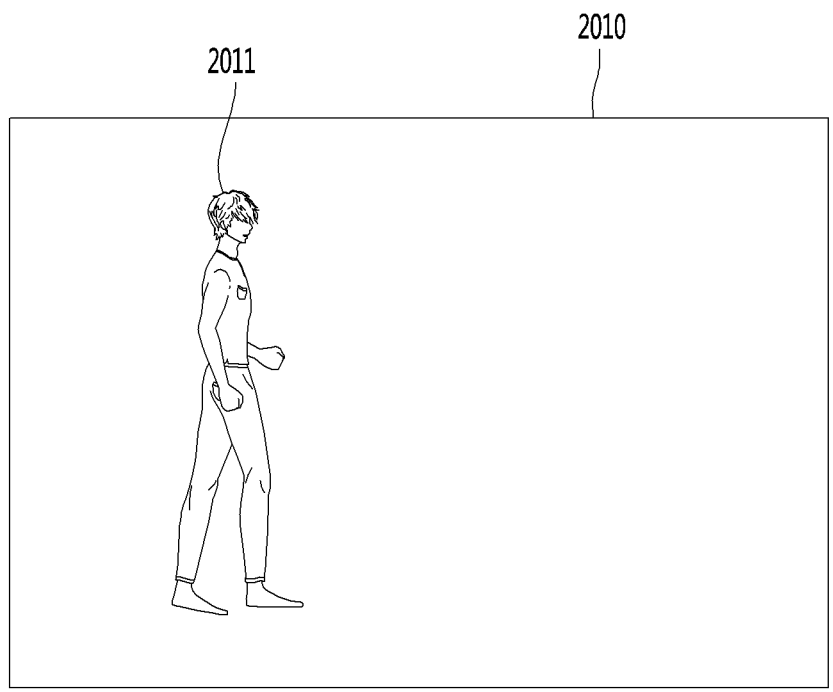
Figure 20B:
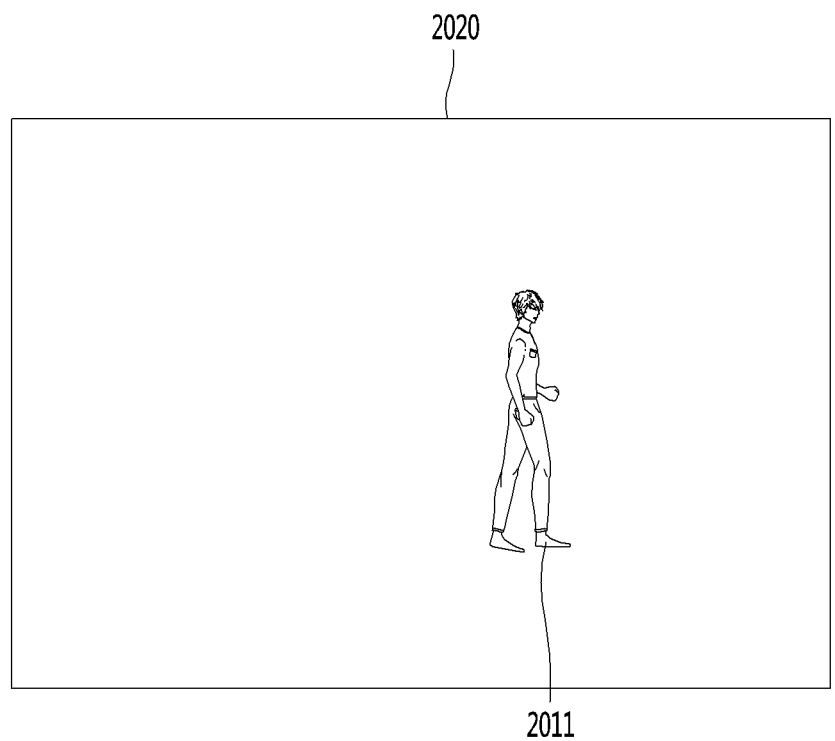

FIGS. 20A and 20B are views illustrating acquisition of triggering information when a specific subject moves in a state in which the focus of the specific subject is adjusted according to an embodiment.

Referring to FIGS. 20A and 20B, a specific subject 2011 being photographed may be increasingly moving away from the mobile terminal.

The controller 180 may determine that an image received through the first camera unit 200 has been changed from a first image 2010 (FIG. 20A) in which the specific subject 2011 to a second image 2020 (FIG. 20B) in which the specific subject 2011 is located further away. The controller 180 may acquire triggering information for starting auto correction of a moving picture based on the change in image.

In this case, the controller 180 may start acquiring correction information on the basis of an image received through the second camera unit 300.

Figure 21A:
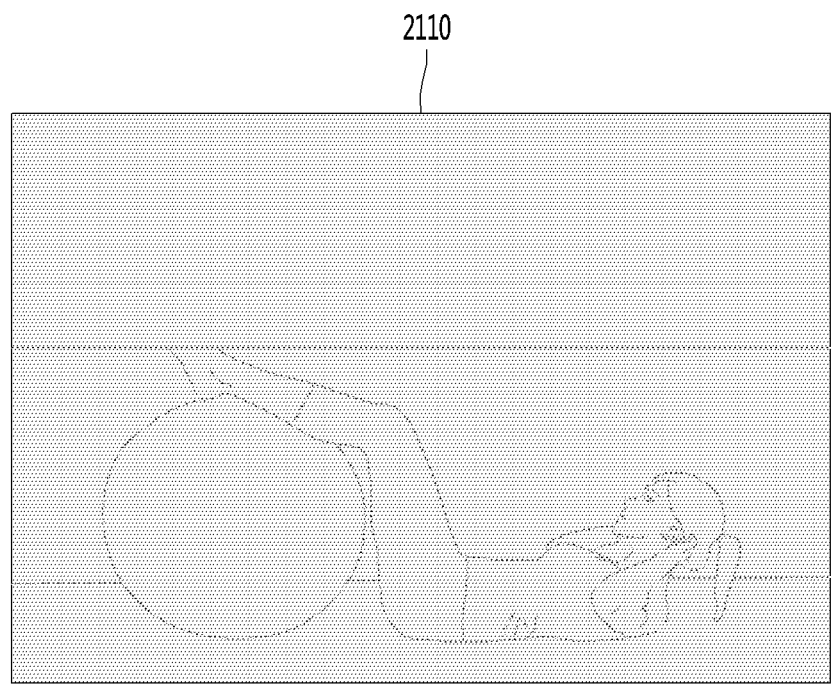
Figure 21B:
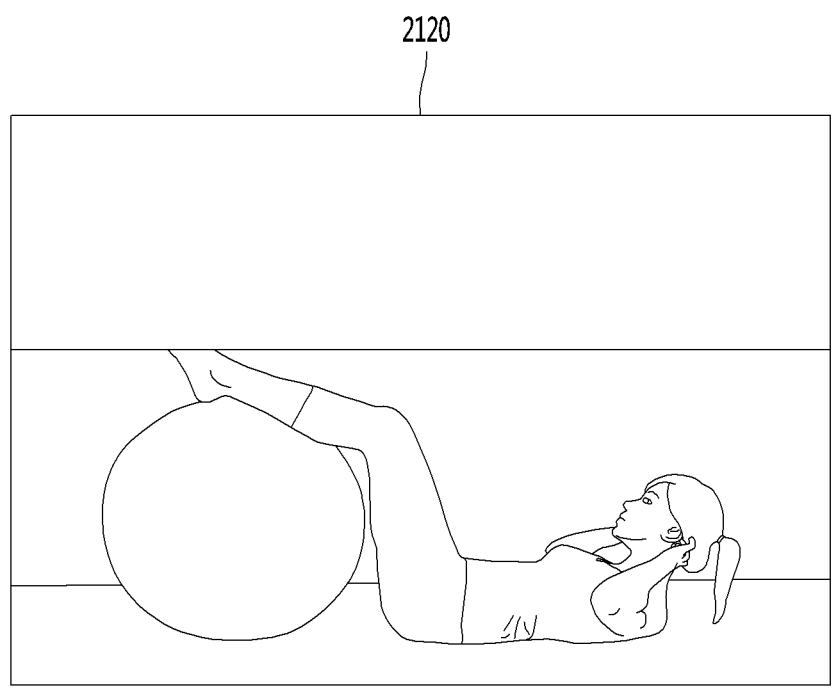

FIGS. 21A and 21B are views illustrating acquisition of triggering information when lighting is suddenly changed according to an embodiment. Referring to FIGS. 21A and 21B, a surrounding environment may suddenly become brighter while capturing images due to a change in lighting.

The controller 180 may acquire information on the amount of light received through the first camera unit 200 on the basis of an image received through the first camera unit 200.

Also, the controller 180 may determine that the image received through the first camera unit 200 has been changed from an image having a low light to an image having a large amount of light. The controller 180 may acquire triggering information for starting auto correction of a moving picture based on the lighting change.

In this case, the controller 180 may start acquiring correction information on the basis of an image received through the second camera unit 300.

In addition, the controller 180 may acquire information on a color balance value of an image received through the first camera unit 200 on the basis of the image received through the first camera unit 200.

Also, the controller 180 may determine that the color balance value of the image received through the first camera unit 200 has been changed due to a change in lighting. Therefore, the controller 180 may determine that the triggering information for starting auto correction of the moving picture has been acquired.

In some embodiments, the second camera unit 300 may be powered off before the acquisition of the triggering information. In response to acquiring the triggering information, the controller 180 may power on the second camera unit 300.

Then, the controller 180 may acquire correction information on the basis of an image received through the second camera unit 300, and control the second camera unit 300 on the basis of the acquired correction information.

In addition, once the correction in the second camera unit 300 is completed, and the controller 180 has controlled the first camera unit 200 based on final correction information obtained using the second camera unit, the controller may power off the second camera unit 300.

When the first and second camera units 200 and 300 are simultaneously operated, this may be disadvantageous in terms of a battery use or system resources.

However, in some embodiments, correction information is acquired by operating the second camera unit 300 only when triggering information is acquired, so that it is possible to save the battery life and the system resources.

Specifically, the power of the second camera unit is on/off according to the acquisition of triggering information and the completion of correction, so that it is possible to save a battery in a cellular phone, a portable camera, etc.

FIGS. 22 to 26 are views illustrating an apparatus and operating method when environmental lighting is suddenly darkened, according to an embodiment.

In the embodiments discussed above, it has been described that focus, exposure, and white balance are corrected depending on a change in photographing environment. However, the present disclosure is not limited thereto, and at least one of the focus, the exposure, and the white balance may be corrected depending on a change in photographing environment.

Figure 22:
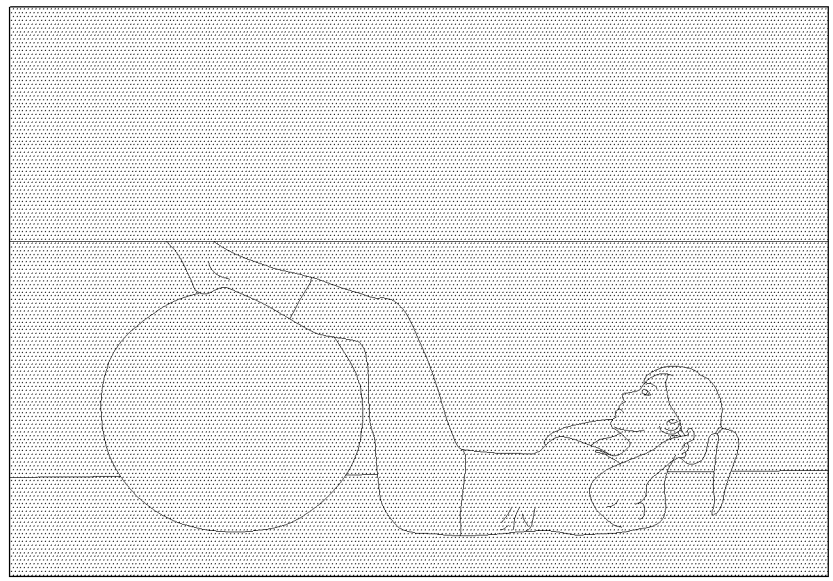
FIGS. 22, 23A, 23B, 24, 25A, 25B, and 26 are views illustrating an operating method when lighting is suddenly dark according to an embodiment.
Figure 23A:
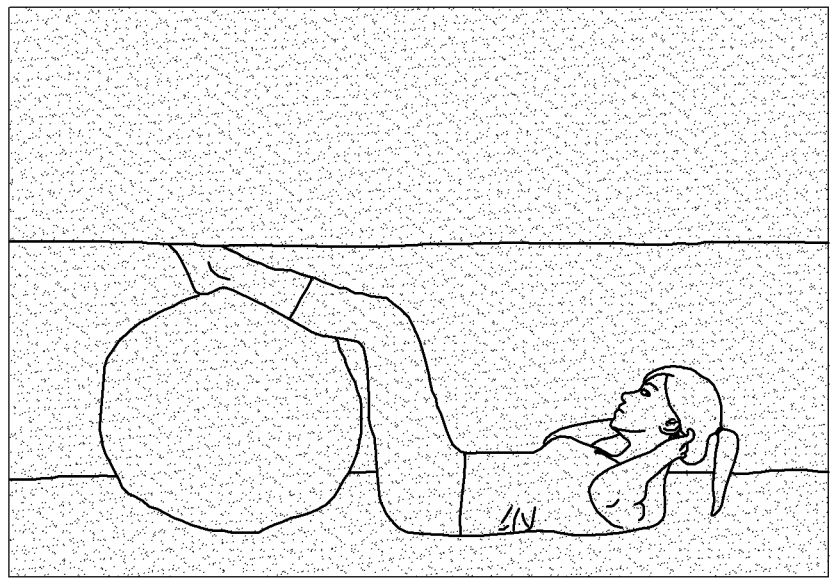
Figure 23B:
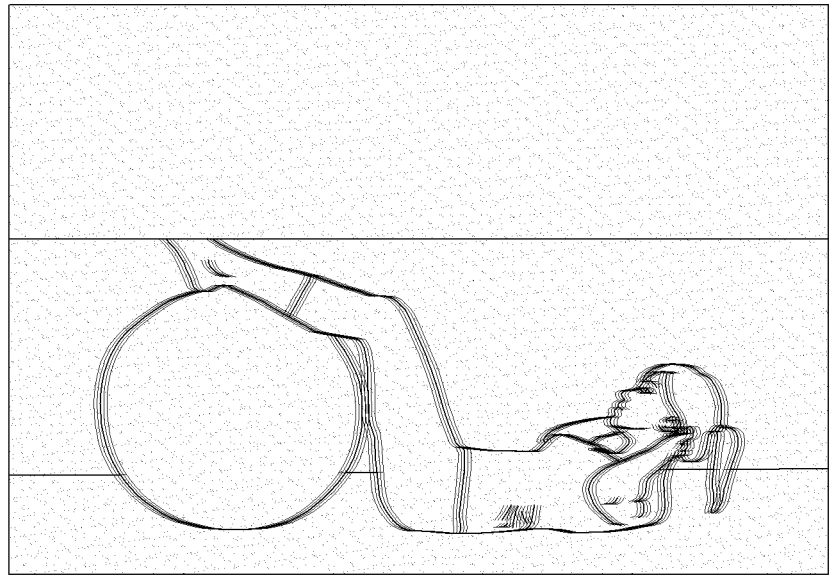

First, FIGS. 22 to 23B show problems which may occur when correction is performed while photographing using a single camera.

While photographing is being performed using a single camera, environmental lighting may be suddenly reduced as shown in FIG. 22. It may be difficult to adjust a focus when the light is dim or low. For example, in the contrast based auto focus scheme, when an environment around a photographing apparatus is dark, the contrast of an image may not be well detected. In the phase detect auto focus scheme, when an environment around the photographing apparatus is dark, it is also difficult to evaluate a phase difference. Hence, it may be difficult to adjust a focus.

In such cases, the photographing apparatus requires a larger amount of light to adjust the focus. For example, the photographing apparatus may secure the amount of light required to adjust the focus by increasing the ISO setting or exposure time of the camera.

However, when the photographing apparatus increases the ISO of the camera so as to increase the amount of (or its sensitivity to) the available light, noise of the image is increased, and therefore, a low-quality image may be recorded as shown in FIG. 23A. Also, since the ISO is suddenly increased, there may occur a phenomenon that a screen suddenly becomes washed out or brighter than desired.

In addition, when the photographing apparatus increases the exposure time of the camera so as to increase the amount of light received, a shutter speed is decreased, and hence shaking or vibration of the apparatus may be recorded in the image as shown FIG. 23B. Therefore, the quality of a recorded video or moving picture may be deteriorated.

Figure 24:
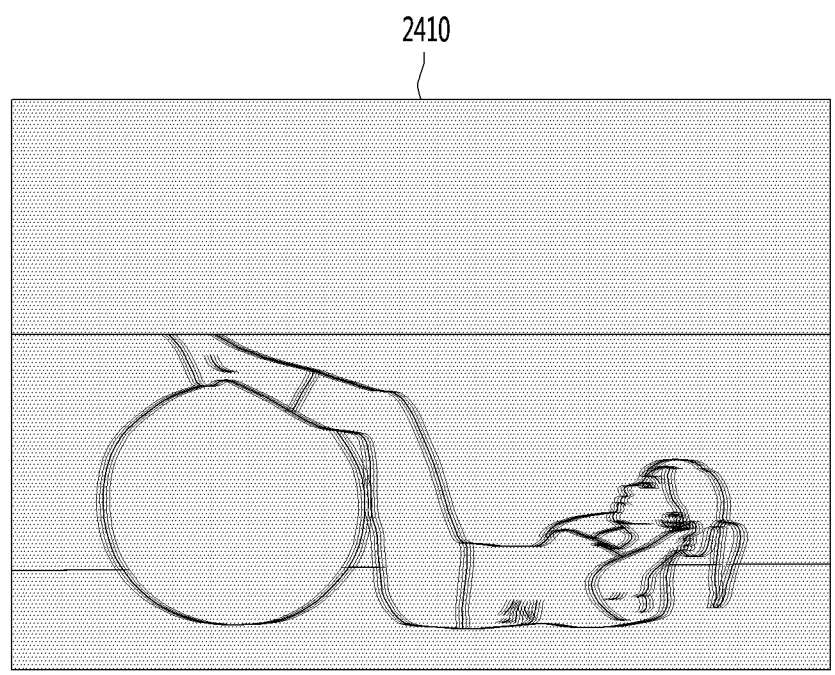
Figure 25A:
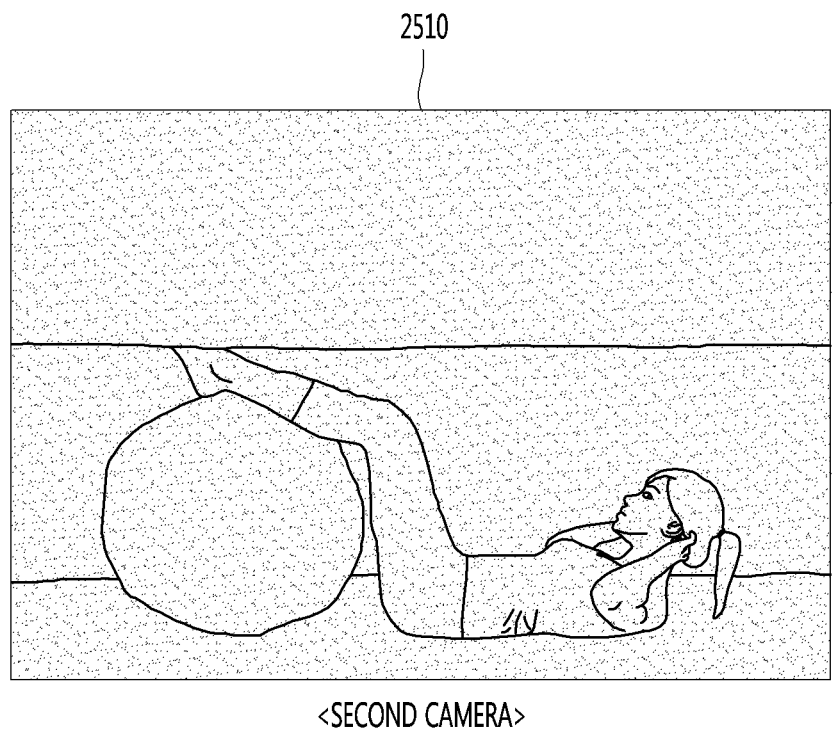
Figure 25B:
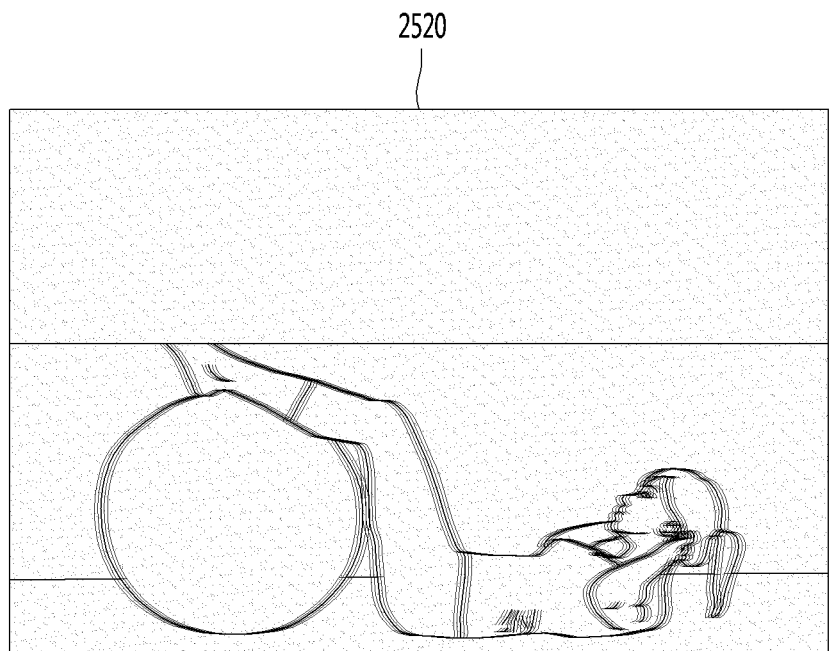
Figure 26:
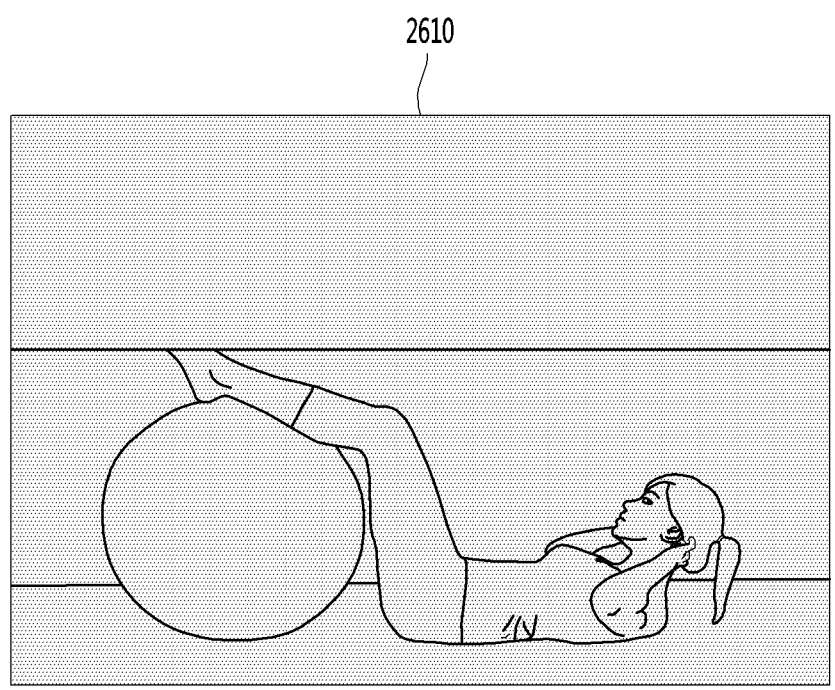

FIGS. 24 to 26 are views illustrating an apparatus and operating method of the moving picture capturing apparatus having dual camera according to the embodiment.

Referring to FIG. 24, an image captured in a bright setting may be distorted if the camera was recently used to capture an image in a dark environment because a setting value of the first camera unit 200 is not changed.

Specifically, even when the focus of a newly photographed image is newly adjusted, the controller 180 can maintain a setting value of the first camera 200 for auto focus (AF) or a setting value of the first camera 200 for auto exposure (AE) without any change. In addition, even when the kind of lighting is changed, the controller 180 can maintain a setting value of the first camera 200 for auto white balance (AWB) without any change.

Meanwhile, FIG. 25A is a view illustrating an image 2510 photographed through the second camera unit 300 when the ISO of the second camera unit 300 is changed just after an image is changed, and FIG. 25B is a view illustrating an image 2520 photographed through the second camera unit 300 when the exposure time of the second camera 300 is changed just after an image is changed.

The controller 180 may acquire correction information on the basis of an image received through the second camera unit 300.

Specifically, the controller 180 may acquire information on the amount of light from the image received through the second camera unit 300, and acquire correction information on the basis of information on the amount of currently received light and the amount of light required to perform auto focus.

In addition, based on the acquired correction information, the controller 180 may increase the sensitivity (ISO) of the second camera unit 300 as shown in FIG. 25A or may increase the exposure time of the second camera unit 300 as shown in FIG. 25B.

In addition, the controller 180 may change the sensitivity (ISO) of the second camera unit 300 and the exposure time of the second camera unit 300 on the basis of the acquired correction information.

Accordingly, a distorted image 2510 or 2520 is photographed through the second camera unit 300. However, the distorted image 2510 or 2520 photographed through the second camera unit 300 is an image used to acquire final correction information, and is not provided to a user of the mobile terminal 100.

Meanwhile, when the amount of light for auto focus is received through the second camera unit 300 as at least one of the sensitivity (ISO) of the second camera unit 300 and the exposure time of the second camera unit 300 is changed, the controller 180 may acquire control information for auto focus on the basis of the image 2510 or 2520 received through the second camera unit 300.

If control information for auto focus is acquired, the controller 180 may control the second camera unit 300 to be operated based on the control information for auto focus. That is, the controller 180 may control the lens of the second camera unit 300 to be focused on at least one desired subject of the image.

The controller 180 may determine whether the focus of at least one desired subject of the image is correct based on the image received through the second camera unit 300. Specifically, since the amount of light required to perform auto focus is received through the second camera unit 300, the controller 180 may determine whether the focus has been correctly adjusted.

If correction in the second camera unit 300 is completed, i.e., if the focus of at least one subject of the image is correctly adjusted, the controller 180 may acquire a setting value of the second camera unit 300 as final correction information.

In addition, the controller 180 may control the first camera unit 200 to capture a moving picture on the basis of the final correction information. That is, the controller 180 may control the lens included in the first camera unit 200 to be moved such that its position corresponds to the position of the lens included in the second camera unit 300. In some embodiments, the controller may control the first camera unit to be focused based on the final correction information, along with additional adjustment values corresponding to a structural or performance difference between the first camera unit and the second camera unit.

The controller 180 may thus capture a moving picture and record the moving picture using the controlled first camera unit 200.

FIG. 26 is a view illustrating one scene 2610 of a moving picture captured through the first camera unit 200 when the first camera unit 200 is controlled based on final correction information.

Referring to FIG. 26, it can be seen that, in the moving picture captured through the first camera unit 200, a final image of which focus is correctly adjusted is captured without any sudden changes in the environment or the apparatus, such as brightness, noise, or shaking.

The images of FIGS. 25A and 25B may be captured solely for a process of acquiring correction information, and may not be provided to a user or the memory for long term storage. Instead, the user is able to view the final and correct image 2610 of FIG. 26, which is changed directly from the image 2410 of FIG. 24. Accordingly, the user does not see any images which are used solely for acquiring correction information, and these images may also not be provided to the memory for long term storage.

That is, the user is only presented with images with corrected focus without being presented with preliminary and distorted images, such as images with high noise due to ISO high sensitivity, images which are suddenly bright, or images in which a shutter speed is decreased in order to capture images with long exposure time.

In the above embodiment, it has been described that the first camera unit 200 and the second camera unit 300 are controlled to perform auto focus, but the present disclosure is not limited thereto.

For example, the controller 180 may control the first camera unit 200 and the second camera unit 300 for acquiring correction information for auto focus, and simultaneously control the first camera unit 200 and the second camera unit 300 for acquiring correction information for auto exposure or auto white balance.

FIGS. 27 to 31 are views illustrating changing focus of a subject of an image according to an embodiment.

Figure 27:
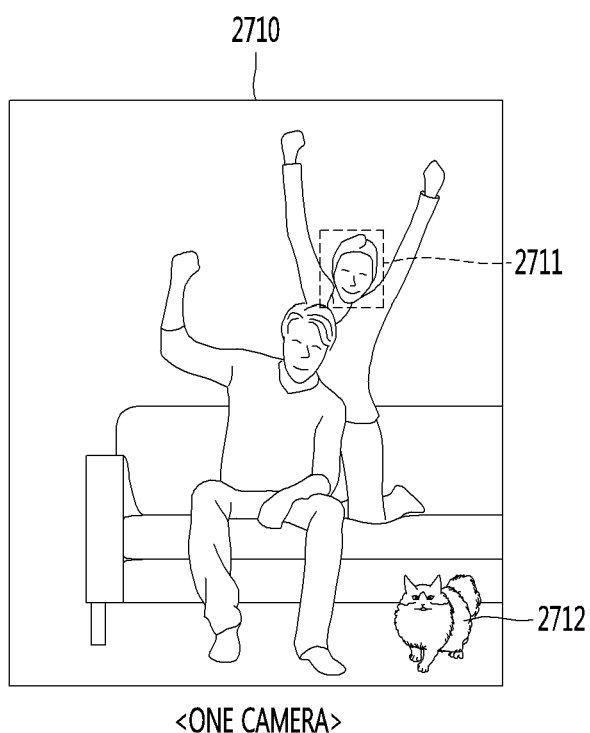
FIGS. 27, 28, 29, 30, and 31 are views illustrating changing a subject to be focused according to an embodiment.
Figure 28:
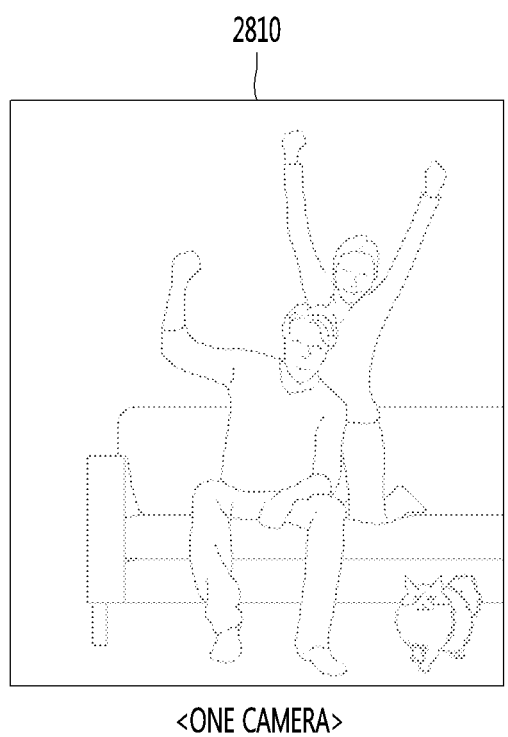

First, FIGS. 27 and 28 are views illustrating a process of performing correction as a focus is changed while photographing is being performed using one camera.

While photographing is being performed using one camera, there may occur a case where a subject to be focused is changed from a first subject 2711 to a second subject 2712 as shown in FIG. 27.

When the first subject 2711 is located in a bright area and the second subject 2712 is located in a dark area, or when the first subject 2711 is located in a dark area and the second subject 2712 is located in a bright area, to change focus from the first subject 2711 to the second subject 2712 the mobile terminal 100 may also perform auto exposure, auto focus, and auto white balance, based on a position, a color balance value, and the amount of light of the second subject 2712 to achieve a correctly adjusted or desirable image.

However, there frequently occurs a case where the auto exposure operation is too slow or results in a sudden change in exposure. Therefore, when a sudden change in lighting occurs, the adaptation to a new auto exposure value is slowly made. In addition, there may occur a case where recording is continuously performed in a state in which the auto exposure value is wrong.

Therefore, there may occur a case where an incorrectly exposed image 2810 is recorded as shown in FIG. 28, which is overexposed and detail in the image is lost.

Figure 29:
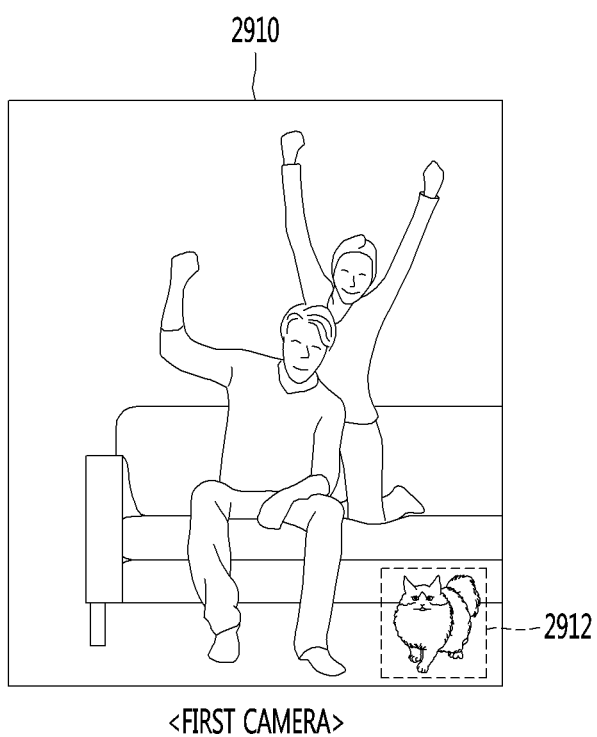
Figure 30:
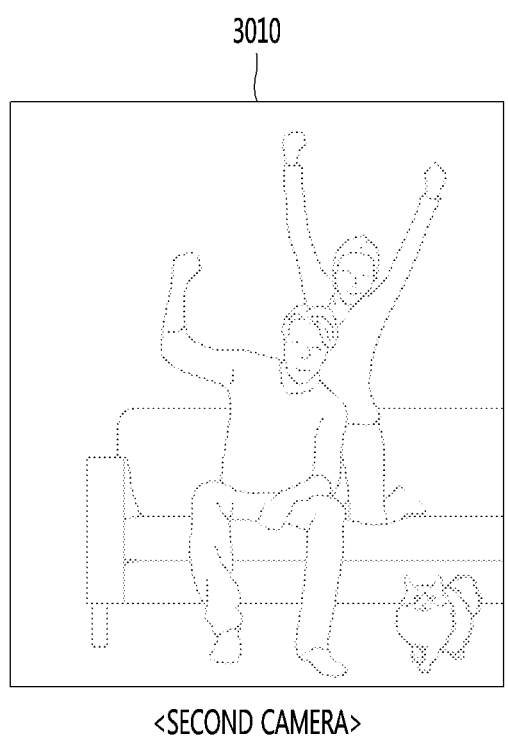
Figure 31:
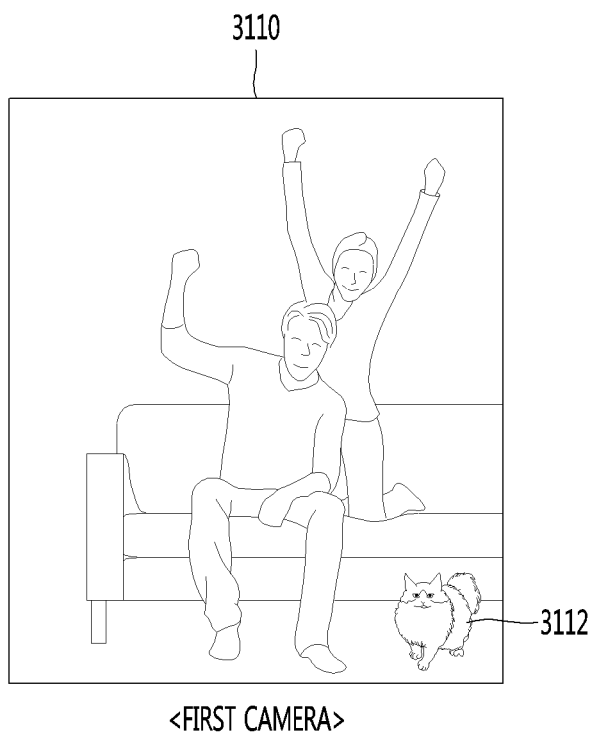

FIGS. 29 to 31 are views illustrating an apparatus and operating method of the moving picture capturing apparatus having the dual camera according to the embodiment.

FIG. 29 is a view illustrating an image 2910 captured through the first camera unit 200 just after a subject to be focused is changed due to a user input, etc.

Referring to FIG. 29, even when the subject to be focused is changed from a first subject 2911 located in a bright area to a second subject 2912 located in a dark area, the apparatus may not change the exposure setting value of the first camera unit 200. That is, the controller 180 can maintain a setting value of the first camera unit 200 for auto focus (AF), auto exposure (AE), or auto white balance (AWB) without any change despite the change in the subject.

Meanwhile, FIG. 30 is a view illustrating an image 3010 captured through the second camera unit 300 just after the subject to be focused is changed to the second subject 2912.

The controller 180 may acquire correction information on the basis of the image received through the second camera unit 300. Specifically, the controller 180 may acquire control information of the second camera unit 300 for auto focus, auto exposure, or auto white balance, among other settings, based on the image received through the second camera unit 300. The controller 180 may then control the second camera unit 300 to be operated based on the correction information.

While the correction is applied to the second camera unit, the second camera unit may capture distorted images 3010. Specifically, as shown in FIG. 30, while determining a correct exposure setting value, the images captured by the second camera unit may become overexposed or underexposed. However, the distorted image 3010 photographed through the second camera unit 300 may be used only to acquire final correction information, and may not be provided to the user of the mobile terminal 100 or the memory for long term storage.

Meanwhile, the controller 180 may control the second camera unit 300 to be operated based on the correction information. The controller 180 may acquire final correction information on the basis of the image received through the second camera unit 300.

The controller 180 may then control the first camera unit 200 to capture a moving picture on the basis of the final correction information.

FIG. 31 is a view illustrating one scene 3110 of a moving picture captured through the first camera unit 200 when the first camera unit 100 is controlled based on the final correction information.

Referring to FIG. 31, it can be seen that the exposure and white balance are correctly adjusted, and the focus of a second subject 3112 is also correctly adjusted after the first camera unit is adjusted using the final correction information obtained from controlling the second camera unit.

As discussed, the image of FIG. 30 is merely used during the process of acquiring correction information, and is not provided to a user or to the memory for long term storage. When the subject to be focused is changed from a first subject to a second subject, the focus, exposure, and white balance, initially set based on the first subject, may require adjustment based on the second subject. In the present disclosure, control for auto correction and acquisition of final correction information are performed using the second camera unit 300, so that the user can view the final adjustments of the image, including focus, exposure, and white balance without being presented with distorted images as a result of continuous determination of correct settings.

In some embodiments, when the first camera unit 200 is controlled based on the final correction information, the controller 180 may change the settings of the first camera unit 200 at a speed relatively slower than a setting change speed of the second camera unit 300 based on the correction information.

As an example, a speed at which the lens of the first camera unit 200 is moved to adjust a focus on the basis of the final correction information may be slower than an adjustment speed of the lens of the second camera unit 300 to adjust a focus on the basis of the correction information while determining the final correction information.

As another example, a speed at which the first camera unit 200 adjusts an exposure on the basis of the final correction information may be slower than an adjustment speed of the exposure settings of the second camera unit 300 on the basis of the correction information while determining the final correction information.

Since the images captured by the first camera unit may be presented to the user (for example through a viewfinder or a display screen), and the images captured by the first camera unit may be stored long term in the memory, a slower or more gradual change in the camera settings may be desired to achieve a pleasing visual effect. The speed of adjustment of the first camera unit may also be selected or configured by the user, or may also be automatically determined based on certain settings selected by the user. For example, the user may manually select a setting change speed based on a numeral or other value, or the user may select a setting change preset, such as "cinematographic preset," or "sporting event preset," or the like, each of which corresponds to certain preset setting change speeds, which may further include separate setting change speeds for each type of camera setting (ISO, shutter speed, exposure, and the like) to achieve the desired look.

On the other hand, since the image photographed through the second camera unit 300 is not provided to the user and may not be provided to the memory for long term storage, the setting change may be performed as fast as possible in order to acquire the final correction information as fast as possible for final adjustment of the first camera unit.

Figure 32A:
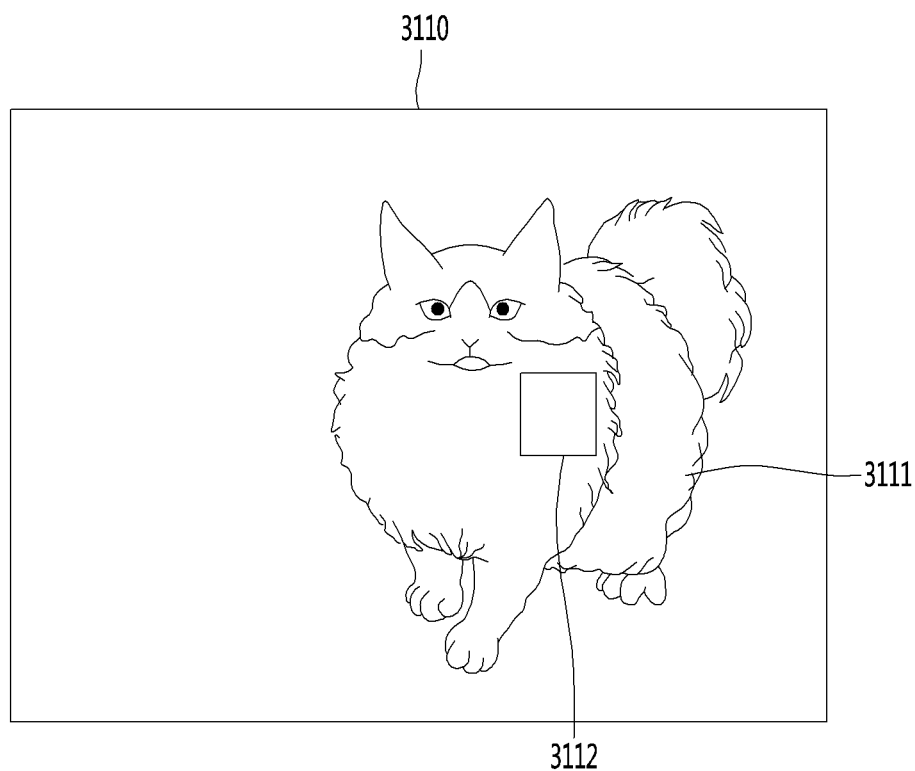
FIGS. 32A, 32B, and 32c are views illustrating control of the first camera unit after final correction information is acquired according to an embodiment.
Figure 32B:
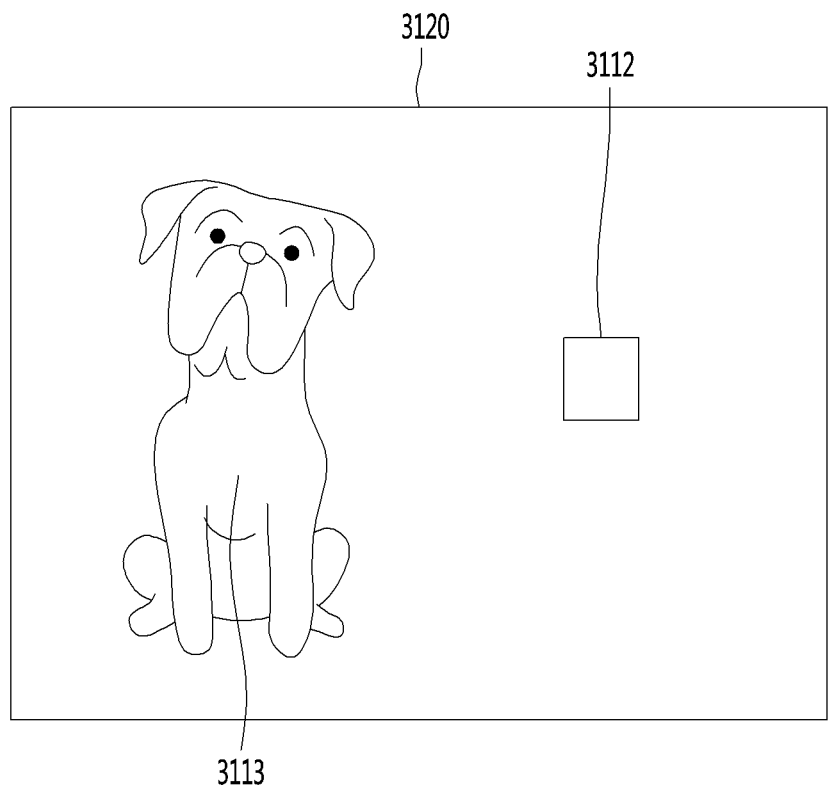
Figure 32C:
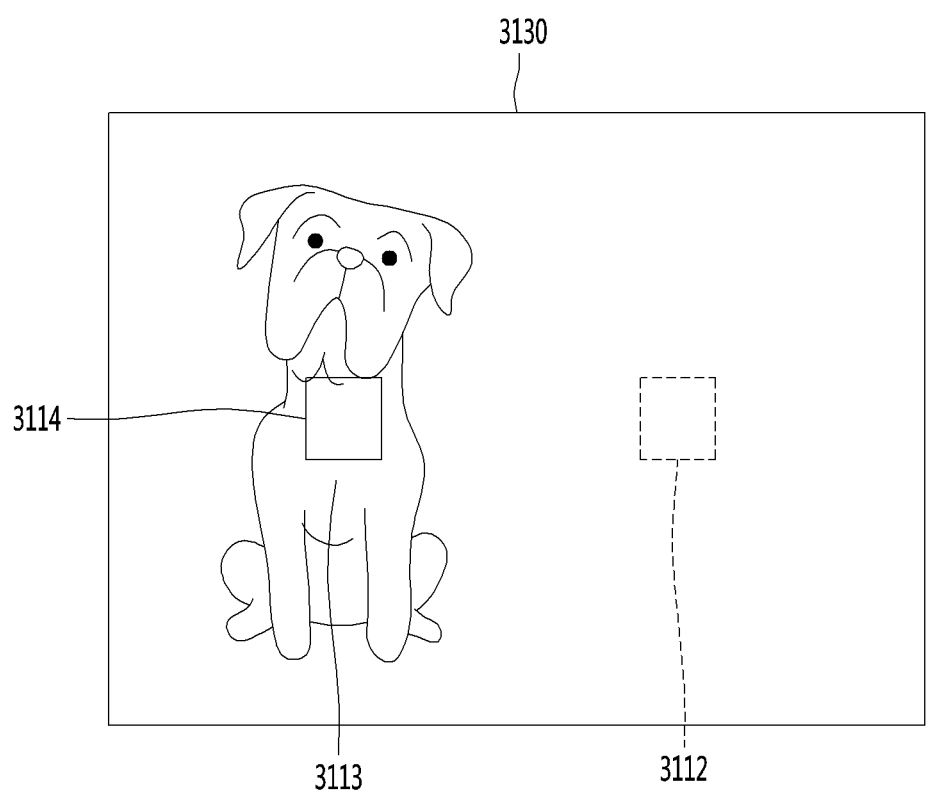

FIGS. 32A to 32C are views illustrating an apparatus and a control method of the first camera unit after final correction information is acquired according to an embodiment.

The controller 180 may control the first camera unit 200 such that at least one of the focus, brightness, or color balance of an image is changed based on the final correction information is acquired, wherein the changing of the focus is performed over a preset length of time. In some examples, the preset time may be set for a shorter duration or a longer duration to achieve a particular look in the video.

For example, in FIG. 32A, while a first image 3110 is being captured, a first focus 3112 may be adjusted to a first subject 3111.

Then, in FIG. 32B, the image being captured may be changed to a second image 3120. In this case, the controller 180 controls the first camera unit 200 to maintain the first focus 3112 as it was previously set for the first subject 3111. Meanwhile, the controller 180 may control the second camera unit 300 and acquires final correction information for focus.

Meanwhile, once the final correction information is acquired, the controller 180 changes the focus of the image to a second focus 3114 adjusted to a second subject 3113 as shown in FIG. 32C.

The focus of the image can be changed from the first focus 3112 to the second focus 3114 wherein the change is performed over a preset time. Specifically, the controller 180 may control the movement speed of the lens of the first camera unit 200 such that the focus of the image can be changed from the first focus 3112 to the second focus 3114 gradually over the preset time period.

As another example, in the case of auto exposure or white balance, the controller 180 may control the first camera unit 200 such that the brightness of the image or white balance is changed from a corresponding first value to a second value of exposure or white balance over the duration of the preset time. Specifically, the controller 180 may control at least one of the ISO and exposure time or white balance of the first camera unit 200 such that the brightness or white balance of the image can be changed from the first value to the second value over the duration of the preset time.

Here, the preset time is a changed according to a change in situations or according to user setting. As an example, the preset time for changing from the first focus 3112 to the second focus 3114, and a subsequent preset time for changing focus from the first focus 3112 to a third focus may be the same, but in other situations they may be different from each other. In addition, the speed at which the focus of the image is moved from the first focus 3112 to the second focus 3114 may be constant or may be changed. For example, when the focus of the image is moved from the first focus 3112 to the second focus 3114 with an intermediary fourth focus, a speed at which the focus of the image is moved from the first focus 3112 to the fourth focus and a speed at which the focus of the image is moved from the fourth focus to the second focus 3114 may be equal to each other or may be different from each other.

In other embodiments, a time or speed where the focus of the image is moved as a result of rotation or movement of the mobile terminal 100 may be different from a time or speed where the focus of the image is moved as a result of movement of a subject in the image. In other embodiments, a focus speed may be performed more quickly when the position of a first subject in the image and the position of a second subject in the image are close to each other. Conversely, the focus of the image may be performed relatively slower when the position of a first subject in the image and the position of a second subject in the image are further away from each other within the image. Other factors may be considered in determining a preset time or performance speed of the final correction, including factors related to the subjects within the image, relative positioning or movement of the subjects within the image, various settings of the camera based on the image including exposure, ISO, shutter speed, time of day, movement of the mobile terminal, a direction, position, or angle of the mobile terminal, and the like.

In yet other embodiments, a time for which the brightness of the image is changed from a first brightness to a second brightness and a time for which the brightness of the image is changed from the first brightness to a third brightness may be the same, or in other situations they may be different from each other.

Figure 33:
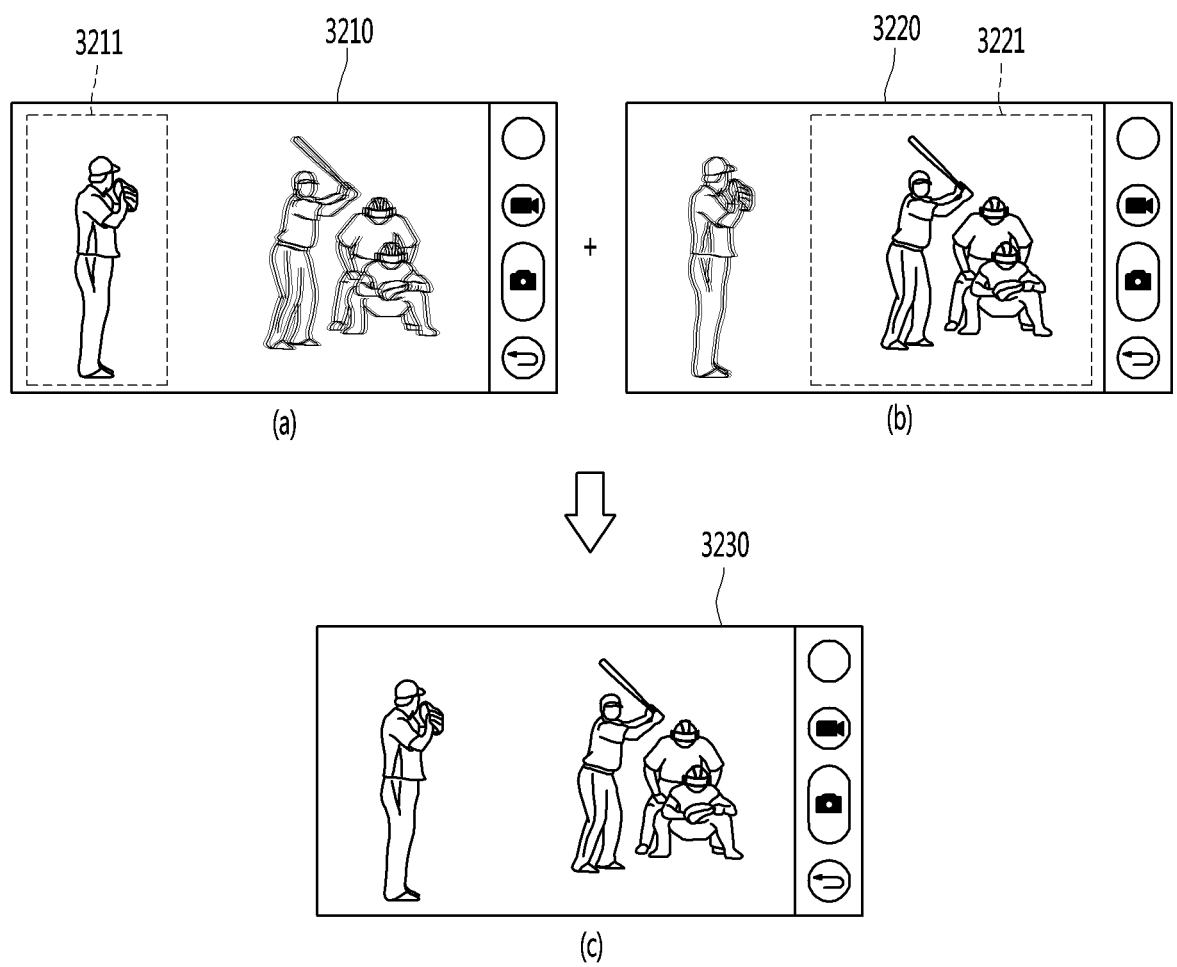
FIG. 33 is a view illustrating synthesizing of images using the dual camera according to an embodiment.

Thus as discussed above, auto correction may be performed at different times or at different speeds, so that different effects can be provided based on a situation or user setting. FIG. 33 is a view illustrating synthesizing images using the dual camera according to an embodiment.

The controller 180 may photograph a still picture or moving picture using both of the first camera unit 200 and the second camera unit 300.

Specifically, as shown in FIG. 33a, the controller 180 may control the first camera unit 200 to focus on a first area 3211 which is closer than a second area 3221. As shown in FIG. 33b, the controller 180 may control the second camera unit 300 to focus on the second area 3221 which is further away than the first area 3211.

In addition, the controller 180 may synthesize an image 3210 using an image from the first camera unit 200 and an image 3220 photographed using the second camera unit 300. Specifically, the controller 180 may synthesize the first area 3211 of the image 3210 photographed using the first camera unit 200 and the second area 3221 of the image 3220 photographed using the second camera unit 300.

Then, the controller 180 may acquire an image 3230 obtained by synthesizing the first area 3211 and the second area 3221.

Therefore, images photographed using the two cameras equipped at the same side of the terminal may be synthesized to obtain an image wherein focus is adjusted at both short and long distances.

The components of the various embodiments discussed herein may each comprise a controller of one or more computer implemented systems, and in one embodiment a single controller or one or more controllers may be configured to implement the various components. The controller 180 is generally a component taking charge of control of the apparatus, and may be used together with a central processing unit, a microprocessor, a processor, etc. The controller 180 controls overall operations of the apparatus, and may be implemented as a single chip system (system-on-a-chip (SOC) or system on chip (SoC) by being coupled to another functional part such as the wireless communication unit 110.

The above-described present disclosure may be implemented as codes readable by a computer on a medium written by the program. The computer-readable media may include all kinds of recording devices in which data readable by a computer system is stored. Examples of the computer-readable media may include a hard disk drive (HDD), a solid state disk (SSD), a silicon disk drive (SDD), a ROM, a RAM, a CD-ROM, a magnetic tape, a floppy disk, and an optical data storage device, and the like, and also include a device implemented in the form of a carrier wave (e.g., transmission via the Internet). In addition, the computer may include the controller 180 of the mobile terminal. Accordingly, the detailed description thereof should not be construed as restrictive in all aspects but considered as illustrative. The scope of the disclosure should be determined by reasonable interpretation of the appended claims and all changes that come within the equivalent scope of the disclosure are included in the scope of the disclosure.

Further, the various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A motion picture capturing apparatus comprising:
a first camera configured to capture images;
a second camera configured to capture images; and
a controller configured to:
cause the first camera to capture a motion picture;
generate final correction information based on an image received via the second camera; and
change a setting value of the first camera based on the final correction information and correction information between the first camera and the second camera, wherein the setting value includes at least one of ISO information, exposure time information, color balance information, or lens position information of the first camera,
wherein the first and second cameras have different angles of view, and
wherein the controller is further configured to:
maintain a first setting value of the first camera while acquiring the final correction information during capture of the motion picture,
determine a preset time period according to factors including relative positioning of a first subject and a second subject within the image, movement of the first subject and second subject, and settings of the first camera based on the image,
and change the first setting value of the first camera to a second setting value gradually over the preset time period based on the final correction information,
wherein the preset time period corresponds to a speed at which a focal point is moved between the first subject and the second subject and corresponds to a speed at which a brightness of the image or a white balance is changed from a first value to a second value, wherein the preset time period when the first subject and the second subject are positioned relatively close to each other is less than the preset time period when the first subject and the second subject are positioned relatively distant from each other.

2. The motion picture capturing apparatus according to claim 1, wherein the controller is further configured to generate the final correction information by:
generating preliminary correction information based on the image received via the second camera; and
adjusting the second camera based on the generated preliminary correction information to receive an adjusted image via the second camera.

3. The motion picture capturing apparatus according to claim 2, wherein the controller is further configured to generate the final correction information to include settings of the second camera when it is determined that adjustments to the adjusted image received via the second camera are completed.

4. The motion picture capturing apparatus according to claim 1, wherein the final correction information comprises at least auto focus information, auto exposure information, or auto white balance information.

5. The motion picture capturing apparatus according to claim 2, wherein the preliminary correction information comprises at least ISO information, exposure time information, color balance information, or lens position information of the second camera.

6. The motion picture capturing apparatus according to claim 1, wherein the final correction information comprises at least ISO information, exposure time information, color balance information, or lens position information of the first camera.

7. The motion picture capturing apparatus according to claim 1, wherein:
the final correction information comprises at least focus information, brightness information, or color balance information; and
the controller is further configured to cause the first camera to adjust capture of the motion picture based on the final correction information over a preset time period.

8. The motion picture capturing apparatus according to claim 1, wherein the controller is further configured to generate the final correction information in response to a triggering event.

9. The motion picture capturing apparatus according to claim 8, further comprising:
an input unit configured to receive an input; and
a sensor configured to detect movement of the motion picture capturing apparatus,
wherein the triggering event comprises at least a change in image received via at least the first or second camera, a movement of the motion picture capturing apparatus detected via the sensor, an input for changing a focal point received via the input unit, or an input for starting image auto correction received via the input unit.

10. The motion picture capturing apparatus according to claim 8, wherein the controller is further configured to activate the second camera in response to the triggering event.

11. The motion picture capturing apparatus according to claim 1, wherein the first and second cameras are disposed at a same side of the motion picture capturing apparatus.

12. The motion picture capturing apparatus according to claim 2, wherein the controller is further configured to generate new preliminary correction information and adjust the second camera again based on the new preliminary correction information when it is determined that the adjustments to the adjusted image are not completed.

13. A method for controlling a terminal for capturing a motion picture, the method comprising:
capturing a motion picture via a first camera of the terminal;
generating final correction information based on an image received via a second camera of the terminal; and
changing a setting value of the first camera based on the final correction information and correction information between the first camera and the second camera, wherein the setting value includes at least one of ISO information, exposure time information, color balance information, or lens position information of the first camera,
wherein the first and second cameras have different angles of view,
wherein the generating the final correction information comprises maintaining a first setting value of the first camera while acquiring the final correction information during capture of the motion picture,
wherein the changing the setting value of the first camera comprises determining a preset time period according to factors including relative positioning of a first subject and a second subject within the image, movement of the first subject and the second subject, and settings of the first camera based on the image,
and changing the first setting value of the first camera to a second setting value gradually over the preset time period based on the final correction information, and
wherein the preset time period corresponds to a speed at which a focal point is moved between the first subject and the second subject and corresponds to a speed at which a brightness of the image or a white balance is changed from a first value of to a second value, and
wherein the preset time period when the first subject and the second subject are positioned relatively close to each other is less than the preset time period when the first subject and the second subject are positioned relatively distant from each other.

14. The method of claim 13, wherein generating the final correction information comprises:
generating preliminary correction information based on the image received via the second camera; and
adjusting the second camera based on the generated preliminary correction information to receive an adjusted image via the second camera.

15. The method of claim 14, wherein the final correction information is generated to include settings of the second camera when it is determined that adjustments to the adjusted image received via the second camera are completed.

16. The method of claim 13, wherein the final correction information comprises at least auto focus information, auto exposure information, or auto white balance information.

17. The method of claim 13, wherein:
the final correction information comprises at least focus information, brightness information, or color balance information; and
the first camera is adjusted to capture the motion picture based on the final correction information over a preset time period.

18. The method of claim 14, further comprising generating new preliminary correction information and adjusting the second camera again based on the new preliminary correction information when it is determined that the adjustments to the adjusted image are not completed.

19. The method of claim 13, wherein:
the final correction information is generated in response to a triggering event; and
the triggering event comprises at least a change in image received via at least the first or second camera, a movement of the motion picture capturing apparatus, receiving an input for changing a focal point, or receiving an input for starting image auto correction.

* * * * *